(12) United States Patent
Yamamoto et al.

(10) Patent No.: US 12,540,647 B2
(45) Date of Patent: Feb. 3, 2026

(54) POWER TRANSMISSION PATH SWITCHING DEVICE AND TWO-SPEED TRANSMISSION

(71) Applicant: NSK Ltd., Tokyo (JP)

(72) Inventors: Akihiro Yamamoto, Fujisawa (JP); Hirotaka Kishida, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/727,492

(22) PCT Filed: Sep. 28, 2022

(86) PCT No.: PCT/JP2022/036212
§ 371 (c)(1),
(2) Date: Jul. 9, 2024

(87) PCT Pub. No.: WO2023/135870
PCT Pub. Date: Jul. 20, 2023

(65) Prior Publication Data
US 2025/0084901 A1  Mar. 13, 2025

(30) Foreign Application Priority Data
Jan. 13, 2022 (JP) ................................ 2022-003465

(51) Int. Cl.
*F16D 41/16* (2006.01)
*F16D 13/52* (2006.01)
(Continued)

(52) U.S. Cl.
CPC ............. *F16D 41/16* (2013.01); *F16D 13/52* (2013.01); *F16D 28/00* (2013.01);
(Continued)

(58) Field of Classification Search
CPC .... F16D 13/52; F16D 13/69; F16D 2023/123; F16D 41/00–36; F16D 47/00–04;
(Continued)

(56) References Cited

U.S. PATENT DOCUMENTS 6,481,548 B2 * 11/2002 Monahan ................ F16D 43/20
192/38
6,578,693 B2 * 6/2003 Mayr ...................... F16D 23/12
192/84.91
(Continued)

FOREIGN PATENT DOCUMENTS

DE      102009054879 A1 *  6/2011 ............. F16D 28/00
DE   10 2016 105 991 A1    10/2017
(Continued)

OTHER PUBLICATIONS

International Search Report for PCT/JP2022/036212 dated Dec. 20, 2022.
(Continued)

*Primary Examiner* — James J Taylor, II
(74) *Attorney, Agent, or Firm* — Sughrue Mion, PLLC

(57) ABSTRACT

Provided are a friction engagement device connected by pressing a friction plate and a separate plate against each other and disconnected by releasing the force pressing them; a rotation transmission state switching device having at least a free mode in which rotation of a first member relative to a second member is allowed and a lock mode in which rotation of the first member relative to the second member is prevented; and a control device having a function to switch the rotation transmission state switching device to a lock mode while maintaining the friction engagement device in a connected state and a function to switch to a state where the friction engagement device is disconnected and the rotation transmission state switching device is in a free mode.

19 Claims, 32 Drawing Sheets

(51) Int. Cl.
    *F16D 23/12*     (2006.01)
    *F16D 28/00*     (2006.01)
    *F16D 41/14*     (2006.01)
    *F16D 67/02*     (2006.01)

(52) U.S. Cl.
    CPC ........ *F16D 2023/123* (2013.01); *F16D 41/14* (2013.01); *F16D 67/02* (2013.01); *F16H 2200/0034* (2013.01); *F16H 2200/2005* (2013.01); *F16H 2200/2035* (2013.01); *F16H 2200/2066* (2013.01)

(58) Field of Classification Search
    CPC .......... F16D 67/00; F16D 67/02; F16D 67/06; F16D 28/00; F16D 25/06; F16D 25/062–0638; F16H 2200/0034; F16H 2200/2005; F16H 2200/2035; F16H 2200/2066
    See application file for complete search history.

(56) References Cited

U.S. PATENT DOCUMENTS

| | | | | |
|---|---|---|---|---|
| 8,469,855 | B2* | 6/2013 | Phillips | F16H 61/0295 475/318 |
| 9,180,866 | B2 | 11/2015 | Helmer et al. | |
| 10,208,837 | B2* | 2/2019 | Mordukhovich | B60K 17/08 |
| 10,563,701 | B2* | 2/2020 | Rippelmeyer | F16D 13/52 |
| 11,028,906 | B2* | 6/2021 | Torii | B60L 15/2054 |
| 11,454,288 | B2* | 9/2022 | Haupt | F16D 23/14 |
| 11,493,128 | B2* | 11/2022 | Kishida | F16D 13/52 |
| 11,598,381 | B2* | 3/2023 | Kato | F16D 21/08 |
| 11,867,242 | B2* | 1/2024 | Yamamoto | F16D 41/04 |
| 11,982,340 | B2* | 5/2024 | Yamamoto | F16H 63/3043 |
| 2020/0136491 | A1* | 4/2020 | Kim | F16H 3/54 |
| 2022/0268358 | A1 | 8/2022 | Kishida et al. | |

FOREIGN PATENT DOCUMENTS

| | | | |
|---|---|---|---|
| DE | 10 2016 221900 A1 | 5/2018 | |
| JP | 05-116549 A | 5/1993 | |
| JP | 2020-190280 A | 11/2020 | |
| KR | 20130002835 A * | 1/2013 | |
| WO | 2020/105636 A1 | 5/2020 | |
| WO | WO-2020091481 A1 * | 5/2020 | ............ F16D 43/14 |
| WO | 2021/117867 A1 | 6/2021 | |

OTHER PUBLICATIONS

Supplemental European Search Report dated Dec. 3, 2025, in corresponding European Application No. 22 92 0394.

* cited by examiner

OTHER SIDE IN THE AXIAL DIRECTION ← → ONE SIDE IN THE AXIAL DIRECTION

← OTHER SIDE IN THE AXIAL DIRECTION

ONE SIDE IN THE AXIAL DIRECTION →

POWER TRANSMISSION PATH SWITCHING DEVICE AND TWO-SPEED TRANSMISSION

CROSS REFERENCE TO RELATED APPLICATIONS

This application is a National Stage of International Application No. PCT/JP2022/036212 filed Sep. 28, 2022, claiming priority based on Japanese Patent Application No. 2022-003465 filed Jan. 13, 2022.

TECHNICAL FIELD

The present disclosure relates to a power transmission path switching device for switching the transmission path of power between an input member and an output member, and a two-speed transmission equipped with the power transmission path switching device.

BACKGROUND ART

In response to the recent trend toward reducing fossil fuel consumption, electric and hybrid vehicles have been studied and and partially implemented. Unlike internal combustion engines (engines) that operate by direct combustion of fossil fuels, electric motors, which are the power source of electric and hybrid vehicles, do not necessarily need to be provided with a transmission like general automobiles that use internal combustion engines as their driving source since the torque and rotation speed characteristics of the output shaft are favorable for automotive use (generally, maximum torque is generated at startup). However, even when an electric motor is used as the driving source, acceleration and high-speed performance can be improved by providing a transmission. Specifically, by providing a transmission, the relationship between the traveling speed of the vehicle and acceleration can be made smooth, similar to that of an automobile with a gasoline engine and a transmission in the power transmission system. This point will be explained with reference to FIG. 32.

For example, if a power transmission device with a large reduction ratio is arranged between the output shaft of the electric motor and the input section of the differential gear connected to the drive wheels, the relationship between acceleration (G) and traveling speed (km/h) of the electric vehicle becomes as indicated by the solid line a in FIG. 32. In other words, although the acceleration performance at low speed is excellent, driving at high speed becomes impossible. On the other hand, if a power transmission device with a small reduction ratio is arranged between the output shaft and the input section, this relationship becomes as indicated by the chain line b in FIG. 32. In other words, although driving at high speed becomes possible, acceleration performance at low speed is impaired. Regarding this, if a transmission is provided between the output shaft and the input section and the reduction ratio of this transmission is changed according to the vehicle speed, a characteristic can be obtained in which the portion of the solid line a to the left of the point P and the portion of the chain line b to the right of the point P are continuous. This characteristic is almost the same as that of a gasoline engine vehicle with similar power output, which is indicated by the dashed line c in FIG. 32, and it can be seen that in terms of acceleration and high-speed performance, performance equivalent to that of a gasoline engine vehicle provided with a transmission in the power transmission system can be obtained.

JPH 05-116549 (A) discloses a structure of a drive device for an electric vehicle in which the torque of the output shaft of an electric motor is transmitted to a differential gear through a two-speed transmission which is configured by combining a pair of planetary gear mechanisms and a pair of brakes (reduced by the two-speed transmission). In this drive device for an electric vehicle, the reduction ratio between the output shaft of the electric motor and the differential gear can be switched between two levels, high and low, by switching the states in which the components of the pair of planetary gear mechanisms can rotate and cannot rotate based on switching the disconnected and connected states of a pair of brakes.

German Patent Application Publication No. 102016105991 discloses a structure of a shift drum device capable of switching the reduction ratio of the transmission in at least two levels. In this device, the reduction ratio of the transmission can be switched based on rotating the shift drum by an actuator such as an electric motor.

CITATION LIST

Patent Literature

Patent Literature 1: JPH 05-116549 A
Patent Literature 2: German Patent Application Publication No. 102016105991

SUMMARY OF INVENTION

Technical Problem

The device described in JPH 05-116549 A is configured to connect (engage) the brakes by pressing a friction engaging element supported by a component of the planetary gear mechanism and a friction engaging element supported by a housing against each other by servo pistons PL and PH, operated by hydraulic pressure. However, in electric and hybrid vehicles, in order to reduce costs and improve electricity consumption performance by simplifying the system, it is desirable to use an electric actuator to switch the reduction ratio of the two-speed transmission, making the hydraulic pressure system unnecessary.

The device described in German Patent Application Publication No. 102016105991 is capable of switching to the parking lock mode, which locks the rotation of the output shaft of the transmission, and includes a mechanism that prevents the transmission from inadvertently switching to the parking lock mode while the vehicle is traveling and applying an undesired load to the transmission. Specifically, by engaging a pin with a groove formed on the outer circumferential surface of the shift drum and extending in the circumferential direction, unintentional rotation of the shift drum is prevented, thereby preventing the transmission from being inadvertently switched to the parking lock mode. When the shift lever is selected to P range (parking range), or the like, the pin is evacuated radially outward to disengage the pin from engagement with the groove, and thereby switching to the parking lock mode is enabled.

However, in the shift drum device described in German Patent Application Publication No. 102016105991, it is necessary to form a circumferentially extending groove in the shift drum, provide a pin that can engage or disengage the groove, and provide an actuator for moving the pin away from or toward the groove, just to prevent the transmission from being inadvertently switched to the parking lock mode.

As a result, the shift drum device becomes larger in size and the manufacturing costs increase.

In view of the circumstances described above, it is an object of the present disclosure to provide a structure capable of preventing the two-speed transmission from inadvertently switched to the parking lock mode, and, when necessary, reducing the force required to release the parking lock mode, for a power transmission path switching device that can switch the reduction ratio to two levels, high and low, as well as to the parking lock mode.

Solution to Problem

The power transmission path switching device according to one aspect of the present disclosure includes a friction engagement device, a rotation transmission state switching device, and a control device.

The friction engagement device has at least one friction plate and at least one separate plate that are supported so as to displace relative to each other in the axial direction. The friction engagement device is connected by pressing the friction plate and the separate plate against each other, and disconnected by releasing the force pressing the friction plate and the separate plate against each other.

The rotation transmission state switching device has a first member and a second member that are coaxially arranged with each other. Further, the rotation transmission state switching device has at least a free mode in which rotation of the first member with respect to the second member is allowed regardless of a direction of relative rotation between the first member and the second member, and a lock mode in which rotation of the first member with respect to the second member is prevented regardless of the direction of relative rotation between the first member and the second member.

The control device has a function to switch the rotation transmission state switching device to the lock mode while maintaining the friction engagement device in the connected state after connecting the friction engagement device when connecting the friction engagement device and switching the rotation transmission state switching device to the lock mode, and a function to disconnect the friction engagement device and switch the rotation transmission state switching device to the free mode.

In the power transmission path switching device according to one aspect of the present disclosure, the control device may have a function to disconnect the friction engagement device while maintaining the rotation transmission state switching device in the lock mode in a state where the friction engagement device is connected and the rotation transmission state switching device is in the lock mode.

In this case, the control device may have a function to prevent the friction engagement device from being switched from the disconnected state to the connected state while maintaining the rotation transmission state switching device in the lock mode in a state where the friction engagement device is disconnected and the rotation transmission state switching device is in the lock mode. Specifically, for example, the control device may have an erroneous lock prevention stopper portion that prevents the friction engagement device from being switched from the disconnected state to the connected state while maintaining the rotation transmission state switching device in the lock mode in the above state.

In the power transmission path switching device according to one aspect of the present disclosure, the rotation transmission state switching device may have a one-way clutch mode in which only rotation of the first member in a predetermined direction with respect to the second member is allowed and rotation of the first member in a direction opposite to the predetermined direction with respect to the second member is prevented.

In this case, the control device may have a function to switch the rotation transmission state switching device to the one-way clutch mode during switching the friction engagement device from the disconnected state to the connected state and/or during switching the friction engagement device from the connected state to the disconnected state.

In the power transmission path switching device according to one aspect of the present disclosure, the control device may have a function to prevent the rotation transmission state switching device from being inadvertently switched from the lock mode to the free mode or to the one-way clutch mode while the friction engagement device is connected in a state where the friction engagement device is connected and the rotation transmission state switching device is in the lock mode. Specifically, for example, the control device may have a lock release prevention mechanism which prevents the rotation transmission state switching device from being inadvertently switched from the lock mode to the free mode or the one-way clutch mode while the friction engagement device is connected in the above state.

In the power transmission path switching device according to one aspect of the present disclosure, the control device can include a drive cam that is supported so as to rotate and so as not to displace in the axial direction, and can switch a connection/disconnection state of the friction engagement device and a mode of the rotation transmission state switching device based on rotation of the drive cam.

In this case, the power transmission path switching device can be configured, by rotating the drive cam in one direction, to switch among a state where the friction engagement device is connected and the rotation transmission state switching device is in the free mode, a state where the friction engagement device is disconnected and the rotation transmission state switching device is in the free mode, and a state where the friction engagement device is connected and the rotation transmission state switching device is in the lock mode, in this order.

The control device may include a cam device having the drive cam and a driven cam that is supported so as to relatively rotate and displace in the axial direction with respect to the drive cam and displaces in the axial direction as the drive cam rotates.

In this case, the control device can be configured, by displacing the driven cam in a direction in which a distance in the axial direction from the drive cam increases based on rotating the drive cam, to connect the friction engagement device, and, by displacing the driven cam in a direction in which the distance in the axial direction from the drive cam decreases, to disconnect the friction engagement device. In other words, the friction engagement device can be configured by a so-called normally open clutch.

In this case, an elastic member may be provided that is arranged between the driven cam and the friction engagement device and elastically biases the driven cam and the friction engagement device in a direction away from each other.

Alternatively, the control device can be configured, by displacing the driven cam in a direction in which a distance in the axial direction from the drive cam decreases based on rotating the drive cam, to connect the friction engagement device, and, by displacing the driven cam in a direction in which the distance in the axial direction from the drive cam increases, to disconnect the friction engagement device. In other words, the friction engagement device can be configured by a so-called normally closed type clutch.

Further, the cam device may have a plurality of rolling elements held between the drive cam and the driven cam.

In this case, the rolling elements can be configured by rollers that each has a rotation axis facing in a radial direction and is supported by the driven cam so as to rotate freely about the rotation axis. Alternatively, the rolling elements can be configured by balls.

When the control device has the cam device, the erroneous lock prevention stopper portion can be provided on the drive cam and/or the driven cam.

In the power transmission path switching device according to one aspect of the present disclosure,
- one of the first member and the second member may have engaging concave portions at a plurality of locations in a circumferential direction, and
- the rotation transmission state switching device may include
- a mode select portion having a protruding portion,
- a first pawl member having a first base portion pivotally supported by the other member of the first member and the second member and a first engaging pawl extending from the first base portion toward one side in the circumferential direction,
- a second pawl member having a second base portion pivotally supported by the other member of the first member and the second member and a second engaging pawl extending from the second base portion toward the other side in the circumferential direction,
- a first pawl biasing member elastically biasing the first engaging pawl in a direction so as to engage with the engaging concave portions, and
- a second pawl biasing member elastically biassing the second engaging pawl in a direction so as to engage with the engaging concave portions.

In the lock mode, by engaging the first engaging pawl and the second engaging pawl with the engaging concave portions without being pressed by the protruding portion, rotation of the first member with respect to the second member is prevented regardless of the direction of relative rotation between the first member and the second member.

In the free mode, by pressing the first engaging pawl and the second engaging pawl by the protruding portion so as not to engage with the engaging concave portions, rotation of the first member to the second member is allowed regardless of the direction of relative rotation between the first member and the second member.

When the power transmission path switching device has the one-way clutch mode, in the one-way clutch mode, based on rotation or displacement in the axial direction of the mode select portion, by engaging one of the first engaging pawl and the second engaging pawl with the engaging concave portions without being pressed by the protruding portion, and by not engaging the other of the first engaging pawl and the second engaging pawl with the engaging concave portion with being pressed by the protruding portion, only rotation of the first member in a predetermined direction relative to the second member is allowed and rotation of the first member relative to the second member in a direction opposite to the predetermined direction is prevented.

In the power transmission path switching device, the mode select portion can be rotated or displaced in the axial direction as the drive cam rotates.

In this case, the rotation transmission state switching device includes a select plate having the mode select portion, and the protruding portion may be provided respectively at a plurality of locations in the circumferential direction of the select plate so as to protrude in the radial direction or the axial direction.

Alternatively, the drive cam may include the mode select portion.

In the power transmission path switching device according to one aspect of the present disclosure, the friction engagement device may have a return spring that elastically biases the friction plate and the separate plate in a direction away from each other.

The two-speed transmission according to one aspect of the present disclosure includes
- an input member,
- an output member arranged coaxially with the input member,
- a planetary gear mechanism arranged between the input member and the output member with respect to a direction of power transmission, and
- a power transmission path switching device switching a power transmission path between the input member and the output member.

In particular, in the two-speed transmission according to one aspect of the present disclosure, the power transmission path switching device is configured by the power transmission path switching device according to one aspect of the present disclosure.

The planetary gear mechanism includes
- a sun gear connected to the input member so as to rotate integrally with the input member,
- a ring gear arranged coaxially with the sun gear around the sun gear,
- a carrier arranged coaxially with the sun gear and connected to the output member so as to rotate integrally with the output member, and
- a plurality of pinion gears that mesh with the sun gear and the ring gear, and supported by the carrier to freely rotate about respective center axes.

One of the friction plate and the separate plate is supported so as to displace in the axial direction and so as not to rotate relative to the sun gear or the input member,
- the other of the friction plate and the separate plate is supported so as to displace in the axial direction and not to be able to rotate relative to the carrier or the output member,
- one of the first member and the second member is supported with respect to a portion that does not rotate even when in use so as not to relatively rotate, and
- the other of the first member and the second member is supported with respect to the ring gear so as not to relatively rotate.

In the two-speed transmission according to one aspect of the present disclosure, when a structure where the cam device is provided and the select plate is rotated or displaced in the axial direction as the drive cam rotates is adopted as the power transmission path switching device, the two-speed transmission can include an electric actuator that rotationally drives the drive cam.

Advantageous Effects of Invention

With the power transmission path switching device according to one aspect of the present disclosure, a two-speed transmission capable of switching a reduction ratio into two levels, high and low, can be switched to a parking lock mode, and it is possible to prevent the two-speed transmission from inadvertently switched to the parking lock mode. Further, in the power transmission path switching device according to one aspect of the present disclosure, it is possible to reduce the force required to release the parking lock mode as necessary.

DESCRIPTION OF EMBODIMENTS

Figure 1:
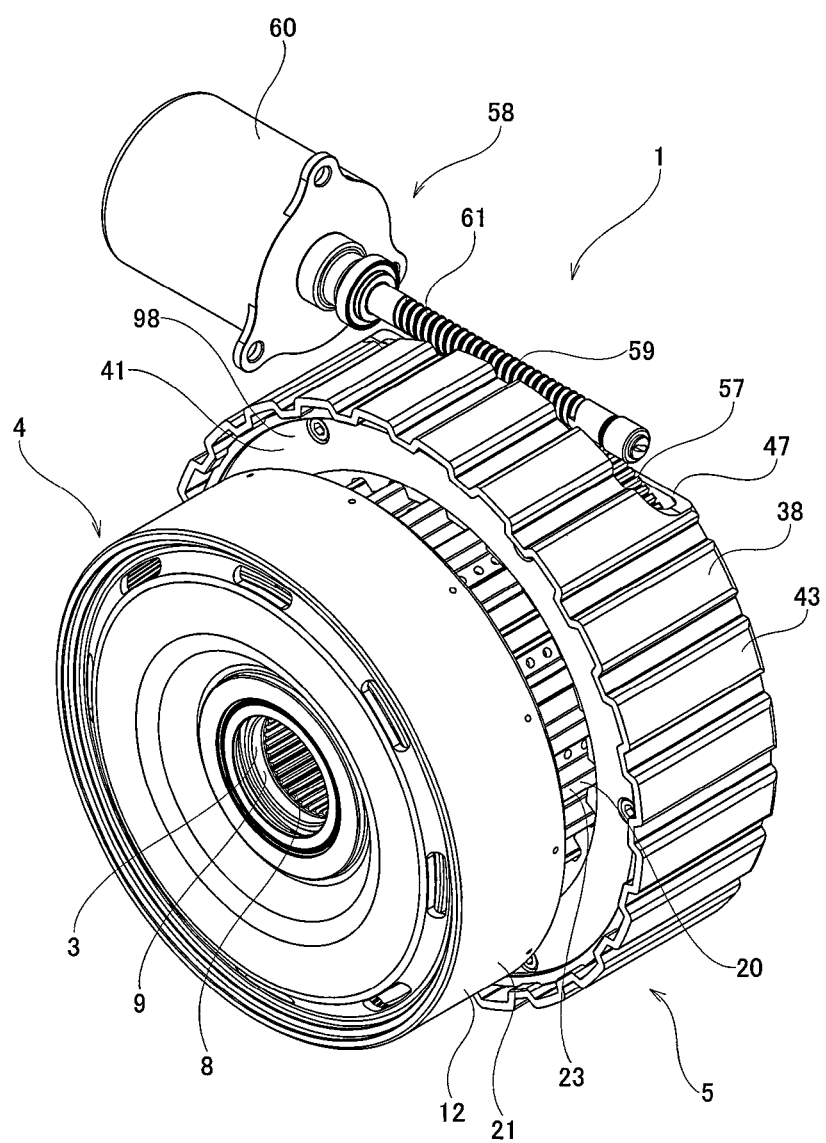
FIG. 1 is a perspective view of a two-speed transmission according to a first example of an embodiment of the present disclosure.
Figure 2:
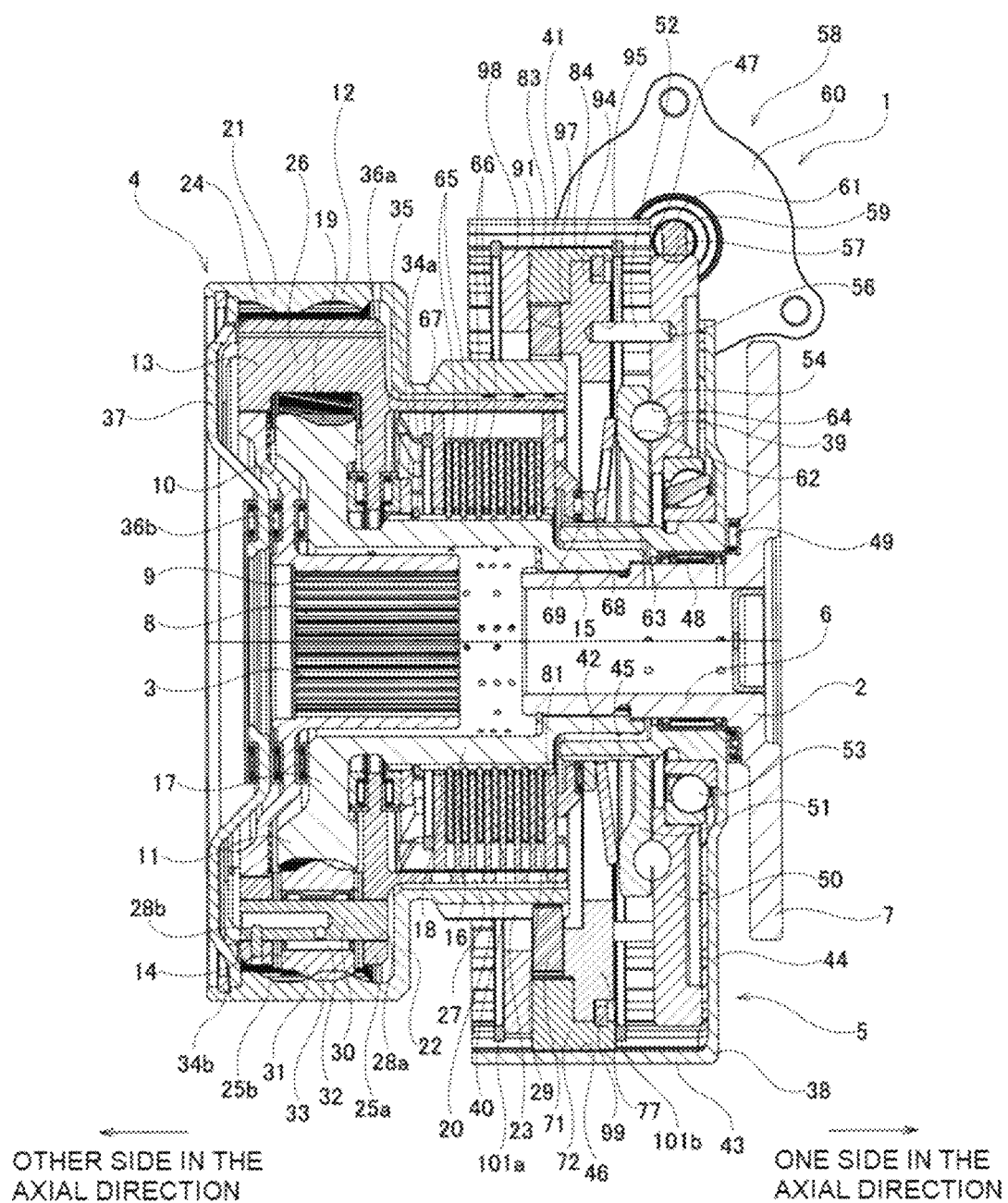
FIG. 2 is a cross-sectional view of the two-speed transmission of the first example.
Figure 3:
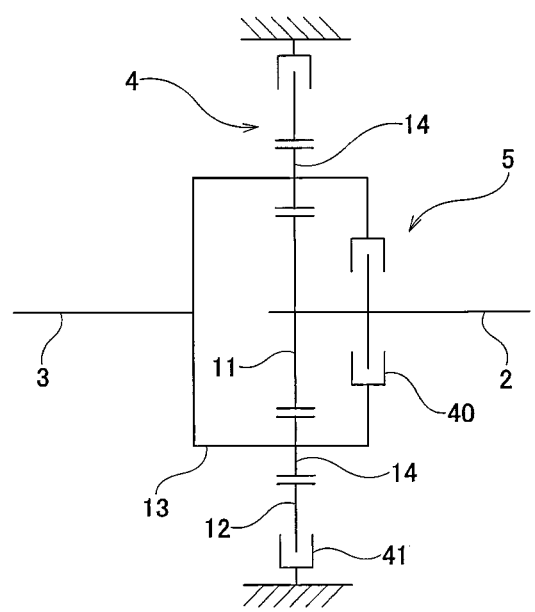
FIG. 3 is a schematic view illustrating the two-speed transmission of the first example.

In the following description, although a two-speed transmission and a power transmission path switching device according to one aspect of the present disclosure will the explained with reference to the drawings, the following explanation is merely an example, and the contents of the present disclosure are not limited by the constructions of the following examples. Further, it is also possible to apply known alternative components as respective components configuring the two-speed transmission, the power transmission path switching device, and other devices that configure the two-speed transmission.

First Example

A first example of an embodiment of the present disclosure will be described using FIG. 1 through FIG. 16. The two-speed transmission 1 of this example is, for example, arranged between an output shaft of an electric motor, which is a power source of an electric vehicle or a hybrid vehicle, and a differential gear, and transmits the torque of the output shaft of the electric motor to the differential gear after increasing (decelerating) or as it is without increasing (decelerating). The two-speed transmission 1 of this example includes an input member 2, an output member 3 arranged coaxially with the input member 2, a planetary gear mechanism 4 arranged between the input member 2 and the output member 3 with respect to the power transmission direction, and a power transmission path switching device 5 that switches the power transmission path between the input member 2 and the output member 3. This kind of two-speed transmission 1 is configured to allow switching modes among a low reduction ratio mode in which the reduction ratio between the input member 2 and the output member 3 is small, and a high reduction ratio mode in which the reduction ratio is larger than the low reduction ratio mode, as well as a neutral mode in which torque is not transmitted between the input member 2 and the output member 3, and a parking lock mode in which rotation of the output member 3 is locked.

Here, regarding the two-speed transmission 1 of this example, the axial direction, the radial direction, and the circumferential direction refer to the axial direction, the radial direction, and the circumferential direction of the input member 2, unless statd otherwise. The axial direction, the radial direction, and the circumferential direction of the input member 2 coincide with the axial direction, the radial direction, and the circumferential direction of the output member 3, respectively. Further, one side in the axial direction refers to the side of the input member 2 (the right side in FIG. 2 through FIG. 9(D)), and the other side in the axial direction refers to the side of the output member 3 (the left side in FIG. 2 through FIG. 9(D)).

The input member 2 is connected to a drive shaft (not illustrated) such as the output shaft of an electric motor, to which torque (power) is input. In this example, the input member 2 includes an input cylindrical portion 6 and an input flange portion 7 bent toward outside in the radial direction from an end portion on the one side in the axial direction of the input cylindrical portion 6. The drive shaft is, for example, internally fitted to the inner circumferential surface of the input cylindrical portion 6 so as to transmit torque, or is coupled to the input flange portion 7 by bolting or the like so as to transmit torque.

The output member 3 is arranged coaxially with the input member 2 and connected to a driven shaft (not illustrated) such as a differential gear or propeller shaft so as to output torque to the driven shaft. In this example, the output member 3 includes an output cylindrical portion 9 having a female spline portion 8 on the inner circumferential surface, and an output flange portion 10 bent toward the outside in the radial direction from an end portion on the other side in the axial direction of the output cylindrical portion 9. The driven shaft is connected to the output member 3 so as to transmit torque by spline-engaging a male spline portion provided on the outer circumferential surface of a tip end portion of the driven shaft with a female spline portion 8 of the output cylindrical portion 9.

As illustrated in FIG. 2 through FIG. 4(B), the planetary gear mechanism 4 is arranged between the input member 2 and the output member 3 with respect to the power transmission direction, and includes a sun gear 11 connected to the input member 2 so as to rotate integrally with the input member 2, a ring gear 12 arranged coaxially with the sun gear 11 around the sun gear 11, a carrier 13 arranged coaxially with the sun gear 11 and connected to the output member 3 so as to rotate integrally with the output member 3, and a plurality of pinion gears 14 that mesh with the sun gear 11 and the ring gear 12 and are supported by the carrier 13 to freely rotate about respective center axes.

The sun gear 11 is connected to the input member 2 so as to rotate integrally with the input member 2. In this example, the sun gear 11 includes a small-diameter tubular portion 15 on the one side in the axial direction, a large-diameter tubular portion 16 on the other side in the axial direction, and a flange portion 17 bent toward the outside in the radial direction from an end portion on the other side in the axial direction of the large-diameter tubular portion 16. The sun gear 11 includes a sun-side male spline portion 18 on the outer circumferential surface of the large-diameter tubular portion 16, and a gear portion 19 configured by a spur gear or a helical gear on the outer circumferential surface of the flange portion 17. The small-diameter tubular portion 15 of the sun gear 11 is externally fitted to the input cylindrical portion 6 of the input member 2 by a structure such as a spline engagement capable of transmitting torque.

The ring gear 12 is supported around the sun gear 11 so as to be coaxial with the sun gear 11 and so as to rotate relative to the sun gear 11. In this example, the ring gear 12 includes a small-diameter tubular portion 20 on the one side in the axial direction, a large-diameter tubular portion 21 on the other side in the axial direction, and a circular ring portion 22 that connects an end portion on the other side in the axial direction of the small-diameter tubular portion 20 and an end portion on the one side in the axial direction of the large-diameter tubular portion 21. The ring gear 12 includes a ring-side male spline portion 23 on the outer circumferential surfaces of the small-diameter tubular portion 20, and a gear portion 24 configured by a spur gear or a helical gear on the inner circumferential surface of the large-diameter tubular portion 21.

The carrier 13 is supported coaxially with the sun gear 11 and the ring gear 12, and is connected to the output member 3 so as to rotate integrally with the output member 3. In this example, the carrier 13 includes a pair of rim portions 25a, 25b each having a circular ring shape that are spaced apart in the axial direction, and column portions 26 extending between the pair of rim portions 25a, 25b at a plurality of locations in the circumferential direction thereof that are aligned with each other, and a cylindrical portion 27 that protrudes over the entire circumference toward the one side in the axial direction from an intermediate portion in the radial direction of a surface on the one side in the axial direction of the rim portion 25a on the one side in the axial direction of the pair of rim portions 25a, 25b.

The carrier 13 includes circular holes 28a penetrating in the axial direction at a plurality of locations in the circumferential direction of a portion of the rim portion 25a on the one side in the axial direction that is located on the outside in the radial direction than the cylindrical portion 27, and also includes a carrier-side female spline portion 29 on the inner circumferential surface of the cylindrical portion 27. Further, the carrier 13 has circular holes 28b penetrating in the axial direction in portions of the rim portion 25b on the other side in the axial direction of the pair of rim portions 25a, 25b that align with the circular holes 28a of the rim portion 25a on the one side in the axial direction. The carrier 13 is configured to rotate integrally with the output member 3 by connecting the rim portion 25b on the other side in the axial direction to the output flange portion 10 of the output member 3 by a structure such as a spline engagement capable of transmitting torque.

Each of the pinion gears 14 meshes with the sun gear 11 and the ring gear 12 and is supported by the carrier 13 to freely rotate about its own center axis. In this example, each pinion gear 14 has a column shaped support shaft 30, and a cylindrical body portion 31 rotatably supported around the intermediate portion in the axial direction of the support shaft 30 by a radial needle bearing 32. The body portion 31 includes a gear portion 33 on the outer circumferential surface that is configured by a spur gear or a helical gear and meshes with the gear portion 19 of the sun gear 11 and the gear portion 24 of the ring gear 12. End portions on both sides in the axial direction of the support shaft 30 are fitted and fixed into the circular holes 28a, 28b of the carrier 13, respectively.

In this example, a retaining ring 34a is locked to an outer circumferential surface of the intermediate portion in the axial direction of the large-diameter tubular portion 16 of the sun gear 11. A spacer 35 is prevented from being displaced to the one side in the axial direction by the retaining ring 34a. A surface on the other side in the axial direction of the spacer 35 is abutted against the surface on the one side in the axial direction of the inside portion in the radial direction of the rim portion 25a on the one side in the axial direction through a thrust bearing 36a. Further, a retaining ring 34b is locked to an inner circumferential surface of the end portion on the other side in the axial direction of the large-diameter tubular portion 21 of the ring gear 12. A retaining plate 37 is prevented from being displaced to the other side in the axial direction by the retaining ring 34b. A surface on the one side in the axial direction of the inside portion in the radial direction of the retaining plate 37 is abutted against the surface on the other side in the axial direction of the inside portion in the radial direction of the rim portion 25b on the other side in the axial direction (output flange portion 10 of the output member 3) through a thrust bearing 36b. As a result, the sun gear 11, ring gear 12, carrier 13, and the pinion gears 14 are prevented from separating when the planetary gear mechanism 4 is assembled. In other words, the planetary gear mechanism 4 can be handled integrally as a subassembly.

The power transmission path switching device 5 includes a friction engagement device 40, a rotation transmission state switching device 41, and a control device, and switches the power transmission path between the input member 2 and the output member 3. In the power transmission path switching device 5 of this example, the control device is configured by a cam device 39. Further, the power transmission path switching device 5 of this example includes a housing 38 that does not rotate even when in use.

The housing 38 includes an inner diameter side tubular portion 42, an outer diameter side tubular portion 43, and a circular ring shaped side plate portion 44 that connects the end portion on the one side in the axial direction of the inner diameter side tubular portion 42 and the end portion on the one side in the axial direction of the outer diameter side tubular portion 43. The housing 38 includes a fixed side male spline portion 45 on the outer circumferential surface of the inner diameter side tubular portion 42, and also includes a fixed side female spline portion 46 on the inner circumferential surface of the outer diameter side tubular portion 43. Further, the housing 38 includes a through hole 47 that penetrates in the radial direction and extends in the circumferential direction in a portion on the one side in the axial direction of the outer diameter side tubular portion 43.

In this example, a radial needle bearing 48 is arranged between the inner circumferential surface of the inner diameter side tubular portion 42 of the housing 38 and the outer circumferential surface of the input cylindrical portion 6 of the input member 2, and a thrust needle bearing 49 is arranged between the surface on the one side in the axial direction of the side plate portion 44 and the surface on the other side in the axial direction of the input flange portion 7, so that the input member 2 is rotatably supported with respect to the housing 38.

Figure 5:
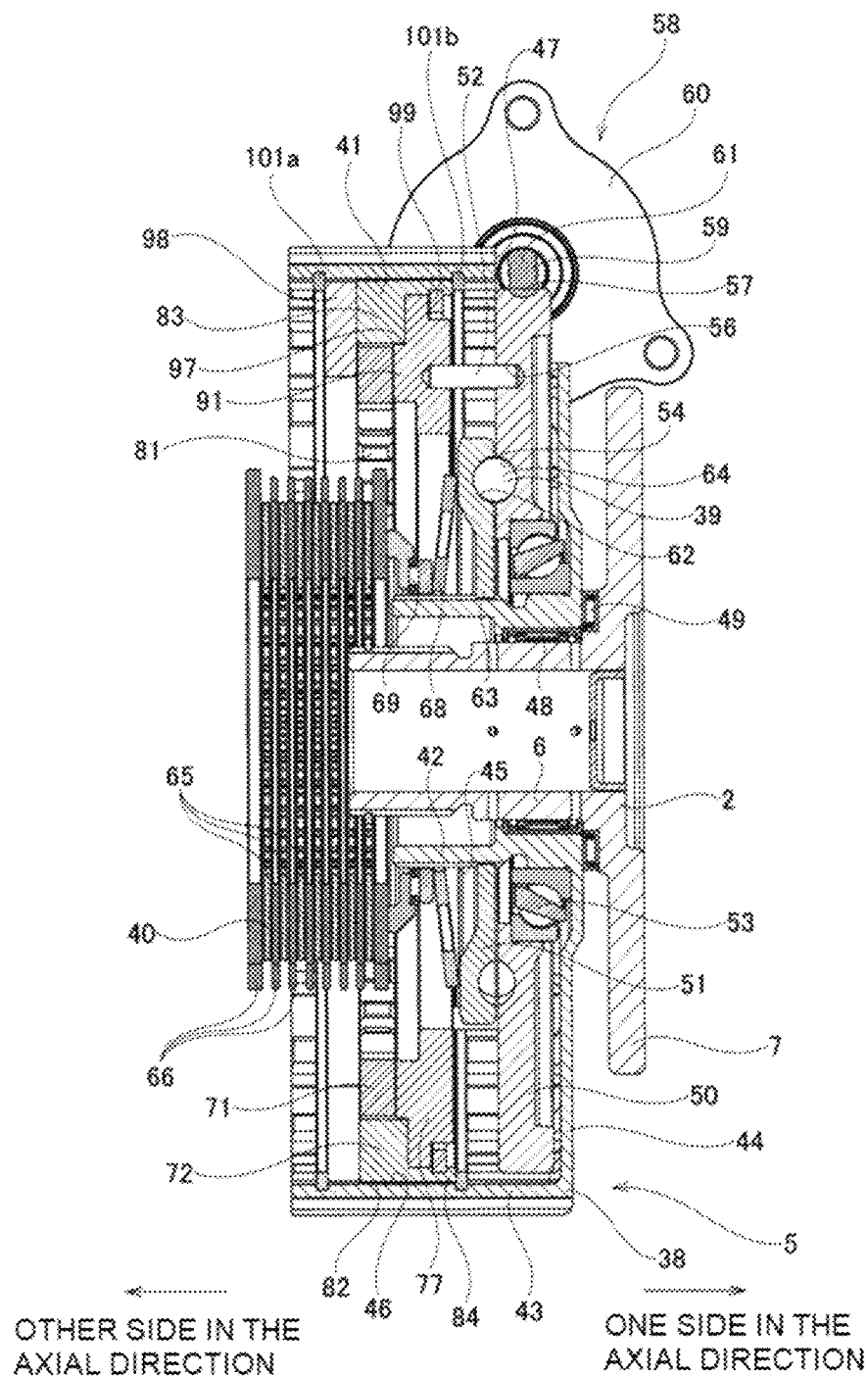
FIG. 5 is a cross-sectional view of a power transmission path switching device of the two-speed transmission of the first example.
Figure 7:
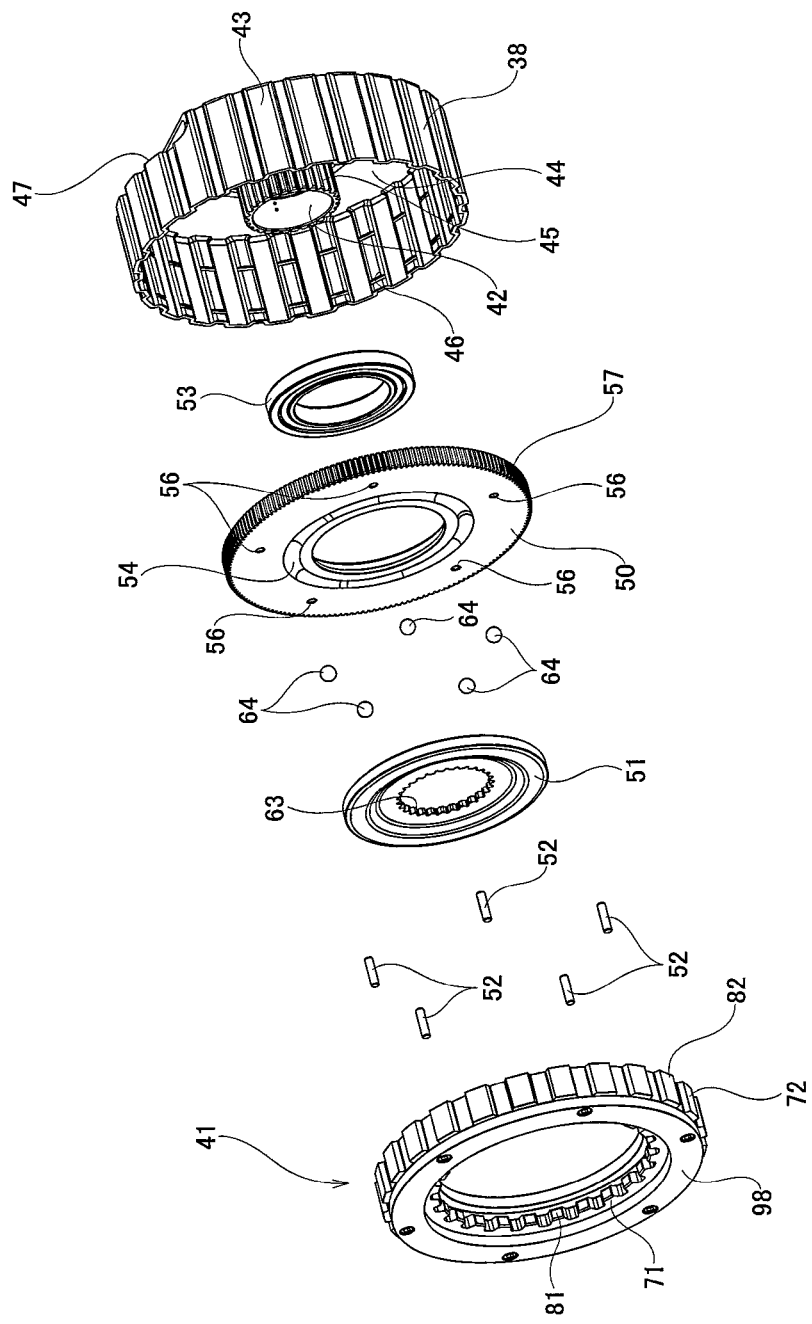
FIG. 7 is an exploded perspective view of a cam device and a rotation transmission state switching device of the power transmission path switching device of the first example.

As illustrated in FIG. 5 and FIG. 7, the cam device 39 constituting the control device includes a drive cam 50 that is supported so as to rotate and so as not to displace in the axial direction, a driven cam 51 that is supported so as to rotate and displace in the axial direction relative to the drive cam 50 and displaces in the axial direction as the drive cam 50 rotates, a plurality of (five in the illustrated example) rolling elements 64, and a plurality of (five in the illustrated example) engagement pins 52.

The drive cam 50 has a circular ring shape, and is supported on the outer circumferential surface of the end portion on the one side in the axial direction of the inner diameter side tubular portion 42 of the housing 38 through an angular ball bearing 53 that can support a radial load and a thrust load so as to rotate freely and so as not to displace in the axial direction.

The drive cam 50 has a drive cam surface 54 on the inside portion in the radial direction of the surface on the other side in the axial direction, in which the same number of concave portions and convex portions are arranged alternately in the circumferential direction. As illustrated in FIG. 9(A) through FIG. 9(D), the drive cam surface 54 is configured by repeatedly arranging a first flat surface portion 54a, a gently inclined surface portion 54b, a first bottom portion 54c, a steeply inclined surface portion 54d, a second flat surface portion 54e, a first intermediate inclined surface portion 54f, a second bottom portion 54g, and a second intermediate inclined surface portion 54h in this order from the upper side to the lower side in FIG. 9(A) through FIG. 9(D).

Of the drive cam surface 54, the first flat surface portion 54a and the second flat surface portion 54e are located at the most other side in the axial direction, in other words, at the tip end portion of the convex portion, and the first bottom portion 54c and the second bottom portion 54g are located at the most one side in the axial direction. The inclination angle with respect to a virtual plane perpendicular to the center axis of the drive cam 50 increases in the order of the gently inclined surface portion 54b, the first intermediate inclined surface portion 54f and the second intermediate inclined surface portion 54h, and the steeply inclined surface portion 54d.

The inclination angle of the steeply inclined surface portion 54d is set such that the rolling elements 64 can roll down on the steeply inclined surface portion 54d, but cannot ride up on it. In other words, the inclination angle of the steeply inclined surface portion 54d is such that the rolling elements 64 cannot ride up on it by rotationally driving the drive cam 50.

The inclination angle of the gently inclined surface portion 54b and the inclination angle of the first intermediate inclined surface portion 54f and the second intermediate inclined surface portion 54h are all set to a size that allows the rolling elements 64 to roll down or ride up. In this example, the first intermediate inclined surface portion 54f and the second intermediate inclined surface portion 54h have opposite inclination directions and have the same inclination angle, however the inclination angles can also be made different from each other. Further, although the inclination angle of the gently inclined surface portion 54b is set to be smaller than the inclination angle of the first intermediate inclined surface portion 54f and the second intermediate inclined surface portion 54h, the inclination angle of the gently inclined surface portion 54b and the inclination angle of the first intermediate inclined surface portion 54f and the second intermediate inclined surface portion 54h can also be made the same.

The drive cam 50 has cam-side engaging holes 56 that open to the surface on the other side in the axial direction at a plurality of equally spaced locations in the circumferential direction (five locations in the illustrated example) on a portion on the outside in the radial direction, and has a wheel gear portion 57 on the outer circumferential surface that is configured by a helical gear with a helix-shaped tooth trace.

Figure 6:
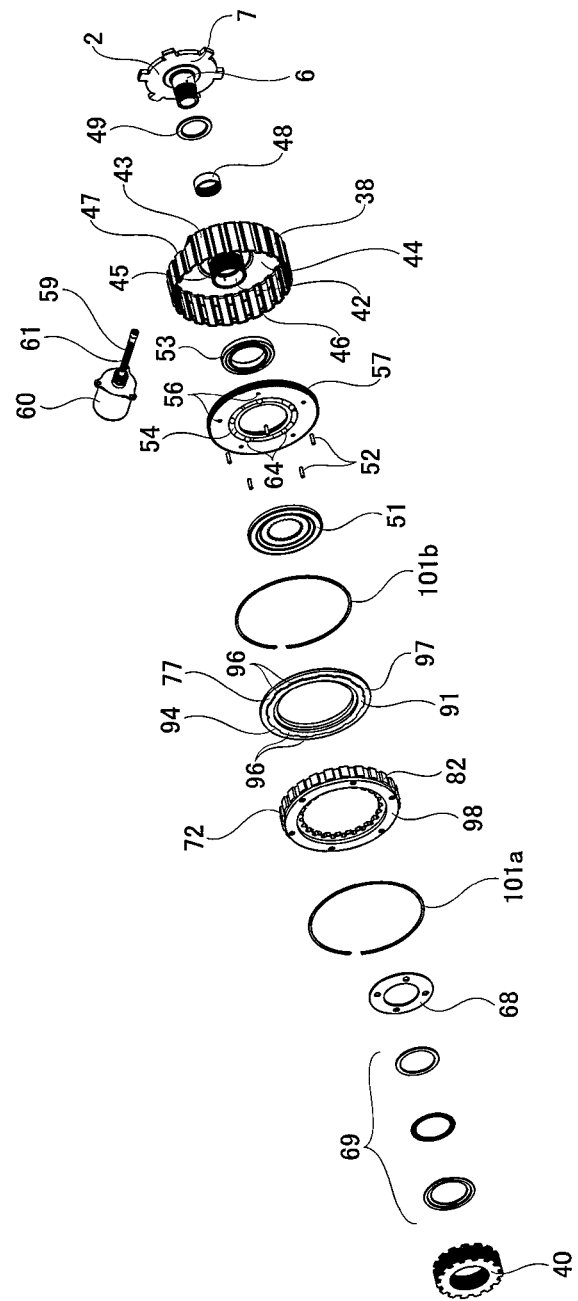
FIG. 6 is an exploded perspective view of the power transmission path switching device of the first example.

The drive cam 50 is rotationally driven by the electric actuator 58. As illustrated in FIG. 1 and FIG. 6, the electric actuator 58 includes a worm 59 and a variable speed motor 60. The worm 59 has a worm gear portion 61 on the outer circumferential surface of the intermediate portion in the axial direction of the electric actuator 58, which meshes with a portion of the wheel gear portion 57 of the drive cam 50 that is exposed from the through hole 47 of the housing 38. The variable speed motor 60 rotationally drives the worm 59. In other words, the drive cam 50 is rotationally driven the variable speed motor 60 through a worm reducer configured by meshing the wheel gear portion 57 and the worm gear portion 61.

The driven cam 51 is supported so as to rotate and displace in the axial direction relative to the drive cam 50, and displaces in the axial direction as the drive cam 50 rotates. In this example, as illustrated in FIG. 5 and FIG. 7, the driven cam 51 is arranged at the inside portion in the radial direction of the drive cam 50 so as to face the drive cam 50 in the axial direction. The driven cam 51 has a driven cam surface 62, which is configured by alternately arranging concave portions and convex portions in the circumferential direction of which the number is the same as that of the concave portions and convex portions of the drive cam surface 54 (five in this example), on the one side in the axial direction of the driven cam 51 facing the drive cam surface 54 of the drive cam 50. As illustrated in FIG. 9(A) through FIG. 9(D), the driven cam surface 62 is configured by repeatedly arranging a first flat surface portion 62a, a gently inclined surface portion 62b, a first bottom portion 62c, a steeply inclined surface portion 62d, a second flat surface portion 62e, a first intermediate inclined surface portion 62f, a second bottom portion 62g, and a second intermediate inclined surface portion 62h in this order from the other side in the circumferential direction to the one side (from the lower side to the upper side in FIG. 9(A) through FIG. 9(D)).

Of the driven cam surface 62, the first flat surface portion 62a and the second flat surface portion 62e are located at the most one side in the axial direction, in other words, at the tip end portion of the convex portion, and the first bottom portion 62c and the second bottom portion 62g are located at the most other side in the axial direction. The inclination angle with respect to the virtual plane perpendicular to the center axis of the driven cam 51 increases in the order of the gently inclined surface portion 62b, the first intermediate inclined surface portion 62f and the second intermediate inclined surface portion 62h, and the steeply inclined surface portion 62d.

The inclination angle of the steeply inclined surface portion 62d is set such that the rolling elements 64 can roll down on the steeply inclined surface portion 62d, but cannot ride up on it. In other words, the inclination angle of the steeply inclined surface portion 62d is such that the rolling elements 64 cannot ride up on it by rotationally driving the drive cam 50 by the electric actuator 58.

The inclination angle of the gently inclined surface portion 62b and the inclination angle of the first intermediate inclined surface portion 62f and the second intermediate inclined surface portion 62h are all set to a size that allows the rolling elements 64 to roll down or ride up. In this example, the first intermediate inclined surface portion 62f and the second intermediate inclined surface portion 62h have opposite inclination directions and have the same inclination angle, however the inclination angles can also be made different from each other. Further, in this example, the inclination angle of the gently inclined surface portion 62b is set to be smaller than the inclination angle of the first intermediate inclined surface portion 62f and the second intermediate inclined surface portion 62h, however the inclination angle of the gently inclined surface portion 62b and the inclination angle of the first intermediate inclined surface portion 62f and the second intermediate inclined surface portion 62h can also be made the same.

In this example, the arrangement order and orientation of the first flat surface portion 62a, gently inclined surface portion 62b, first bottom portion 62c, steeply inclined surface portion 62d, the second flat surface portion 62e, the first intermediate inclined surface portion 62f, the second bottom portion 62g and the second intermediate inclined surface portion 62h of the driven cam surface 62 are opposite of the arrangement order and orientation of the first flat surface portion 54a, gently inclined surface portion 54b, first bottom portion 54c, steeply inclined surface portion 54d, the second flat surface portion 54e, the first intermediate inclined surface portion 54f, the second bottom portion 54g and the second intermediate inclined surface portion 54h of the drive cam surface 54 in the circumferential direction. The dimension in the circumferential direction of the first flat surface portion 54a, the gently inclined surface portion 54b, the first bottom portion 54c, the steeply inclined surface portion 54d, the second flat surface portion 54e, the first intermediate inclined surface portion 54f, the second bottom portion 54g, and the second intermediate inclined surface portion 54h of the drive cam surface 54, and the dimension in the circumferential direction of the first flat surface portion 62a, the gently inclined surface portion 62b, the first bottom portion 62c, the steeply inclined surface portion 62d, the second flat surface portion 62e, the first intermediate inclined surface portion 62f, the second bottom portion 62g and the second intermediate inclined surface portion 62h of the driven cam surface 62 are set so that the connection/disconnection state of the friction engagement device 40 can be switched to an appropriate state according to the mode of the rotation transmission state switching device 41.

However, the driven cam surface 62 facing the drive cam surface 54 can also be configured by a flat surface perpendicular to the center axis.

The driven cam 51 has a driven-side female spline portion 63 on the inner circumferential surface, and is supported with respect to the housing 38 so as to only displace in the axial direction by spline-engaging the driven-side female spline portion 63 with the fixed side male spline portion 45 of the housing 38.

Each rolling element 64 is arranged between the drive cam surface 54 and the driven cam surface 62 so as to roll freely. In other words, in this example, the driven cam 51 displaces in the axial direction as the amount by which the rolling elements 64 ride up from the first bottom portion 54c or the second bottom portion 54g of the drive cam surface 54 and the amount by which the rolling elements 64 ride up from the first bottom portion 62c or the second bottom portion 62g of the driven cam surface 62 increase or decrease as the drive cam 50 rotates. In this example, although balls are used as the rolling elements 64, rollers or tapered rollers can also be used as the rolling elements.

Regarding each engagement pin 52, the end portion on the one side in the axial direction is fitted (engaged) into the cam-side engaging holes 56 of the drive cam 50 without any looseness, and the portion on the other side in the axial direction protrudes towards the other side in the axial direction from the surface on the other side in the axial direction of the drive cam 50.

Figure 8:
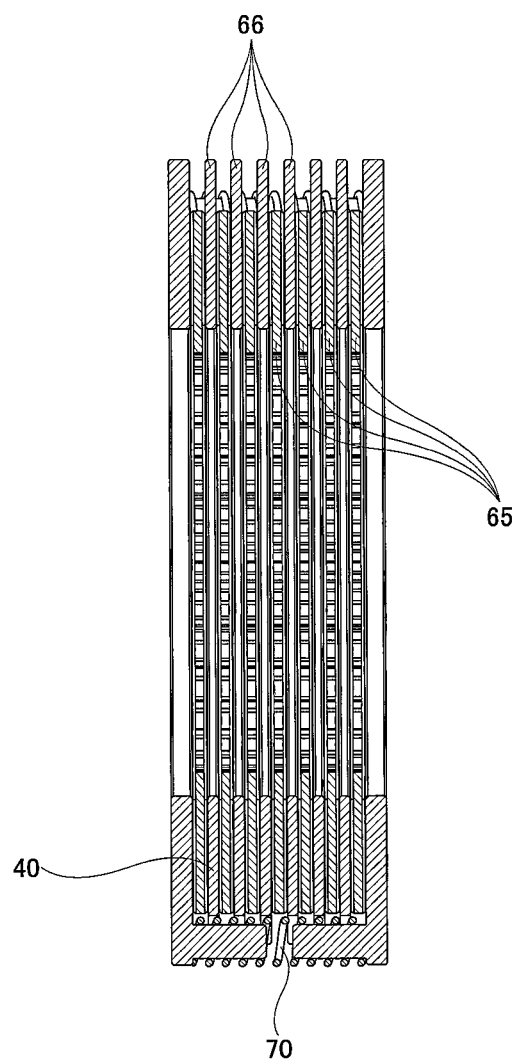
FIG. 8 is a cross-sectional view of a friction engagement device of the power transmission path switching device of the first example.

The friction engagement device 40 has at least one friction plate 65 and at least one separate plate 66 that are supported so as to displace relative to each other in the axial direction. The friction engagement device 40 is connected by pressing the friction plate 65 and the separate plate 66 against each other, and disconnected by releasing the force pressing the friction plate 65 and the separate plate 66 against each other. In this example, as illustrated in FIG. 5 and FIG. 8, the friction engagement device 40 has a plurality of friction plates 65 and a plurality of separate plates 66. Each friction plate 65 and each separate plate 66 have a substantially circular ring shape. The friction plates 65 and the separate plates 66 are arranged alternately in the axial direction.

Figures 9A, 9B, 9C, 9D:
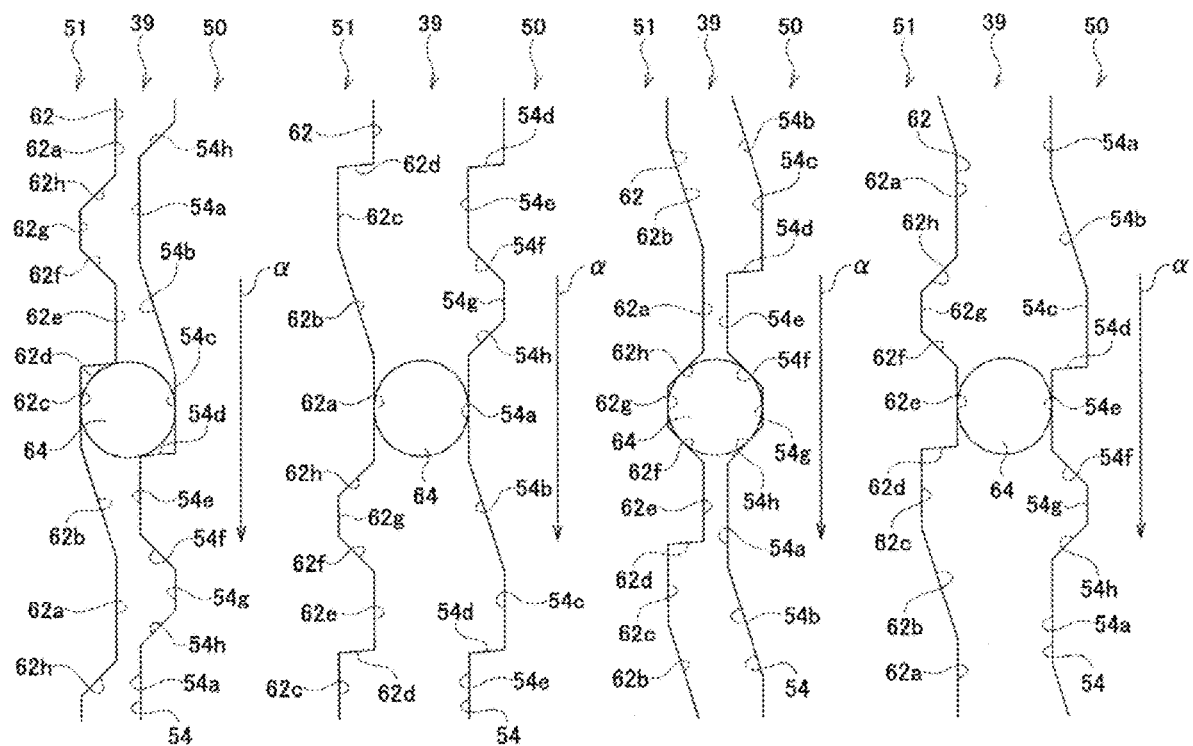
FIG. 9(A) trough FIG. 9(D) are schematic views of the cam device of the first example as viewed from the outside in the radial direction.
Figure 10A:
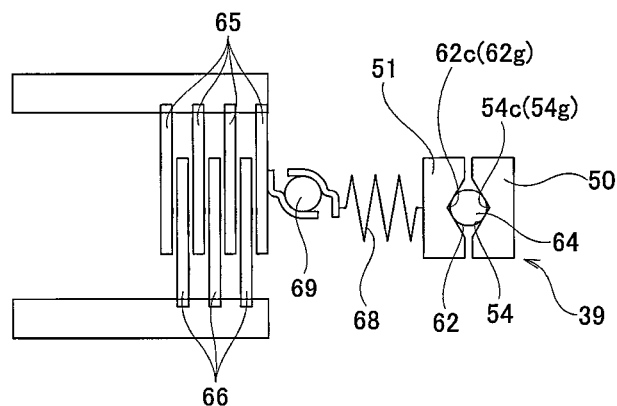
FIG. 10(A) is a schematic view of the friction engagement device and the cam device of the first example, illustrating a state where the friction engagement device is disconnected.
Figure 10B:
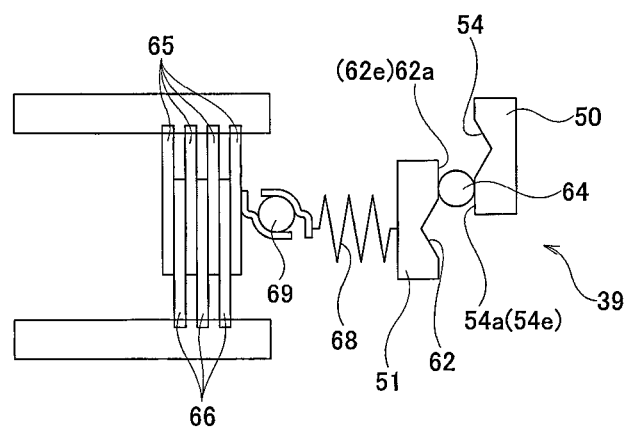
FIG. 10(B) is a schematic view of the friction engagement device and the cam device of the first example, illustrating a state where the friction engagement device is connected.
Figure 11:
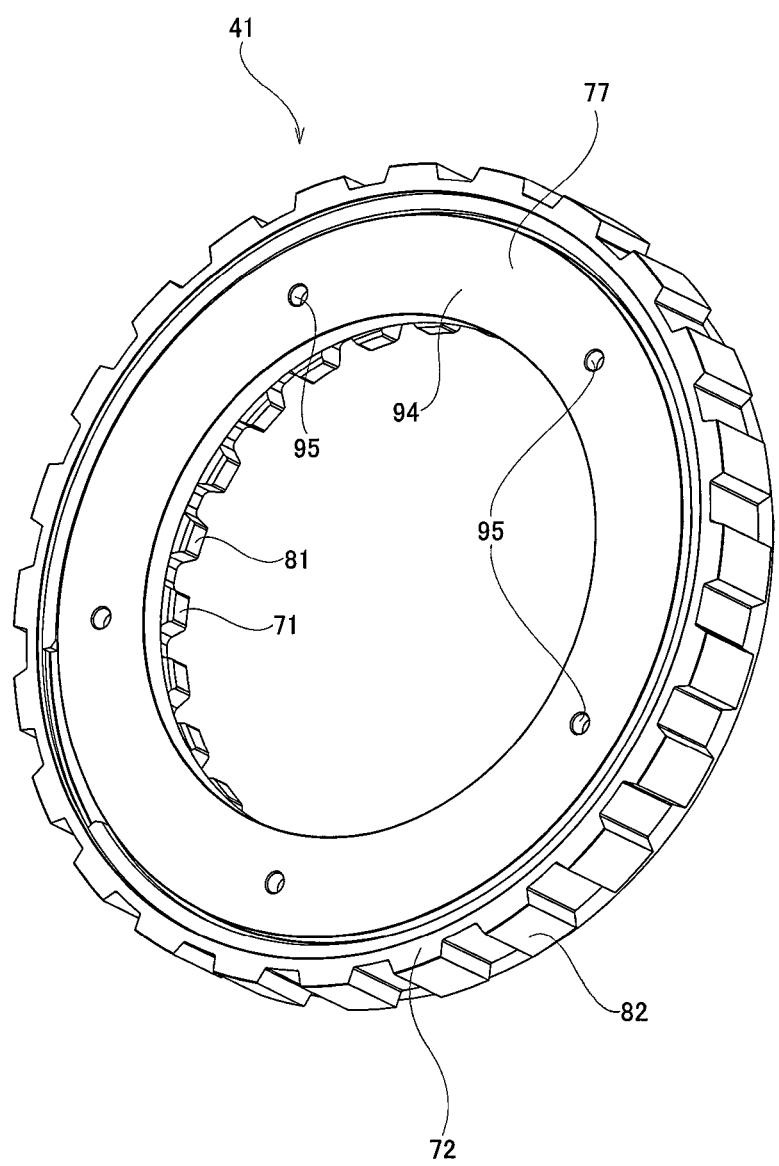
FIG. 11 is a perspective view of the rotation transmission state switching device of the first example as viewed from one side in the axial direction.

As illustrated in FIG. 9(B), FIG. 9(D), and FIG. 10(B), the friction engagement device 40 is connected by pressing the friction plate 65 and the separate plate 66 against each other by causing the rolling elements 64 of the cam device 39 to ride on the first flat surface portion 54a or the second flat surface portion 54e of the drive cam surface 54 and the first flat surface portion 62a or the second flat surface portion 62e of the driven cam surface 62 so as to cause the driven cam 51 displace in a direction in which the distance from the drive cam 50 in the axial direction increases. On the other hand, as illustrated in FIG. 9(A), FIG. 9(C), and FIG. 10(A), the friction engagement device 40 is disconnected by releasing the force pressing the friction plate 65 and the separate plate 66 against each other by causing the rolling elements 64 to move to the first bottom portion 54c or the second bottom portion 54g of the drive cam surface 54 and to the first bottom portion 62c or the second bottom portion 62g of the driven cam surface 62 so as to cause the driven cam 51 displace in a direction in which the distance from the drive cam 50 in the axial direction decreases.

In this example, the friction engagement device 40 is arranged between the sun gear 11 and the carrier 13. In other words, by connecting the friction engagement device 40, the sun gear 11 and the carrier 13, each of which is a rotating body, rotate integrally, and by disconnecting the friction engagement device 40, the sun gear 11 and the carrier 13 rotate relative to each other. In short, the friction engagement device 40 functions as a clutch that switches the mode (connection/disconnection state) of power transmission between the sun gear 11 and the carrier 13.

Each friction plate 65 has a female spline portion on the inner circumferential surface, and is supported with respect to the sun gear 11 by spline-engaging the female spline portion with the sun-side male spline portion 18 of the sun gear 11 so as to only displace in the axial direction.

Each separate plate 66 has a male spline portion on the outer circumferential surface, and is supported with respect to the carrier 13 by spline-engaging the male spline portion with the carrier-side female spline portion 29 of the carrier 13 so as to only displace in the axial direction.

Of the separate plates 66, the separate plate 66 that is located at the most other side in the axial direction is prevented from being displaced to the other side in the axial direction by the retaining ring 67 locked to the end portion on the other side in the axial direction of the cylindrical portion 27 of the carrier 13.

Between the separate plate 66, which is located at the most one side in the axial direction of the separate plates 66, and the driven cam 51, an elastic member 68 and a thrust rolling bearing 69 are held in order from the one side in the axial direction. The elastic member 68 elastically biases the friction engagement device 40 and the driven cam 51 in a direction away from each other in the axial direction. In this example, the elastic member 68 is configured by a disc spring. However, the elastic member 68 can also be configured by, for example, a coil spring.

As illustrated in FIG. 8, the friction engagement device 40 includes a return spring 70 that elastically biases the friction plate 65 and the separate plate 66 in a direction to separate the friction plate 65 and the separate plate 66 from each other and to release the force pressing them against each other. In this example, the return spring 70 spans between the separate plate 66 that is located at the most one side in the axial direction and the separate plate 66 that is located at the most other side in the axial direction, and elastically biases the separate plate 66 that is located at the most one side in the axial direction and the separate plate 66 that is located at the most other side in the axial direction in a direction away from each other.

In other words, the friction engagement device 40 is configured by a so-called normally open clutch that is disconnected in a state where the power supply to the electric actuator 58 is stopped in a stand-alone state, and is connected by increasing the distance in the axial direction between the drive cam 50 and the driven cam 51 based on energizing the electric actuator 58. However, in a state where the friction engagement device 40 is incorporated into the power transmission path switching device 5, the friction engagement device 40 is maintained in the connected state even after the power supply to the electric actuator 58 is stopped by providing the first flat surface portion 54a and the second flat surface portion 54e on the drive cam surface 54, and/or, by providing a self-lock function to the worm reducer which is configured by the wheel gear portion 57 of the drive cam 50 and the worm gear portion 61 of the worm 59.

The rotation transmission state switching device 41 has a first member 71 and a second member 72 that are coaxially arranged with each other. The rotation transmission state switching device 41 has at least a free mode in which rotation of the first member 71 relative to the second member 72 is allowed regardless of the direction of relative rotation between the first member 71 and the second member 72 and a lock mode in which rotation of the first member 71 relative to the second member 72 is prevented regardless of the direction of relative rotation between the first member 71 and the second member 72. Further, the rotation transmission state switching device may have a one-way clutch mode in which only rotation of the first member 71 in a predetermined direction relative to the second member 72 is allowed, and rotation of the first member 71 relative to the second member 72 in a direction opposite to the predetermined direction is prevented.

Further, one of the first member 71 and the second member 72 may have engaging concave portions 78 at a plurality of locations in the circumferential direction. In this case, the rotation transmission state switching device 41 may include a mode select portion having a protruding portion 96 that protrudes in the radial direction or axial direction respectively at a plurality of locations in the circumferential direction, a first pawl member 73 having a first base portion 89 pivotally supported by the other member of the first member 71 and the second member 72 and a first engaging pawl 90 extending from the first base portion 89 toward one side in the circumferential direction, a second pawl member 74 having a second base portion 92 pivotally supported by the other member of the first member 71 and the second member 72 and a second engaging pawl 93 extending from the second base portion 92 toward the other side in the circumferential direction, a first pawl biasing member 75 that elastically biases the first engaging pawl 90 in a direction so as to engage with the engaging concave portions 78, and a second pawl biasing member 76 that elastically biases the second engaging pawl 93 in a direction so as to engage with the engaging concave portions 78.

As illustrated in FIG. 11 through FIG. 14, in the rotation transmission state switching device 41 of this example, the first member 71 is provided with a engaging concave portions 78, and the second member 72 is provided with the first pawl member 73 and the second pawl member 74, and the first pawl biasing member 75 and the second pawl biasing member 76. Further, the mode select portion is configured by a select plate 77.

The first member 71 has the engaging concave portions 78 at a plurality of locations in the circumferential direction on the outer circumferential surface. In other words, the first member 71 has an gear-shaped uneven portion 80 on the outer circumferential surface, in which the engaging concave portions 78 and convex portions 79 are alternately arranged in the circumferential direction. Further, the first member 71 has a female spline portion 81 on the inner circumferential surface. The first member 71 is supported so as not to rotate relative to the ring gear 12 by spline-engaging the female spline portion 81 with the ring-side male spline portion 23 of the ring gear 12. In other words, the first member 71 rotates integrally with the ring gear 12.

The second member 72 is supported around the first member 71 so as to be coaxial with the first member 71 and so as to rotate relative to the first member 71. In other words, the inner circumferential surface of the second member 72 faces the outer circumferential surface of the first member 71 (the tip end surfaces of the convex portions 79) with a gap therebetween. The second member 72 has a male spline portion 82 on the outer circumferential surface. The second member 72 is supported so as not to rotate relative to the housing 38 by spline-engaging the male spline portion 82 with the fixed side female spline portion 46 of the housing 38.

The second member 72 includes a base portion 83 having a rectangular cross-sectional shape, and a cylindrical portion 84 that protrudes from the end portion on the outside in the radial direction of the surface on the one side in the axial direction of the base portion 83 toward the one side in the axial direction over the entire circumference.

The base portion 83 has a plurality of (six in the illustrated example) first holding concave portions 85 and a plurality of (six in the illustrated example) second holding concave portions 86 that are alternately arranged in the circumferential direction.

Each of the first holding concave portions 85 opens on the inner circumferential surface and the surface on the one side in the axial direction and the base portion 83. Each of the first holding concave portions 85 includes a spring holding portion 87*a* and a pedestal portion 88*a*. The spring holding portion 87*a* has a substantially rectangular opening shape with a long axis extending toward the outside in the radial direction toward the one side in the circumferential direction (the front side in the clockwise direction in FIG. 13) when viewed from the one side in the axial direction. The pedestal portion 88*a* has a substantially circular opening shape when viewed from the one side in the axial direction, and is arranged adjacent to the other side in the circumferential direction (the rear side in the clockwise direction in FIG. 13) of the spring holding portion 87*a*.

Each of the second holding concave portions 86 opens on the inner circumferential surface and the surface on the one side in the axial direction of the base portion 83. Each of the second holding concave portions 86 has a shape that is symmetrical to each of the first holding concave portions 85 with respect to a virtual plane that includes the center axis of the second member 72 when viewed from the one side in the axial direction. In other words, each of the second holding concave portions 86 includes a spring holding portion 87*b* and a pedestal portion 88*b*. The spring holding portion 87*b* has a substantially rectangular opening shape with a long axis extending toward the outside in the radial direction toward the other side in the circumferential direction when viewed from the one side in the axial direction. The pedestal portion 88*b* has a substantially circular opening shape when viewed from the one side in the axial direction, and is arranged adjacent to the one side in the circumferential direction of the spring holding portion 87*a*.

Each of the first pawl members 73 includes a first base portion 89 and a first engaging pawl 90.

The first base portion 89 has a substantially columnar shape, and is supported (pivotally supported) by the pedestal portion 88*a* of each of the first holding concave portions 85 so as to pivot about a pivot axis parallel to the center axis of the second member 72.

The first engaging pawl 90 has a substantially flat plate shape and extends from the first base portion 89 toward the one side in the circumferential direction. The first engaging pawl 90 has a portion on the one side in the axial direction facing (engaging with) the outer circumferential surface of the annular convex portion 91 of the select plate 77, and has a portion on the other side in the axial direction facing the uneven portion 80 (engaging with the uneven portion 80 so as to engaging with and disengaging from the engaging concave portions 78) of the first member 71.

Each of the second pawl members 74 includes a second base portion 92 and a second engaging pawl 93.

The second base portion 92 has a substantially columnar shape, and is supported by the pedestal portion 88*b* of the second holding concave portions 86 so as to pivot about a pivot axis parallel to the center axis of the second member 72.

The second engaging pawl 93 has a substantially flat plate shape and extends from the second base portion 92 toward the other side in the circumferential direction. The second engaging pawl 93 has a portion on the one side in the axial direction facing the outer circumferential surface of the annular convex portion 91 of the select plate 77, and has a portion on the other side in the axial direction facing the uneven portion 80 of the first member 71.

Each of the first pawl biasing members 75 elastically biases the first engaging pawl 90 of the first pawl member 73 in a direction so as to engage with the engaging concave portions 78 of the first member 71. In other words, the first pawl biasing member 75 applies a biasing force to the first pawl member 73 in a direction that causes the first pawl member 73 to pivot clockwise in FIG. 14 about the center axis (pivot axis) of the first base portion 89. Specifically, the first pawl biasing member 75 is configured by an elastic member such as a coil spring, and is held in an elastically compressed state between the bottom surface (the surface facing inside in the radial direction) of the spring holding portion 87a of the first holding concave portion 85 and the surface on the outside in the radial direction of the first engaging pawl 90.

Each of the second pawl biasing members 76 elastically biases the second engaging pawl 93 of the second pawl member 74 in a direction so as to engage with an engaging concave portion 78 of the first member 71. In other words, the second pawl biasing member 76 applies a biasing force to the second pawl members 74 in a direction that causes the second pawl member 74 to pivot counterclockwise in FIG. 14 about the center axis of the second base portion 92. Specifically, the second pawl biasing member 76 is configured by an elastic member such as a coil spring, and is held in an elastically compressed state between the bottom surface (the surface facing inside in the radial direction) of the spring holding portion 87b of the second holding concave portion 86 and the surface on the outside in the radial direction of the second engaging pawl 93.

Figure 12:
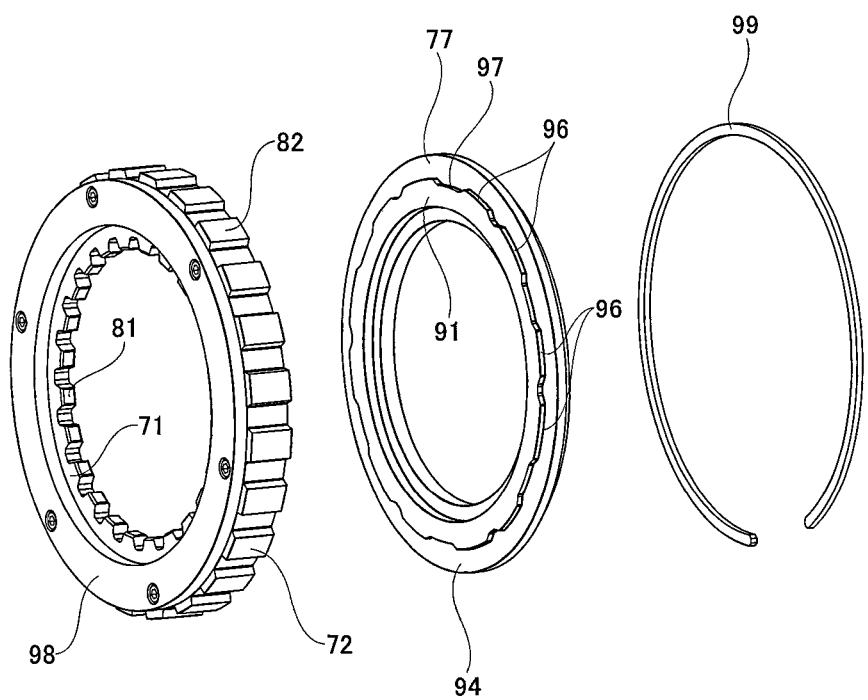
FIG. 12 is an exploded perspective view of the rotation transmission state switching device of the first example.
Figure 13:
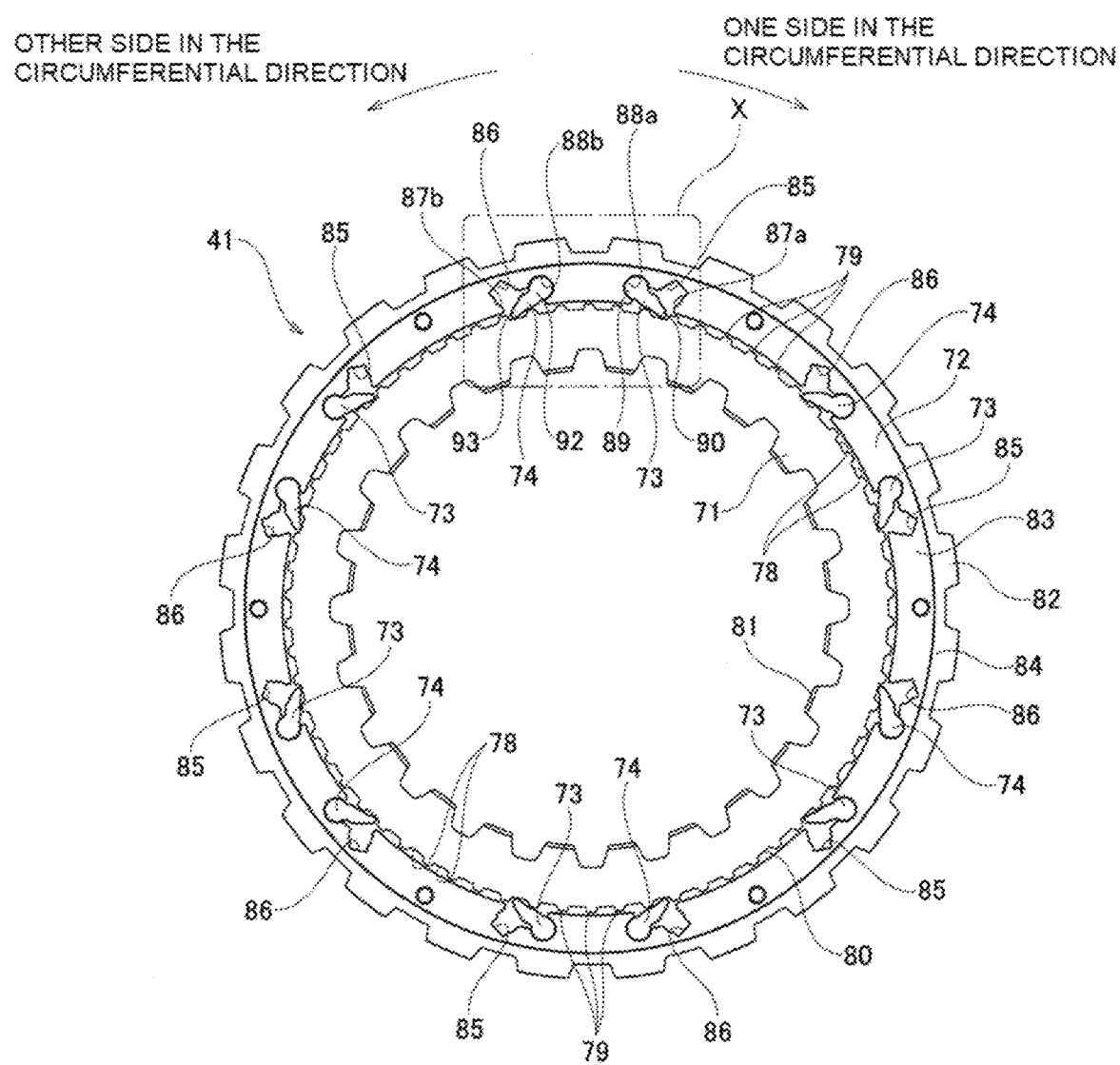
FIG. 13 is an end view of the rotation transmission state switching device of the first example as viewed from one side in the axial direction, with the select plate removed.
Figure 14:
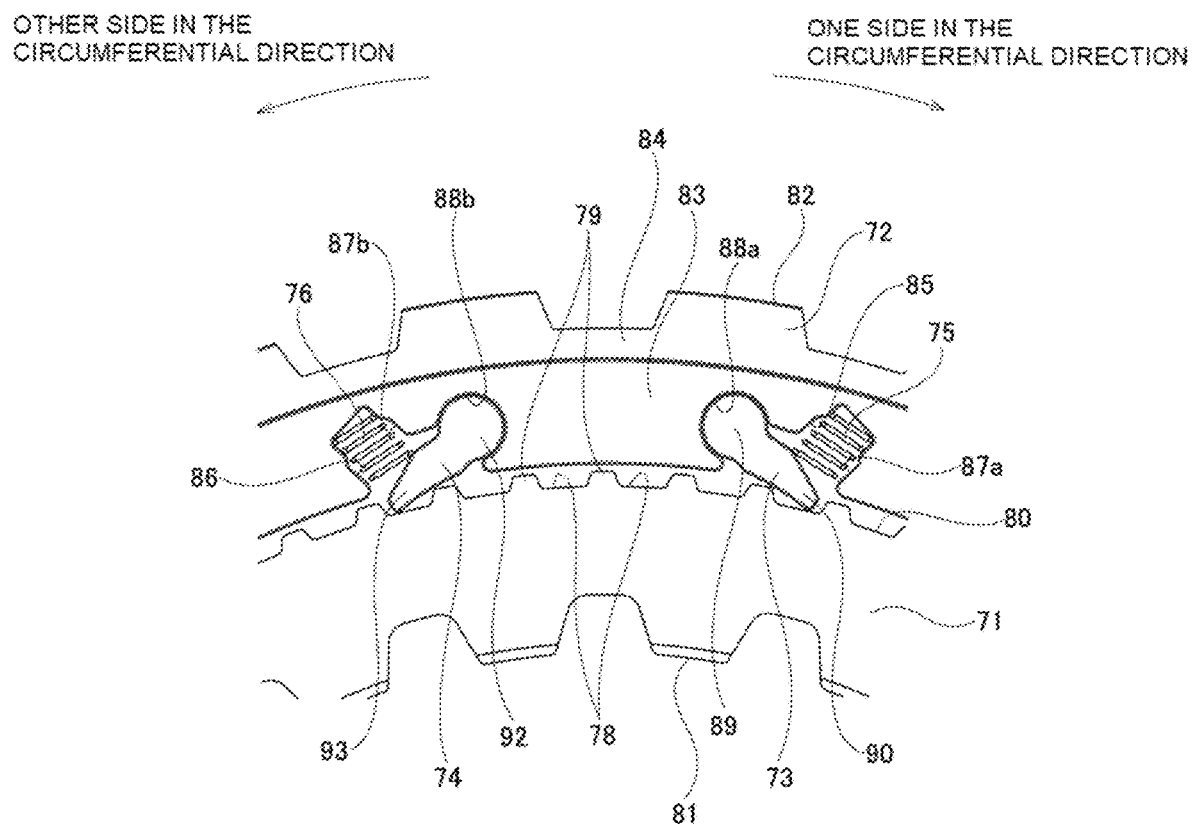
FIG. 14 is an enlarged view of part X in FIG. 13.

As illustrated in FIG. 12, the select plate 77 includes a substantially circular plate-shaped base portion 94 and an annular convex portion 91 that protrudes from the intermediate portion in the radial direction of a surface on the other side in the axial direction of the base portion 94 toward the other side in the axial direction over the entire circumference.

The base portion 94 has plate-side engaging holes 95 that open on the surface on the one side in the axial direction at a plurality of equally spaced locations in the circumferential direction (five locations in the illustrated example) of the intermediate portion in the radial direction. The end portion on the other side in the axial direction of an engagement pin 52 is fitted into each of the plate-side engaging holes 95 without any looseness. In other words, the select plate 77 rotates integrally with the drive cam 50 (in the same direction and at the same speed).

The annular convex portion 91 has protruding portions 96 that protrude toward the outside in the radial direction at a plurality of locations in the circumferential direction on the outer circumferential surface. In other words, the annular convex portion 91 has a gear-shaped uneven portion 97 on the outer circumferential surface, in which protruding portions 96 and and concave portions are alternately arranged in the circumferential direction. In this example, the protruding portions 96 configure protruding portions that protrude in the radial direction of the mode select portion. Alternatively, the annular convex portion 91 itself may be configured to have protruding portions that protrude toward the other side in the axial direction at a plurality of locations in the circumferential direction of the intermediate portion in the radial direction on the surface on the other side in the axial direction of the base portion 94 so as to be configured by a gear-shaped uneven portion in which protruding portions protruding toward the axial direction and concave portions are alternately arranged in the circumferential direction on the surface on the other side in the axial direction. Alternatively, the select plate 77 may be configured so as to move in the axial direction so that the position in the axial direction of the annular convex portion that protrudes toward the other side in the axial direction over the entire circumference from the intermediate portion in the radial direction of the surface on the other side in the axial direction of the base portion is displaced.

The first member 71, the second member 72, and the select plate 77 are combined by a cover 98 and a retaining ring 99 so as to relatively rotate and so as not to relatively displace in the axial direction (so as not to be inadvertently separated in the axial direction) to configure the rotation transmission state switching device 41.

In other words, in a state where the first member 71 is arranged on the inside in the radial direction of a portion on the other side in the axial direction of the base portion 83 of the second member 72, the circular ring shaped cover 98 is supported and fixed to the surface on the other side in the axial direction of the second member 72 by screwing so that the surface on the one side in the axial direction of the inside portion in the radial direction of the cover 98 faces the surface on the other side in the axial direction of the first member 71. As a result, the first member 71 is prevented from being displaced to the other side in the axial direction with respect to the second member 72.

The annular convex portion 91 of the select plate 77 is arranged inside in the radial direction of the portion on the one side in the axial direction of the base portion 83 of the second member 72, the tip end surface (surface on the other side in the axial direction) of the annular convex portion 91 is brought into sliding contact with or closely facing the surface on the one side in the axial direction of the first member 71, and in a state where the surface on the other side in the axial direction of the portion on the outside in the radial direction of the base portion 94 is brought into sliding contact with or closely facing the surface on the one side in the axial direction of the base portion 83 of the second member 72, the retaining ring 99 is locked to the end portion on the one side in the axial direction of the inner circumferential surface of the cylindrical portion 84 of the second member 72. As a result, the first member 71 and the select plate 77 are prevented from being displaced to the one side in the axial direction with respect to the second member 72.

In the rotation transmission state switching device 41 of this example, the second member 72 is supported and fixed to the housing 38 so as not to relatively rotate and displace in the axial direction. Specifically, the male spline portion 82 provided on the outer circumferential surface (the outer circumferential surface of the base portion 83 and the cylindrical portion 84) of the second member 72 is spline-engaged with the fixed side female spline portion 46 of the housing 38, and the second member 72 and the cover 98 are held from both sides in the axial direction by a pair of retaining ring 101a, 101b that are locked to the inner circumferential surface of the outer diameter side tubular portion 43 of the housing 38 (see FIG. 5).

The rotation transmission state switching device 41 of this example has a free mode in which the first member 71 and the second member 72 can rotate relative to each other in both directions, a lock mode in which the first member 71 and the second member 72 cannot rotate relative to each other, and a one-way clutch mode in which only rotation of the first member 71 in a predetermined direction relative to the second member 72 is allowed. More specifically, the rotation transmission state switching device 41 is configured so as to switch the free mode, the lock mode, and the one-way clutch mode by switching the engagement state between the first engaging pawl 90 of the first pawl member 73 and the engaging concave portions 78 of the first member 71, and the engagement state between the second engaging pawl 93 of the second pawl member 74 and the engaging concave portions 78, based on the rotation of the select plate 77.

<Free Mode>

Figure 15A:
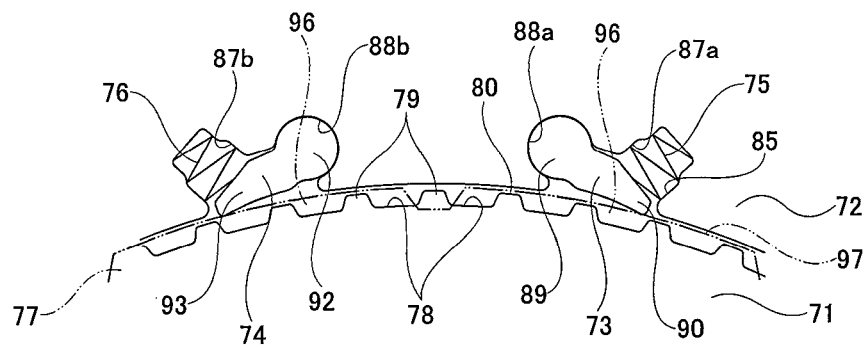
FIG. 15(A) is a schematic view of the rotation transmission state switching device of the first example, illustrating the engagement relationship between a first engaging pawl and a second engaging pawl, engaging concave portions, and a protruding portion in the free mode.

In the free mode, the first engaging pawl 90 and the second engaging pawl 93 are pressed by the protruding portion 96 so that they do not engage with the engaging concave portions 78, thereby allowing the rotation of the first member 71 with respect to the second member 72 regardless of the direction of relative rotation between the first member 71 and the second member 72. More specifically, the phase in the circumferential direction of the select plate 77 with respect to the second member 72 is adjusted, and as illustrated in FIG. 15(A), the protruding portion 96 pushes the first engaging pawl 90 toward outside in the radial direction against the elasticity of the first pawl biasing member 75 as well as the second engaging pawl 93 toward outside in the radial direction against the elasticity of the second pawl biasing member 76. As a result, the engaging concave portions 78 of the first member 71 are disengaged from the first engaging pawl 90 and the second engaging pawl 93. In this state, rotation of the first member 71 with respect to the second member 72 is allowed regardless of the direction of relative rotation between the first member 71 and the second member 72. In other words, rotation of the first member 71 with respect to the housing 38 is allowed regardless of the direction of rotation of the first member 71. Further, rotation of the ring gear 12 with respect to the housing 38 is allowed regardless of the direction of rotation of the ring gear 12.

<Lock Mode>

Figure 15B:
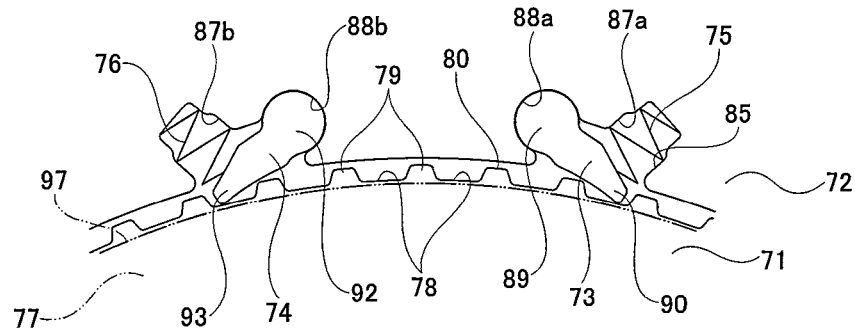
FIG. 15(B) is a schematic view illustrating the engagement relationship in the lock mode.

In the lock mode, the first engaging pawl 90 and the second engaging pawl 93 are engaged with the engaging concave portions 78 without being pressed by the protruding portion 96, so that rotation of the first member 71 with respect to the second member 72 is prevented regardless of the direction of relative rotation between the first member 71 and the second member 72. More specifically, the phase in the circumferential direction of the select plate 77 with respect to the second member 72 is adjusted, and as illustrated in FIG. 15(B), the protruding portion 96 is located in portions separated from the first engaging pawl 90 of the first pawl member 73 and the second engaging pawl 93 of the second pawl member 74 in the circumferential direction. In other words, the concave portions of the uneven portion 97 and the first engaging pawl 90 and the second engaging pawl 93 are aligned in phase in the circumferential direction. As a result, the engaging concave portions 78 of the first member 71 engage with the first engaging pawl 90 and the second engaging pawl 93. In this state, regardless of the direction of relative rotation between the first member 71 and the second member 72, rotation of the first member 71 with respect to the second member 72 is prevented. In other words, regardless of the direction of rotation of the first member 71, rotation of the first member 71 with respect to the housing 38 is prevented.

<One-Way Clutch Mode>

In the one-way clutch mode, based on rotation or displacement in the axial direction of the mode select portion, one of the first engaging pawl 90 and the second engaging pawl 93 engages with the engaging concave portion 78 without being pressed by the protruding portion 96, and by pressing the other of the first engaging pawl 90 and the second engaging pawl 93 by the protruding portion 96 so as not to engage with the engaging concave portions 78, only rotation of the first member 71 in a predetermined direction relative to the second member 72 is allowed and rotation of the first member 71 relative to the second member 72 in a direction opposite to the predetermined direction is prevented.

Figure 15C:
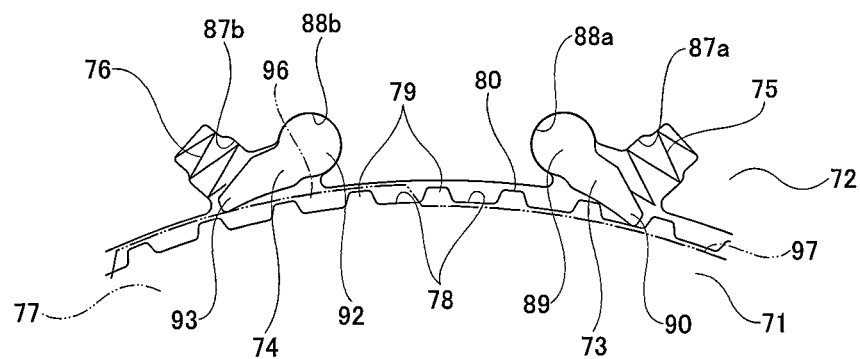
FIG. 15(C) is a schematic view illustrating the engagement relationship in the one-way clutch mode.

More specifically; the phase in the circumferential direction of the select plate 77 with respect to the second member 72 is adjusted, and as illustrated in FIG. 15(C), the protruding portion 96 pushes only the second engaging pawl 93 toward outside in the radial direction against the elasticity of the second pawl biasing member 76. As a result, the engaging concave portion 78 of the first member 71 and the first engaging pawl 90 engage, and the engaging concave portions 78 and the second engaging pawls 93 disengage. In this state, only rotation of the first member 71 in a predetermined direction (clockwise direction in FIG. 15(C)) with respect to the second member 72 is allowed, and rotation in a direction opposite to the predetermined direction (counterclockwise direction in FIG. 15(C)) is prevented.

In other words, when the first member 71 tries to rotate in a predetermined direction with respect to the second member 72, the first engaging pawl 90 is pushed toward outside in the radial direction against the elasticity of the first pawl biasing members 75 by the convex portion 79 of the uneven portion 80. As a result, rotation of the first member 71 in a predetermined direction is allowed. On the other hand, when the first member 71 tries to rotate in a direction opposite to the predetermined direction with respect to the second member 72, rotation of the first member 71 in a direction opposite to the predetermined direction is prevented due to the engagement between the engaging concave portion 78 and the first engaging pawl 90. In short, the rotation transmission state switching device 41 functions as a ratchet type one-way clutch.

Here, the predetermined direction coincides with the normal rotation direction of the input member 2. The normal rotation direction of the input member 2 refers to the direction of rotation of the input member 2 when moving the automobile forward.

The power transmission path switching device 5 of this example switches the operation mode thereof by displacing the driven cam 51 in the axial direction based on rotationally driving the drive cam 50 by the electric actuator 58 so as to switch the connection/disconnection state of the friction engagement device 40, and, at the same time, by adjusting the phase of the select plate 77 in the circumferential direction with respect to the second member 72 so as to switch the mode of the rotation transmission state switching device 41. The power transmission path switching device 5 includes a first mode in which the friction engagement device 40 is connected and the rotation transmission state switching device 41 is in the free mode, a second mode in which the friction engagement device 40 is disconnected and the rotation transmission state switching device 41 is in the lock mode, a third mode which is established during switching of the friction engagement device 40 from the disconnected state to the connected state and the rotation transmission state switching device 41 is set to the one-way clutch mode, a fourth mode in which the friction engagement device 40 is disconnected and the rotation transmission state switching device 41 is set to the free mode, and a fifth mode in which the friction engagement device 40 is connected and the rotation transmission state switching device 41 is set to the lock mode. In the following, each mode will be explained.

<First Mode>

To switch the power transmission path switching device 5 to the first mode, the friction engagement device 40 is connected and the rotation transmission state switching device 41 is set to the free mode based on rotationally driving the drive cam 50 by the electric actuator 58.

In other words, as illustrated in FIG. 9(B), based on the rotation of the drive cam 50, the rolling elements 64 are caused to ride on the first flat surface portion 54a of the drive cam surface 54 and the first flat surface portion 62a of the driven cam surface 62 and the driven cam 51 is displaced toward a direction (the other side in the axial direction) in which the distance from the drive cam 50 in the axial direction increases. As a result, the separate plate 66 that is located at the most one side in the axial direction is pressed toward the other side in the axial direction through the elastic member 68 and the thrust rolling bearing 69. As a result, the friction plate 65 and the separate plate 66 are pressed against each other and the friction engagement device 40 is connected (the fastening force of the friction engagement device 40 increases), so that the sun gear 11 and the carrier 13 begin to rotate integrally.

As described above, at the same time of connecting the friction engagement device 40, based on adjusting the phase of the select plate 77 in the circumferential direction with respect to the second member 72, as illustrated in FIG. 15(A), the first engaging pawl 90 is pushed toward outside in the radial direction and the second engaging pawl 93 is pushed toward outside in the radial direction by the protruding portion 96. As a result, the engaging concave portions 78 of the first member 71 disengage from the first engaging pawl 90 and the second engaging pawl 93, and the rotation transmission state switching device 41 is switched to the free mode in which rotation of the first member 71 relative to the second member 72 is allowed regardless of the direction of relative rotation between the first member 71 and the second member 72.

<Second Mode>

To switch the power transmission path switching device 5 to the second mode, the friction engagement device 40 is disconnected and the rotation transmission state switching device 41 is set to the lock mode based on rotationally driving the drive cam 50 by the electric actuator 58.

In other words, based on the rotation of the drive cam 50, as illustrated in FIG. 9(A), the driven cam 51 is displaced toward a direction (the one side in the axial direction) in which the distance in the axial direction from the drive cam 50 is shortened by moving the rolling elements 64 to the first bottom portion 54c of the drive cam surface 54 and the first bottom portion 62c of the driven cam surface 62. As a result, the force pressing the friction plate 65 and the separate plate 66 against each other is released. As a result, due to the action of the return spring 70, the distance between the separate plate 66 that is located at the most one side in the axial direction and the separate plate 66 that is located at the most other side in the axial direction increases, and the friction engagement device 40 is disconnected (the fastening force of the friction engagement device 40 is lost).

As described above, at the same time of disconnecting the friction engagement device 40, based on adjusting the phase of the select plate 77 in the circumferential direction with respect to the second member 72, as illustrated in FIG. 15(B), the protruding portion 96 is located in a portion separated from the first engaging pawl 90 of the first pawl member 73 and the second engaging pawl 93 of the second pawl member 74 in the circumferential direction. As a result, the engaging concave portions 78 of the first member 71 engage with the first engaging pawl 90 and the second engaging pawl 93, and the rotation transmission state switching device 41 is switched to the lock mode in which rotation of the first member 71 relative to the second member 72 is prevented regardless of the direction of relative rotation between the first member 71 and the second member 72.

<Third Mode>

The power transmission path switching device 5 of this example is configured to be switched to the third mode during switching from the second mode to the first mode. In other words, in this example, the control device may have a function to set the rotation transmission state switching device 41 to the one-way clutch mode during switching of the friction engagement device 40 from the disconnected state to the connected state.

More specifically, during switching of the friction engagement device 40 from the disconnected state to the connected state, based on the rotation of the drive cam 50, as illustrated from FIG. 9(A) to FIG. 9(B), the rolling elements 64 move up the gently inclined surface portion 54b of the drive cam surface 54 and the gently inclined surface portion 62b of the driven cam surface 62. Then, as the amount by which the rolling elements 64 ride up from the first bottom portion 54c of the drive cam surface 54 and the amount by which the rolling elements 64 ride up from the first bottom portion 62c of the driven cam surface 62 gradually increases, the force pressing the friction plate 65 and the separate plate 66 against each other gradually increases (the fastening force of the friction engagement device 40 gradually increases). At this time, the friction plate 65 and the separate plate 66 rotate in the same direction while sliding (brought into sliding contact) both side surfaces in the axial direction of the friction plates 65 and both side surfaces in the axial direction of the separate plates 66, and gradually become synchronized (rotation speed gradually matches).

In the power transmission path switching device 5 of this example, based on the rotation of the drive cam 50, the rotation transmission state switching device 41 is configured to be switched to the one-way clutch mode before the friction engagement device 40 is beginning to be switched from the disconnected state to the connected state, in other words, before the force pressing the friction plate 65 and the separate plate 66 against each other begins to increase. To switch the rotation transmission state switching device 41 to the one-way clutch mode, as illustrated in FIG. 15(C), only the second engaging pawl 93 is pushed toward outside in the radial direction against the elasticity of the second pawl biasing member 76 by the protruding portion 96. As a result, only the first engaging pawl 90 engages with the engaging concave portions 78 of the first member 71, and the rotation transmission state switching device 41 allows only rotation of the first member 71 in a predetermined direction (predetermined direction in FIG. 15(C)) with respect to the second member 72 and prevents rotation of the first member 71 in a direction opposite to the predetermined direction.

In this example, based on the rotation of the drive cam 50, at the same time as the mode switching of the rotation transmission state switching device 41 to the one-way clutch mode is completed, the power transmission path switching device 5 is switched to the third mode by starting to switch the friction engagement device 40 from the disconnected state to the connected state.

In this example, in a state where the power transmission path switching device 5 is switched to the third mode, based on the rotation of the drive cam 50, at the same time as the connection of the friction engagement device 40 is completed, switching of the rotation transmission state switching device 41 from the one-way clutch mode to the free mode is started.

<Fourth Mode>

To switch the power transmission path switching device 5 of this example to the fourth mode, the friction engagement device 40 is disconnected and the rotation transmission state switching device 41 is set to the free mode based on rotationally driving the drive cam 50 by the electric actuator 58.

In other words, based on the rotation of the drive cam 50, as illustrated in FIG. 9(C), by moving the rolling elements 64 to the second bottom portion 54g of the drive cam surface 54 and the second bottom portion 62g of the driven cam surface 62, the driven cam 51 is displaced toward a direction (the one side in the axial direction) in which the distance in the axial direction from the drive cam 50 is shortened. As a result, the force pressing the friction plate 65 and the separate plate 66 against each other is released. As a result, due to the action of the return spring 70, the distance between the separate plate 66 that is located at the most one side in the axial direction and the separate plate 66 that is located at the most other side in the axial direction increases, and the friction engagement device 40 is disconnected (the fastening force of the friction engagement device 40 is lost).

As described above, at the same time of disconnecting the friction engagement device 40, based on adjusting the phase of the select plate 77 in the circumferential direction with respect to the second member 72, as illustrated in FIG. 15(A), the first engaging pawl 90 is pushed toward outside in the radial direction and the second engaging pawl 93 is pushed toward outside in the radial direction by the protruding portion 96. As a result, the engaging concave portions 78 of the first member 71 are disengaged from the first engaging pawl 90 and the second engaging pawl 93, and the rotation transmission state switching device 41 is switched to the free mode in which rotation of the first member 71 relative to the second member 72 is allowed regardless of the direction of relative rotation between the first member 71 and the second member 72.

<Fifth Mode>

To switch the power transmission path switching device 5 to the fifth mode, the friction engagement device 40 is connected and the rotation transmission state switching device 41 is set to the lock mode based on rotationally driving the drive cam 50 by the electric actuator 58.

In other words, based on the rotation of the drive cam 50, as illustrated in FIG. 9(D), the rolling elements 64 are moved to the second flat surface portion 54e of the drive cam surface 54 and the second flat surface portion 62e of the driven cam surface 62 and the driven cam 51 is displaced toward a direction (the other side in the axial direction) in which the distance from the drive cam 50 in the axial direction increases. As a result, the friction plate 65 and the separate plate 66 are pressed against each other so as to press the separate plate 66 that is located at the most one side in the axial direction toward the other side in the axial direction through the elastic member 68 and the thrust rolling bearing 69. As a result, by pressing the friction plate 65 and the separate plate 66 against each other, the friction engagement device 40 is connected and rotation of the sun gear 11 relative to the carrier 13 is prevented.

As described above, at the same time of connecting the friction engagement device 40, based on adjusting the phase of the select plate 77 in the circumferential direction with respect to the second member 72, as illustrated in FIG. 15(B), the protruding portion 96 is located in a portion separated from the first engaging pawl 90 of the first pawl member 73 and the second engaging pawl 93 of the second pawl member 74 in the circumferential direction. As a result, the engaging concave portions 78 of the first member 71 engage with the first engaging pawl 90 and the second engaging pawl 93, and the rotation transmission state switching device 41 is switched to the lock mode in which rotation of the first member 71 relative to the second member 72 is prevented regardless of the direction of relative rotation between the first member 71 and the second member 72.

Figure 16:
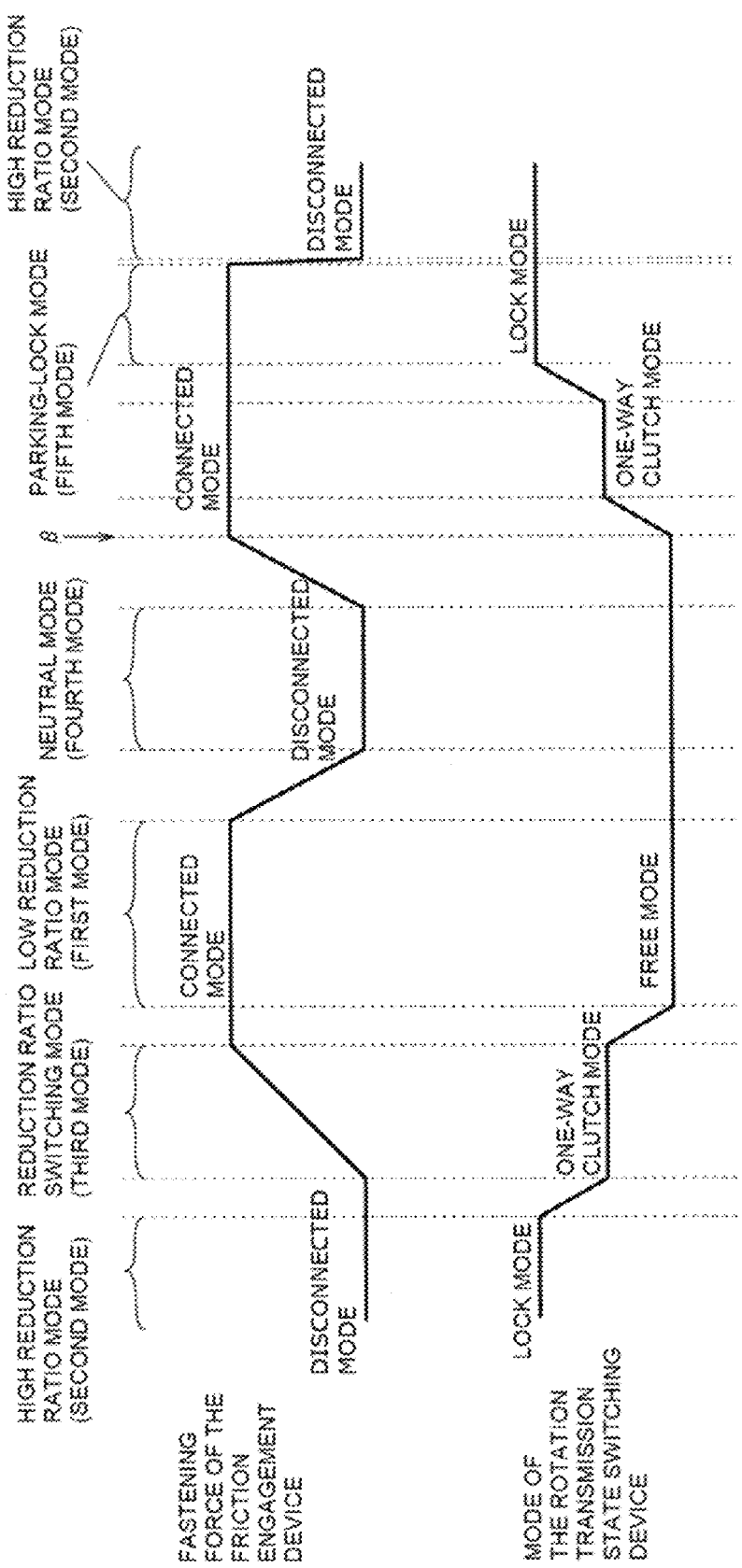
FIG. 16 is a graph schematically illustrating the connection/disconnection state of the friction engagement device and the mode of the rotation transmission state switching device, in the two-speed transmission of the first example.

In the two-speed transmission 1 of this example, by switching the operation mode of the power transmission path switching device 5, as illustrated in FIG. 16, it is possible to switch between a low reduction ratio mode in which the reduction ratio between the input member 2 and the output member 3 is small (the reduction ratio is 1) and a high reduction ratio mode in which the reduction ratio is larger than the low reduction ratio mode. Further, the two-speed transmission 1 goes through the reduction ratio switching mode during switching from the high reduction ratio mode to the low reduction ratio mode. Further, the two-speed transmission 1 can be switched to the neutral mode in which torque is not transmitted between the input member 2 and the output member 3 and the parking lock mode in which the rotation of the output member 3 is locked. In the following, each case will be explained.

<Low Reduction Ratio Mode>

Figure 4A:
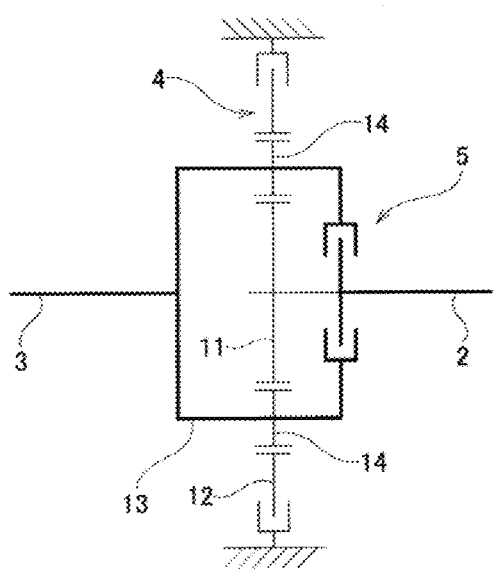
FIG. 4(A) is a schematic view illustrating a transmission path of power in a low reduction ratio mode in the two-speed transmission of the first example.

To switch the two-speed transmission 1 to the low reduction ratio mode, based on rotationally driving the drive cam 50 by the electric actuator 58, the power transmission path switching device 5 is switched to the first mode in which the friction engagement device 40 is connected and the rotation transmission state switching device 41 is in the free mode. When the power transmission path switching device 5 is switched to the first mode, as illustrated in FIG. 4(A), the sun gear 11 and the carrier 13 rotate integrally based on the friction engagement device 40 being connected, and the rotation of the ring gear 12 with respect to the housing 38 is allowed based on the rotation transmission state switching device 41 being switched to the free mode. In such a low reduction ratio mode, the direction of rotation and the rotation speed of the sun gear 11, the ring gear 12, and the carrier 13 are the same, and the entire planetary gear mechanism 4 rotates as one, in other words, it is in a so-called glued state. Therefore, the power of the input member 2 is transmitted to the output member 3 through via a path passing through the input member 2, the carrier 13, and the output member 3 in this order.

In this way, in the low reduction ratio mode, the power of the input member 2 is transmitted to the output member 3 without being decelerated. In other words, in the low reduction ratio mode, reduction ratio between the input member 2 and the output member 3 is 1.

<High Reduction Ratio Mode>

Figure 4B:
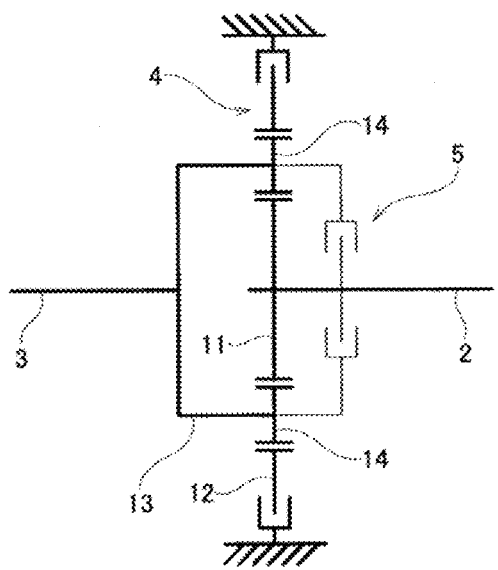
FIG. 4(B) is a schematic view illustrating a transmission path of power in a high reduction ratio mode in the two-speed transmission of the first example.

To switch the two-speed transmission 1 to the high reduction ratio mode, based on rotationally driving the drive cam 50 by the electric actuator 58, the power transmission path switching device 5 is switched to the second mode in which the friction engagement device 40 is disconnected and the rotation transmission state switching device 41 is in the lock mode. When the power transmission path switching device 5 is switched to the second mode, as illustrated in FIG. 4(B), the sun gear 11 and the carrier 13 become capable of relative rotation based on the friction engagement device 40 being disconnected, and rotation of the ring gear 12 with respect to the housing 38 is prevented based on the rotation transmission state switching device 41 being switched to the lock mode. In such a high reduction ratio mode, the power of the input member 2 is transmitted to the output member 3 via a path passing through the input member 2, the sun gear 11, the pinion gears 14 that rotate on their axis, the pinion gears 14 that revolve based on engagement with the ring gear 12, the carrier 13, and the output member 3 in this order.

In this way, in the high reduction ratio mode, the power of the input member 2 is decelerated by the planetary gear mechanism 4 and transmitted to the output member 3. In the high reduction ratio mode, the reduction ratio between the input member 2 and the output member 3 is determined by the gear ratio between the ring gear 12 and the sun gear 11 (the number of teeth of the gear portion 24 of the ring gear 12/the number of teeth of the gear portion 19 of the sun gear 11).

Figure 32:
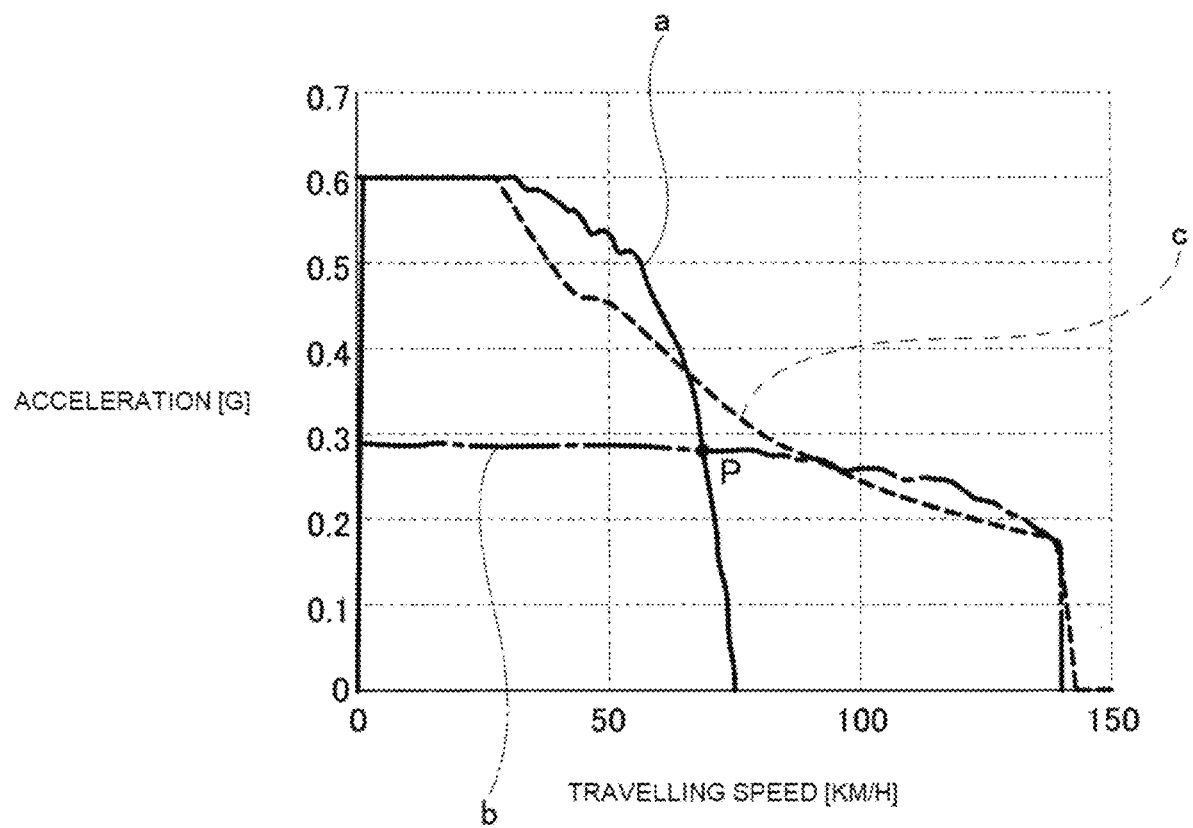
FIG. 32 is a graph for explaining the effect of incorporating a transmission into a drive device using an electric motor as a driving source.

As described above, in the two-speed transmission 1 of this example, the operation mode of the power transmission path switching device 5 is switched based on rotationally driving one drive cam 50 by one electric actuator 58, in other words, by switching the connection/disconnection state of the friction engagement device 40 and the mode of the rotation transmission state switching device 41, the reduction ratio between the input member 2 and the output member 3 can be switched to two levels, high and low. Specifically, for example, the two-speed transmission 1 is switched to the high reduction ratio mode when the power input to the input member 2 is in a low speed and in a high torque region, and is switched to the low reduction ratio mode in a high speed and in a low torque region. Therefore, acceleration and high-speed performance when an electric vehicle or a hybrid vehicle travels with only an electric motor as a driving source can be made similar to that of a gasoline engine vehicle indicated by the dashed line c in FIG. 32, which is a characteristic of continuing the left side portion of point P in the solid line a and the right side portion of point P in the chain line b in aforementioned FIG. 32.

In particular, in the power transmission path switching device 5 of this example, the connection/disconnection state of the friction engagement device 40 and the mode of the rotation transmission state switching device 41 is switched based on energizing the variable speed motor 60 of the electric actuator 58 and rotating the drive cam 50 through the worm 59. In other words, in the power transmission path switching device 5 of this example, no hydraulic system is required to control the frictional engagement devices such as clutches and brakes. Therefore, in electric and hybrid vehicles, it is possible to simplify the system, reduce costs, and improve electricity consumption performance.

The power transmission path switching device 5 of this example is configured to rotate the select plate 77 by rotating the drive cam 50 by one electric actuator 58 (variable speed motor 60) so as to switch the connection/disconnection state of the friction engagement device 40 and the mode of the rotation transmission state switching device 41. However, in a case of implementing the power transmission path switching device of the present disclosure, switching the connection/disconnection state of the friction engagement device and switching the mode of the rotation transmission state switching device can also be done by separate actuators.

<Reduction Ratio Switching Mode>

When the input member 2 is rotating in the normal rotation direction, the two-speed transmission 1 of this example is switched to the reduction ratio switching mode during switching from the high reduction ratio mode to the low reduction ratio mode by setting the power transmission path switching device 5 to the third mode.

In the reduction ratio switching mode, based on the rotation transmission state switching device 41 being switched to the one-way clutch mode, rotation of the ring gear 12 only in a predetermined direction with respire to the housing 38 is allowed, and rotation in a direction opposite to the predetermined direction is prevented.

Further, in the reduction ratio switching mode, the rotation of the sun gear 11 and the rotation of the carrier 13 gradually become synchronized based on the gradual increase in the fastening force of the friction engagement device 40. When the fastening force of the friction engagement device 40 gradually increases and the rotation of the sun gear 11 and the rotation of the carrier 13 gradually become synchronized while the input member 2 rotates in the normal rotation direction, the torque applied to the second member 72 of the rotation transmission state switching device 41 in a direction opposite to the predetermined direction gradually decreases. Since the rotation transmission state switching device 41 is switched to the one-way clutch mode in the reduction ratio switching mode, the second member 72 does not rotate even if torque is applied to the second member 72 in a direction opposite to the predetermined direction.

After the torque applied to the second member 72 in a direction opposite to the predetermined direction gradually decreases to zero, when the direction of the torque applied to the second member 72 is reversed (torque in a predetermined direction is applied to second member 72), at that moment, rotation of the second member 72 in a predetermined direction is allowed. Therefore, with the two-speed transmission 1 of this example, torque loss in the two-speed transmission 1 can be suppressed while suppressing shift shock caused by mode switching. The reason for this will be explained with reference to FIG. 17 and FIG. 18.

Figure 17:
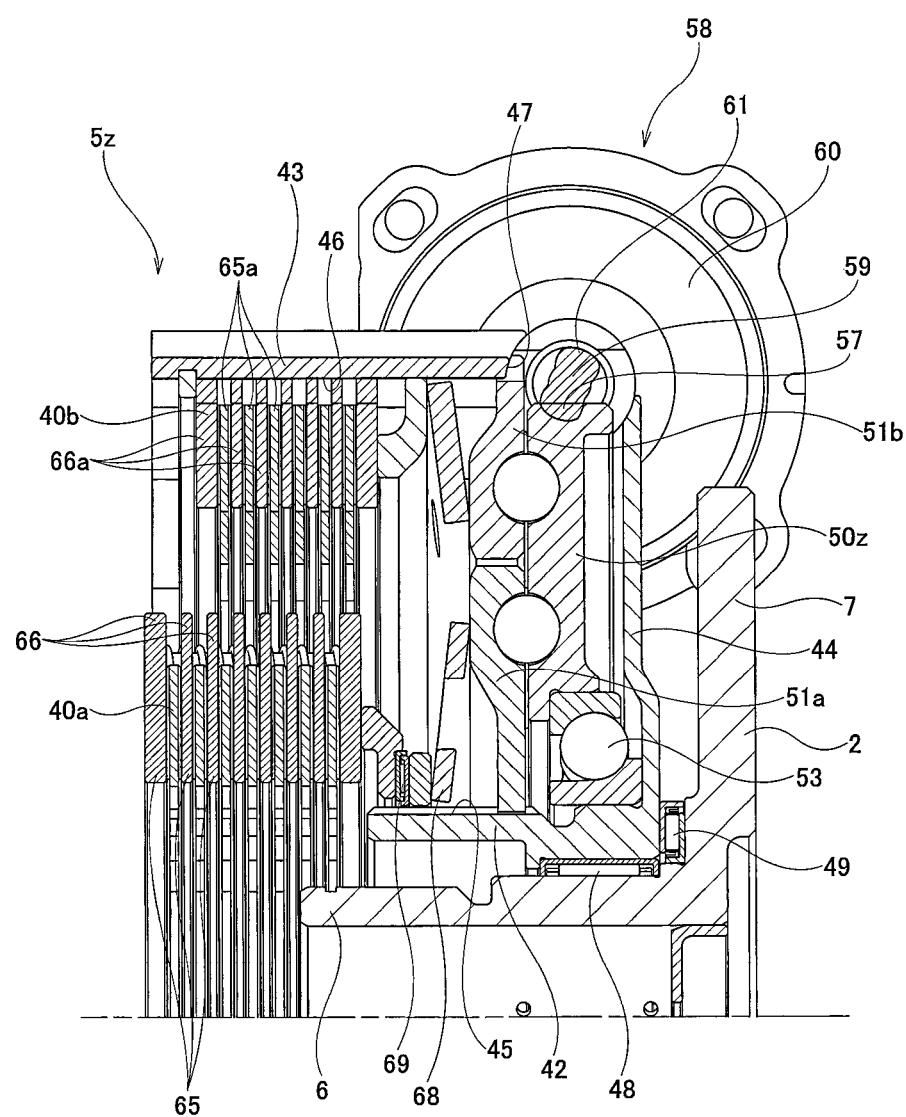
FIG. 17 is a cross-sectional view illustrating a power transmission path switching device of a comparative example.

FIG. 17 illustrates a power transmission path switching device 5z of a comparative example. The power transmission path switching device 5z includes a first friction engagement device 40a that switches between a state in which the sun gear 11 and the carrier 13 can rotate relative to each other and a state in which they cannot rotate relative to each other, and a second friction engagement device 40b that switches between a state in which the ring gear 12 can rotate and a state in which it cannot rotate. In other words, in place of the rotation transmission state switching device 41 of the power transmission path switching device 5 of this example, the power transmission path switching device 5z of the comparative example employs a second friction engagement device 40b that switches the connection/disconnection state by pressing or separating the friction plate 65a and the separate plate 66a.

Based on rotationally driving the drive cam 50z of the cam device 39z by an electric actuator and displacing the first driven cam 51a and the second driven cam 51b in the axial direction, the power transmission path switching device 5z of the comparative example switches the connection/disconnection states of the first friction engagement device 40a and the second friction engagement device 40b. The first driven cam 51a and the second driven cam 51b are displaced in different phases as the drive cam 50z rotates (displaced (move forward and backward) in opposite directions in the axial direction).

Figure 18:
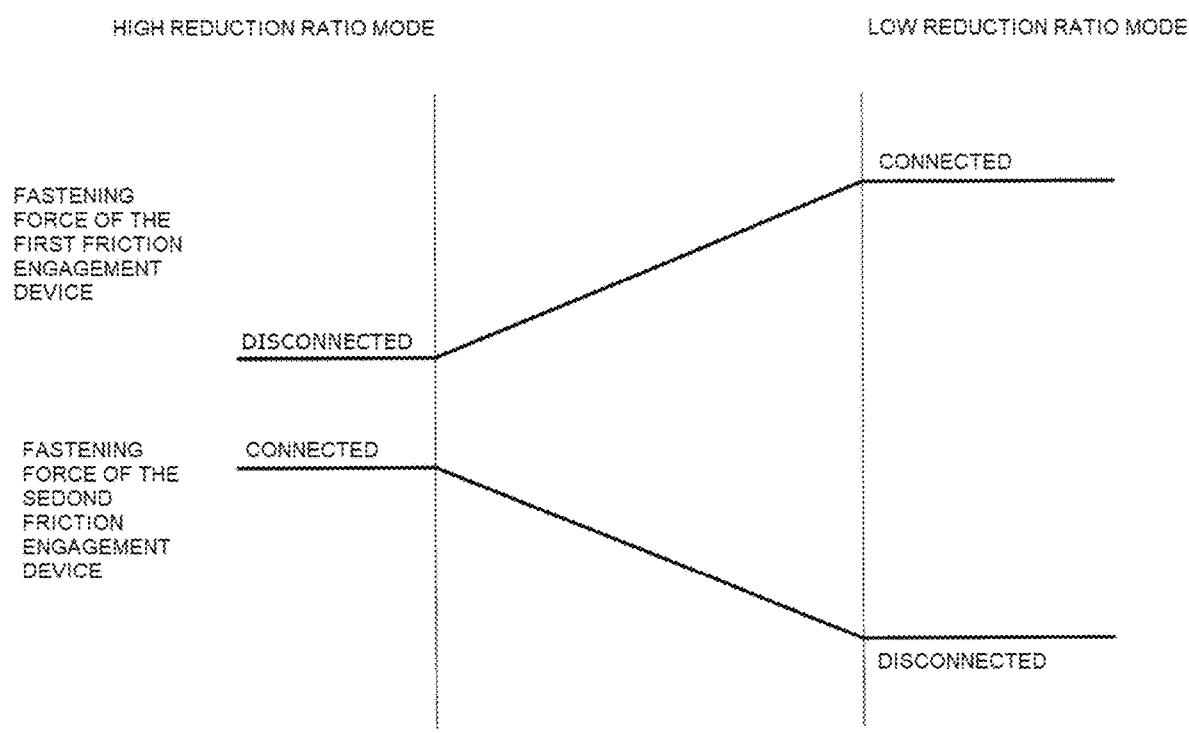
FIG. 18 is a graph schematically illustrating the connection/disconnection state of the first friction engagement device and the second friction engagement device in the power transmission path switching device of the comparative example.

In the two-speed transmission incorporating the power transmission path switching device 5z of the comparative example, during switching from the high reduction ratio mode with a large reduction ratio to the low reduction ratio mode with a small reduction ratio, as illustrated in FIG. 18, the fastening force of the first friction engagement device 40a gradually increases and the fastening force of the second friction engagement device 40b gradually decreases. Therefore, when the fastening force of the second friction engagement device 40b gradually decreases and becomes insufficient during switching from the high reduction ratio mode to the low reduction ratio mode, the ring gear 12 is dragged by the revolution of the pinion gears 14 and torque loss occurs between the ring gear 12 and the housing 38.

Further, also in the two-speed transmission incorporating the power transmission path switching device 5z of the comparative example, after the rotation of the sun gear 11 and the rotation of the carrier 13 become synchronized as the fastening force of the first friction engagement device 40a gradually increases, and the torque applied to the ring gear 12 in a direction opposite to the predetermined direction gradually decreases to zero, the direction of the torque applied to the ring gear 12 is reversed. However, in the power transmission path switching device 5z of the comparative example, the fastening force of the second friction engagement device 40b cannot be made sufficiently large at the moment when the direction of the torque applied to the ring gear 12 is reversed and the direction of revolution of the pinion gears 14 and the direction of rotation of the ring gear 12 match. Due to this, the ring gear 12 is dragged with respect to the housing 38 and torque loss occurs between the ring gear 12 and the housing 38.

On the other hand, in the two-speed transmission 1 of this example, in order to switch from the high reduction ratio mode to the low reduction ratio mode based on the rotation of the drive cam 50, the rotation transmission state switching device 41 is set to the one-way clutch mode before starting to switch the friction engagement device 40 from the disconnected state to the connected state. Therefore, in order to switch the friction engagement device 40 from the disconnected state to the connected state, by gradually synchronizing the rotation of the sun gear 11 and the rotation of the carrier 13 based on gradually increasing the fastening force of the friction engagement device 40, the ring gear 12 is allowed to rotate in a predetermined direction at the moment when the direction of the torque applied to the ring gear 12 is reversed. Therefore, torque loss in the two-speed transmission 1 can be suppressed while suppressing shift shock caused by mode switching.

In a state where the fastening force of the friction engagement device 40 is large enough to prevent torque loss at the engagement portions between the friction plate 65 and the separate plate 66, the reduction ratio between the input member 2 and the output member 3 in the reduction ratio switching mode is the same as the reduction ratio in the high reduction ratio mode. Moreover, in a state where the fastening force of the friction engagement device 40 is increased to the extent that torque can be transmitted without causing slippage at abutting portions between the friction plate 65 and the separate plate 66, the reduction ratio is the same as the reduction ratio in the low reduction ratio mode, that is, one. Furthermore, in a state where the fastening force of the friction engagement device 40 is such that it causes slippage at the abutting portions between the friction plates 65 and the separate plates 66, the reduction ratio between the input member 2 and the output member 3 is a value corresponding to the magnitude of the input torque, rotation speed, and the like.

While the input member 2 is rotating in the normal rotation direction and the high reduction ratio mode is being switched to the reduction ratio switching mode, torque is applied to the second member 72 of the rotation transmission state switching device 41 in a direction opposite to the predetermined direction. In the rotation transmission state switching device 41, rotation of the second member 72 in a direction opposite to the predetermined direction is prevented even during switching from the lock mode to the one-way clutch mode. In other words, the reduction ratio between the input member 2 and the output member 3 during switching from the high reduction ratio mode to the reduction ratio switching mode is the same as the reduction ratio in the high reduction ratio mode.

When the input member 2 is rotating in the normal rotation direction and the reduction ratio switching mode is being switched to the low reduction ratio mode, torque is applied to the second member 72 of the rotation transmission state switching device 41 in a predetermined direction. In the rotation transmission state switching device 41, rotation of the second member 72 in a predetermined direction is allowed even during switching from the one-way clutch mode to the free mode. In other words, the reduction ratio between the input member 2 and the output member 3 during switching from the reduction ratio switching mode to the low reduction ratio mode is the same as the reduction ratio in the low reduction ratio mode.

Further, in the two-speed transmission 1 of this example, the vehicle hardly travels at high speed during rotation of the input member 2 in the reverse direction, that is, when the automobile is moving backward. Therefore, when the input member 2 is rotating in the reverse direction, there is little need to make the reduction ratio switching mode selectable in the power transmission path switching device 5 when switching from the high reduction ratio mode to the low reduction ratio mode. Further, when switching the low reduction ratio mode to the high reduction ratio mode, the vehicle is mainly in a deceleration state. In this state, power is not transmitted from the input member 2 to the output member 3, therefore, there is little need to select the reduction ratio switching mode in the power transmission path switching device 5.

<Neutral Mode>

To switch the two-speed transmission 1 to the neutral mode, based on rotationally driving the drive cam 50 by the electric actuator 58, the power transmission path switching device 5 is switched to the fourth mode in which the friction engagement device 40 is disconnected and the rotation transmission state switching device 41 is set to the free mode. When the power transmission path switching device 5 is switched to the fourth mode, the sun gear 11 and the carrier 13 become capable of relative rotation based on the friction engagement device 40 being disconnected, and the rotation of the ring gear 12 with respect to the housing 38 is allowed based on the rotation transmission state switching device 41 being switched to the free mode. In such a neutral mode, the input member 2 and the output member 3 idle relative to each other, and torque is not transmitted between the input member 2 and the output member 3.

<Parking Lock Mode>

Furthermore, the two-speed transmission 1 of this example includes a parking lock mode in which the rotation of the output member 3 is locked. To switch the two-speed transmission 1 to the parking lock mode, based on rotationally driving the drive cam 50 by the electric actuator 58 in the direction indicated by arrow α in FIG. 9(A) through FIG. 9(D), the power transmission path switching device 5 is switched to the fifth mode in which the friction engagement device 40 is connected and the rotation transmission state switching device 41 is set to the lock mode. When the power transmission path switching device 5 is switched to the fifth mode, rotation of the sun gear 11 relative to the carrier 13 is prevented based on the friction engagement device 40 being connected, and rotation of the ring gear 12 with respect to the housing 38 is prevented based on the rotation transmission state switching device 41 being switched to the lock mode. As a result, rotation of the output member 3 (and the input member 2) is locked.

In particular, in this example, when switching the two-speed transmission 1 to the parking lock mode, as illustrated in FIG. 16, the rotation transmission state switching device 41 is switched to the lock mode while maintaining the friction engagement device 40 in a connected state after connecting the friction engagement device 40.

The two-speed transmission 1 is normally switched to the parking lock mode when the vehicle is completely stopped. Immediately before the vehicle comes to a complete stop, the two-speed transmission 1 is operated in one of the low reduction ratio mode, the high reduction ratio mode, the reduction ratio switching mode and the neutral mode (normally in the high reduction ratio mode or neutral mode since the vehicle is traveling at low speed or coasting). Regardless of which mode the two-speed transmission 1 was operating in, when the vehicle comes to a complete stop and the shift lever is selected to the P range, the friction engagement device 40 is connected by first rotationally driving the drive cam 50 by the electric actuator 58 so as to bring the cam device 39 into the state illustrated in FIG. 9(D). As indicated by arrow β in FIG. 16, in the power transmission path switching device 5, the friction engagement device 40 is connected and the rotation transmission state switching device 41 is set to the free mode.

The drive cam 50 is further rotated in the same direction a from this state and the phase of the select plate 77 in the circumferential direction with respect to the second member 72 is adjusted so that the rotation transmission state switching device 41 is switched from the free mode to the lock mode via the one-way clutch mode. Even while the rotation transmission state switching device 41 is switched from the free mode to the lock mode, the friction engagement device 40 is maintained in the connected state. In this way, the two-speed transmission 1 is switched to the parking lock mode by switching the power transmission path switching device 5 to the fifth mode in which the friction engagement device 40 is connected and the rotation transmission state switching device 41 is set to the lock mode.

Furthermore, in this example, when releasing the two-speed transmission 1 from the parking lock mode, the two-speed transmission 1 is switched to the high reduction ratio mode by disconnecting the friction engagement device 40 while maintaining the rotation transmission state switching device 41 in the lock mode.

To this end, by rotating the drive cam 50 by the electric actuator 58 in the direction indicated by arrow α in FIG. 9(A) through FIG. 9(D) (same direction as the direction of rotation of the drive cam 50 when switching the friction engagement device 40 from the disconnected state to the connected state), the rolling elements 64 are moved so as to roll down the steeply inclined surface portions 54*d*, 62*d* from the second flat surface portion 54*e* of the drive cam surface 54 and the second flat surface portion 62*e* of the driven cam surface 62 and moved to the first bottom portions 54*c*, 62*c*. As a result, the driven cam 51 is displaced in a direction in which the distance in the axial direction from the drive cam 50 is shortened, and the force pressing the friction plate 65 and the separate plate 66 against each other is released. As a result, due to the action of the return spring 70, the distance between the separate plate 66 that is located at the most one side in the axial direction and the separate plate 66 that is located at the most other side in the axial direction increases, and the friction engagement device 40 is disconnected. Even while the friction engagement device 40 is switched from the connected state to the disconnected state, the rotation transmission state switching device 41 is maintained in the lock mode. In this way, the two-speed transmission 1 is switched to the high reduction ratio mode by switching the power transmission path switching device 5 to the second mode in which the friction engagement device 40 is disconnected and the rotation transmission state switching device 41 is in the lock mode.

As described above, in the two-speed transmission 1 of this example, any of the modes of the low reduction ratio mode, the high reduction ratio mode, the reduction ratio switching mode, and the neutral mode is switched to the parking lock mode, and then the drive cam 50 is rotationally driven in the same direction a while the parking lock mode is released and switched to the high reduction ratio mode.

In this example, when switching the two-speed transmission 1 to the parking lock mode, the rotation transmission state switching device 41 is switched to the lock mode after connecting the friction engagement device 40. Therefore, the two-speed transmission 1 can be prevented from inadvertently is switched to the parking lock mode while the vehicle is traveling. In the following, the reason for this will be explained.

If the two-speed transmission 1 is attempted to switched to the parking lock mode while the output member 3 is rotating, by, for example, accidentally putting the shift lever in the P range while the vehicle is traveling, first, based on the rotation of the drive cam 50, as indicated by arrow β in FIG. 16, in the power transmission path switching device 5, the friction engagement device 40 is connected and the rotation transmission state switching device 41 is set to the free mode. In this state, in the two-speed transmission 1, the planetary gear mechanism 4 is in a so-called glued state, similar to the case where the mode is switched to the low reduction ratio mode, and the first member 71 supported by the ring gear 12 also rotates in the same direction and at the same speed as the output member 3.

From this state, in order to switch the power transmission path switching device 5 to the fifth mode, the drive cam 50 is further rotated and the phase of the select plate 77 in the circumferential direction with respect to the second member 72 is adjusted. As a result, the protruding portion 96 is located in a portion separated from the first engaging pawl 90 of the first pawl member 73 and the second engaging pawl 93 of the second pawl member 74 in the circumferential direction. In this state, the first engaging pawl 90 and the second engaging pawl 93 are displaced toward the inside in the radial direction by the elasticity of the first pawl biasing member 75 and the second pawl biasing member 76 respectively, and try to engage with the engaging concave portions 78. However, when the first member 71 is rotating with the output member 3 at a speed higher than the predetermined speed, the first engaging pawl 90 and the second engaging pawl 93 are prevented from displacing toward the inside in the radial direction by the convex portion 79 of the first member 71, and are prevented from engaging with the engaging concave portions 78. As a result, switching of the rotation transmission state switching device 41 to the lock mode during rotation of the output member 3 can be prevented, and the two-speed transmission 1 can be prevented from inadvertently switched to the parking lock mode while the vehicle is traveling.

In this example, when releasing the two-speed transmission 1 from the parking lock mode, the two-speed transmission 1 is switched to the high reduction ratio mode by disconnecting the friction engagement device 40 while maintaining the rotation transmission state switching device 41 in the lock mode. Therefore, even when the parking lock mode is released from a state in which a large torque is applied to the output member 3, the force required for the release is prevented from becoming excessively large. In the following, the reason for this will be explained.

When the vehicle is stopped on a slope and the shift lever is changed to the P range, before the parking brake is activated, if the service brake (foot brake) is released or the braking by the parking brake is not sufficient, the output member 3 will also try to rotate as the drive wheels try to rotate (rotational torque is applied the output member 3). When rotational torque is applied to the output member 3, rotational torque is also applied to the ring gear 12 through the carrier 13 and the pinion gears 14, and the rotational torque is also applied to the first member 71 supported by the ring gear 12. As a result, the side surface in the circumferential direction of the engaging concave portion 78 of the first member 71 is strongly pressed against the tip end portion of the first engaging pawl 90 or the second engaging pawl 93.

From this state, if the parking lock mode of the two-speed transmission 1 is attempted to be released by disengaging the engaging concave portion 78 from the first engaging pawl 90 and/or the second engaging pawl 93, the first engaging pawl 90 or the second engaging pawls 9 is required to be pushed toward outside in the radial direction while sliding the tip end portion of the first engaging pawl 90 or the second engaging pawl 93 against the side surface in the circumferential direction of the engaging concave portion 78. Therefore, a large force is required to release the parking lock mode of the two-speed transmission 1, and a motor with a large output is required to be used as the variable speed motor 60.

On the other hand, in this example, the parking lock mode of the two-speed transmission 1 is released, while maintaining the rotation transmission state switching device 41 in the lock mode, by displacing the driven cam 51 in the axial direction based on the rotation of the drive cam 50 and disconnecting the friction engagement device 40. Therefore, even when the parking lock mode is released from a state where a large torque is applied to the output member 3, the force required for the release is prevented from becoming large, and the releasing performance of the parking lock can be easily secured. Specifically, for example, the parking lock mode of the two-speed transmission 1 can be released even when the vehicle is loaded with a maximum load and stopped on a steep slope.

In this example, the inclination angle of the steeply inclined surface portion 54d of the drive cam surface 54 and the steeply inclined surface portion 62d of the driven cam surface 62 is set to a size such that the rolling elements 64 cannot ride up by rotationally driving the drive cam 50 by the electric actuator 58. Therefore, the two-speed transmission 1 can be prevented from being switched to the parking lock mode even if a failure occurs when the two-speed transmission 1 is in the high reduction ratio mode and the vehicle is traveling at low speed.

As described above, according to the two-speed transmission 1 of this example, it is possible to prevent the mode from being inadvertently switched to the parking lock mode while the vehicle is traveling, and to ensure the releasing performance of the parking lock.

Further, since the two-speed transmission 1 of this example includes the neutral mode in which torque is not transmitted between the input member 2 and the output member 3, the electricity consumption performance of the electric vehicle equipped with the two-speed transmission 1 can be improved. In the following, the reason for this will be explained.

For example, as an electric vehicle that uses an electric motor as a driving source, a power distributed four-wheel drive system is being considered, in which a pair of front wheels is rotationally driven by one electric motor and a pair of rear wheels is rotationally driven by another electric motor. When driving such an electric vehicle in urban areas, in order to improve electricity consumption performance, it is conceivable to rotationally drive only one of the pair of front wheels and the pair of rear wheels (for example, the pair of front wheels) to travel in two-wheel drive. At this time, if the other wheels that are not rotationally driven (for example, the pair of rear wheels) are connected to the electric motor so as to transmit torque, a loss due to dragging occurs in the electric motor, resulting in a problem of deteriorated electricity consumption performance.

The two-speed transmission 1 of this example includes the neutral mode in which torque is not transmitted between the input member 2 and the output member 3. When traveling a power distributed four-wheel drive electric vehicle in two-wheel drive, a pair of wheels (for example, the pair of rear wheels) of the pair of front wheels and the pair of rear wheels that are not rotationally driven and the electric motor are dynamically separated by switching the two-speed transmission 1 mounted between the pair of wheels and the electric motor to the neutral mode. As a result, occurrence of a loss due to dragging by the electric motor can be prevented, and the electricity consumption performance can be improved.

Further, when the accelerator is turned off while the vehicle is traveling and the vehicle coasts, the drive wheels and the driving source can be dynamically separated and the distance traveled by coasting can be increased by switching the two-speed transmission 1 to the neutral mode. In other words, speed reduction during coasting can be slowed down. As a result, the electricity consumption performance of the vehicle (electric vehicle) mounted with the two-speed transmission 1 can be improved.

According to the two-speed transmission 1 of this example, as described above, a structure capable of dynamically separating the drive wheels and the driving source as needed can be achieved without providing a dedicated clutch device between the drive wheels and the driving source. Therefore, the structure of the drive system of the electric vehicle can be simplified, and manufacturing costs can be reduced.

Further, in the two-speed transmission 1 of this example, as illustrated in FIG. 16, the neutral mode in which torque is not transmitted between the input member 2 and the output member 3 is arranged between the low reduction ratio mode in which the reduction ratio between the input member 2 and the output member 3 is small and the parking lock mode in which the rotation of the output member 3 is locked. In other words, the two-speed transmission 1 of this example can only be switched to the neutral mode from the low reduction ratio mode or the parking lock mode, and it is not possible to be switched directly from the high reduction ratio mode (and the reduction ratio switching mode) to the neutral mode (without going through the low reduction ratio mode or the parking lock mode).

Specifically, in this example, of the drive cam surface 54, the second bottom portion 54g where the rolling elements 64 are located when the neutral mode is selected is arranged in the circumferential direction between the first flat surface portion 54a where the rolling elements 64 are located when the low reduction ratio mode is selected and the second flat surface portion 54e where the rolling elements 64 are located when switched to the parking lock mode. In other words, in the two-speed transmission 1 of this example, when the drive cam 50 is rotated in the direction indicated by arrow α in FIG. 9(A) through FIG. 9(D), the mode is switched from the low reduction ratio mode, the neutral mode, and to the parking lock mode in this order.

The second intermediate inclined surface portion 54h is arranged between the second bottom portion 54g and the first flat surface portion 54a, and the first intermediate inclined surface portion 54f is arranged between the second bottom portion 54g and the second flat surface portion 54e. However, since the first intermediate inclined surface portion 54f is a portion where the rolling elements 64 move during switching between the neutral mode and the low reduction ratio mode, and the second intermediate inclined surface portion 54h is a portion where the rolling elements 64 move during switching between the neutral mode and the parking lock mode, the rolling elements 64 are never located on the first intermediate inclined surface portion 54f or the second intermediate inclined surface portion 54h in a state where mode switching is complete.

As described above, in the two-speed transmission 1 of this example, since the neutral mode is arranged between the low reduction ratio mode and the parking lock mode, for example, it is possible to prevent an excessive load from being applied to the electric motor when switching the two-speed transmission 1 to the neutral mode in order to shift to coasting while driving at high speed. In the following, the reason for this will be explained.

For example, consider a structure in which the neutral mode is arranged between the high reduction ratio mode in which the reduction ratio is larger than the low reduction ratio mode and the parking lock mode. In this structure, when switching to the neutral mode, either the high reduction ratio mode or the parking lock mode is passed through.

If the parking lock mode is passed through when switching to the neutral mode in order to shift to coasting while driving at high speed in the low reduction ratio mode and the output member 3 is rotating at a speed higher than the predetermined speed, the wheels are not locked since the first engaging pawl 90 and the second engaging pawl 93 of the rotation transmission state switching device 41 are prevented from displacing in the inside in the radial direction and do not engage with the engaging concave portions 78. However, abnormal noise may be generated when the convex portion 79 of the first member 71 flick the first engaging pawl 90 and the second engaging pawl 93. Further, if the rotational speed of the output member 3 is smaller than a predetermined value, there is a possibility that the wheels may be locked. Considering this, when switching the two-speed transmission 1 to the neutral mode while the vehicle is traveling, it is not preferable to go through the parking lock mode.

On the other hand, if the high reduction ratio mode is passed through when switching to the neutral mode, the number of rotations of the electric motor becomes rapidly and/or excessively high, and there is a possibility that an excessive load may be applied to the electric motor, which is undesirable.

In the two-speed transmission 1 of this example, since the neutral mode is arranged between the low reduction ratio mode and the parking lock mode, it is possible to switch from the low reduction ratio mode to the neutral mode when switching the two-speed transmission 1 to the neutral mode while the vehicle is traveling. Therefore, it is possible to prevent an excessive load from being applied to the electric motor due to the number of rotations of the electric motor rapidly increasing or becoming excessively high when switching to the neutral mode.

In the power transmission path switching device 5 of this example, an elastic member 68 is arranged between the separate plate 66 that is located at the most one side in the axial direction and the driven cam 51. Therefore, assembly errors of the power transmission path switching device 5 and deviations due to wear of the friction plate 65 and the separate plate 66 can be absorbed by the elastic members 68. Therefore, by controlling the force that presses the driven cam 51 (the pressing force of the driven cam 51 toward the other side in the axial direction with respect to the separate plate 66 that is located at the most one side in in the axial direction), the fastening force of the friction engagement device 40 can be controlled. As a result, sufficient fastening force of the friction engagement device 40 can be ensured in the low reduction ratio mode.

In this example, in a state where the power transmission path switching device 5 is switched to the first mode or the fifth mode and the friction engagement device 40 is connected, the rolling elements 64 ride up the first flat surface portion 54a or the second flat surface portion 54e of the drive cam surface 54. Therefore, according to the power transmission path switching device 5 of this example, the friction engagement device 40 is maintained in the connected state even when the power supply to the variable speed motor 60 is stopped after the mode switching is completed, and from this aspect as well, electricity consumption performance can be improved.

In addition to providing the first flat surface portion 54a of the drive cam surface 54 and the second flat surface portion 54e, by providing a self-locking function to the worm reducer configured by the wheel gear portion 57 of the drive cam 50 and the worm gear portion 61 of the worm 59, the friction engagement device 40 can be maintained in the connected state even after the power supply to the variable speed motor 60 is stopped.

In the two-speed transmission 1 of this example, although the planetary gear mechanism 4 is arranged around the output member 3 and the power transmission path switching device 5 is arranged around the input member 2, in a case of implementing the two-speed transmission according to the first aspect of the present disclosure, various configurations can be adopted, not limited to this. For example, the planetary gear mechanism can be arranged around the input member and the power transmission path switching device can be arranged around the output member. Alternatively, the planetary gear mechanism and/or the power transmission path switching device can be arranged without overlapping the input member or the output member in the radial direction. In any case, the shape of each component is appropriately changed in accordance with the respective configuration.

In the cam device 39 of the power transmission path switching device 5 of this example, the rolling elements 64 are held between the drive cam 50 and the driven cam 51. However, in a case of implementing the power transmission path switching device of the present disclosure, the cam device is not limited to the configuration of this example, and various configurations can be adopted as long as the driven cam can be displaced in the axial direction based on the rotation of the drive cam. For example, the drive cam surface provided on the drive cam and the driven cam surface provided on the driven cam can also be brought into direct sliding contact.

In the rotation transmission state switching device 41 of this example, the second member 72 is arranged around the first member 71 and the first pawl member 73 and the second pawl member 74 are pivotally supported with respect to the second member 72. However, in a case of implementing the present disclosure, the rotation transmission state switching device is not particularly limited as long as it has a structure that can switch the rotation transmission state between the first member and the second member. For example, the first pawl member and the second pawl member may be pivotally supported with respect to the first member arranged on the inside in the radial direction, or the first member and the second member may be arranged to face each other in the axial direction.

MODIFICATION OF FIRST EXAMPLE

Figure 19:
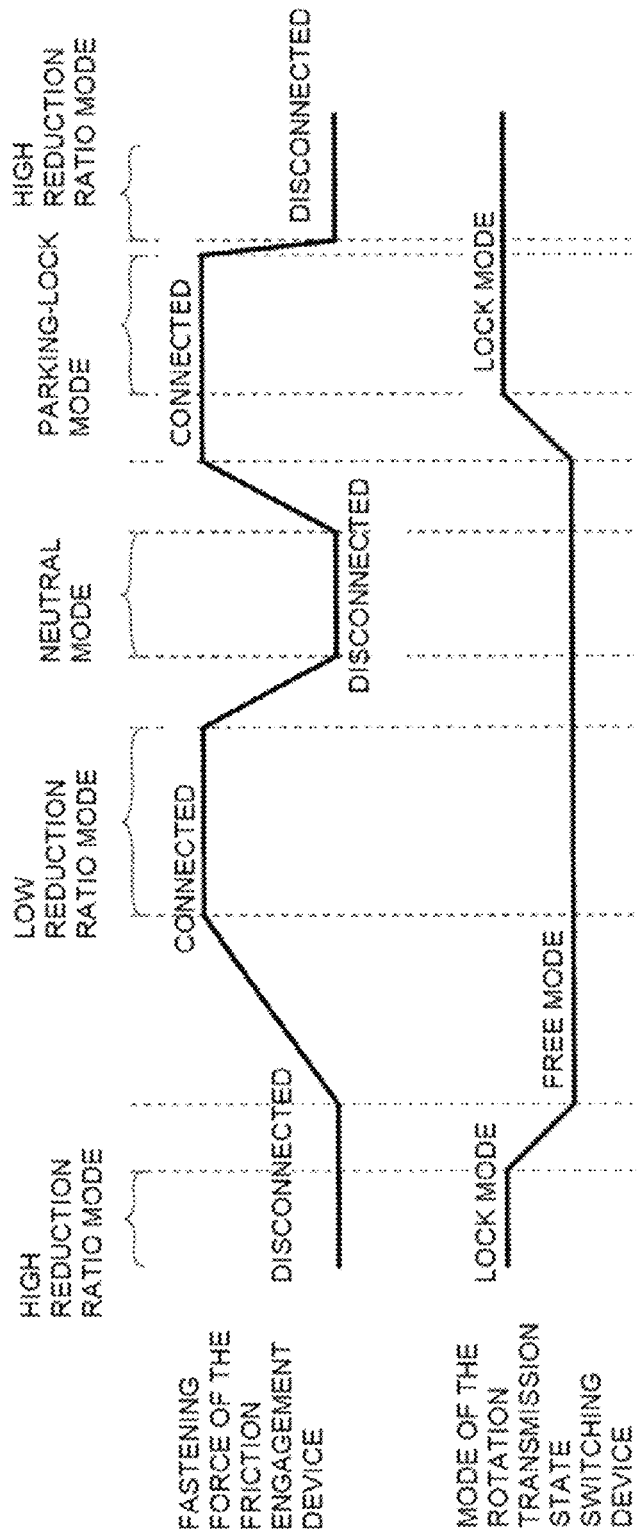
FIG. 19 is a view corresponding to FIG. 16 of a modification of the first example.

A modification of the first example of an embodiment of the present disclosure will be explained with reference to FIG. 19.

The rotation transmission state switching device 41 of this modification example does not have a one-way clutch mode in which only rotation of the first member 71 in a predetermined direction relative to the second member 72 is allowed. In other words, the rotation transmission state switching device 41 of this modification example only has a free mode in which the first member 71 and the second member 72 can rotate relative to each other in both directions, and a lock mode in which the first member 71 and the second member 72 cannot rotate relative to each other. Specifically, the rotation transmission state switching device 41 is configured so as to switch between two modes, the free mode and the lock mode, by adjusting the installation position in the circumferential direction and the length in the circumferential direction of the protruding portion 96 of the select plate 77.

Since the two-speed transmission 1 of this modification example does not have a one-way clutch mode, the high reduction ratio mode, the low reduction ratio mode, the neutral mode, and the parking lock mode are switched based on rotationally driving one drive cam 50 by one electric actuator 58. In this modification example, the friction engagement device 40 is switched from the disconnected state to the connected state after the rotation transmission state switching device 41 is switched from the lock mode to the free mode when switching from the high reduction ratio mode to the low reduction ratio mode.

Also in this modification example, when the two-speed transmission 1 is switched to the neutral mode by disconnecting the friction engagement device 40 and setting the rotation transmission state switching device 41 to the free mode, the input member 2 and the output member 3 idle relative to each other and torque is not transmitted between the input member 2 and the output member 3. Further, when the two-speed transmission 1 is switched to the parking lock mode by connecting the friction engagement device 40 and setting the rotation transmission state switching device 41 to the lock mode, rotation of the output member 3 (and the input member 2) is locked.

In this modification example, the two-speed transmission 1 can be switched to the high reduction ratio mode, the reduction ratio switching mode, the low reduction ratio mode, the neutral mode, and the parking lock mode by switching the friction engagement device 40 between the connected and disconnected states and switching the rotation transmission state switching device 41 between two modes. Therefore, according to the two-speed transmission 1 of this modification example, control can be simplified compared to the two-speed transmission 1 of the first example.

Second Example

Figure 20:
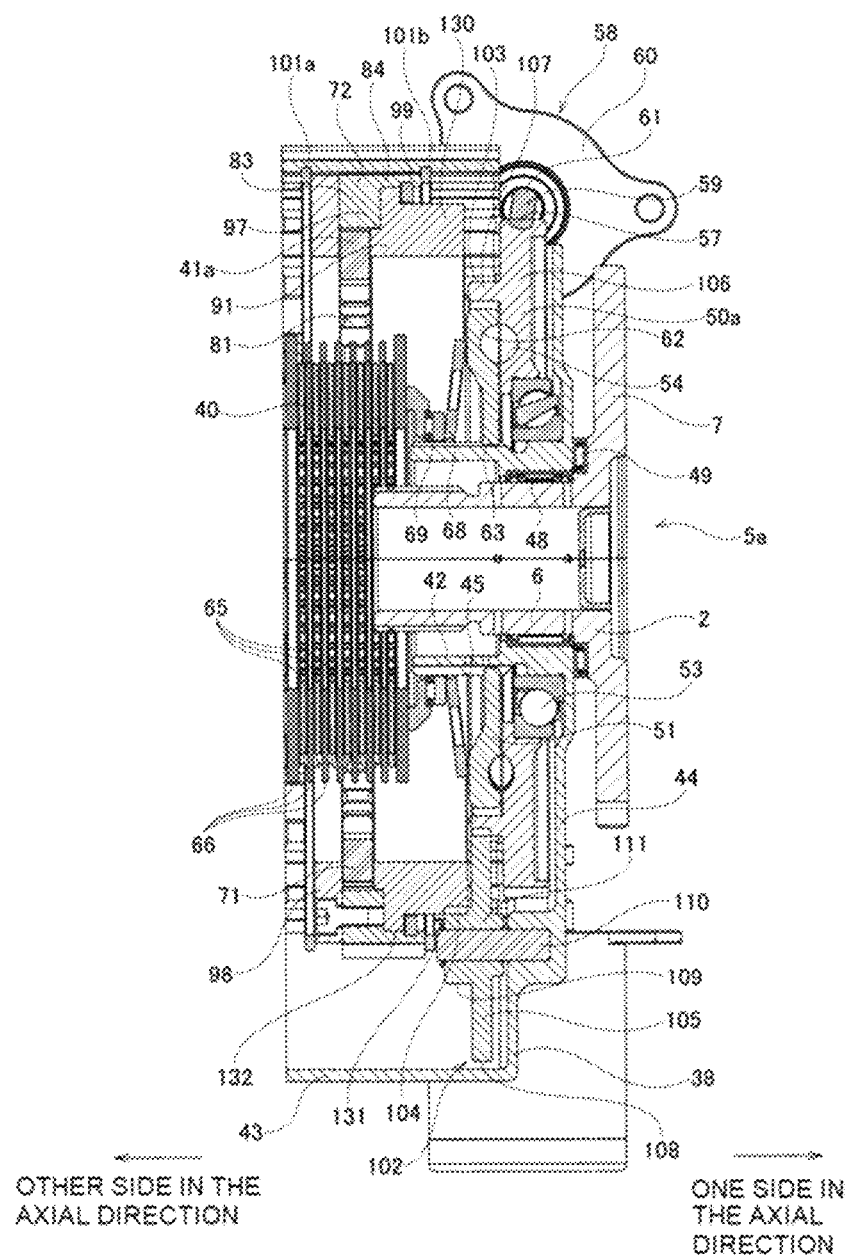
FIG. 20 is a cross-sectional view of a power transmission path switching device of a second example of an embodiment of the present disclosure.
Figure 21:
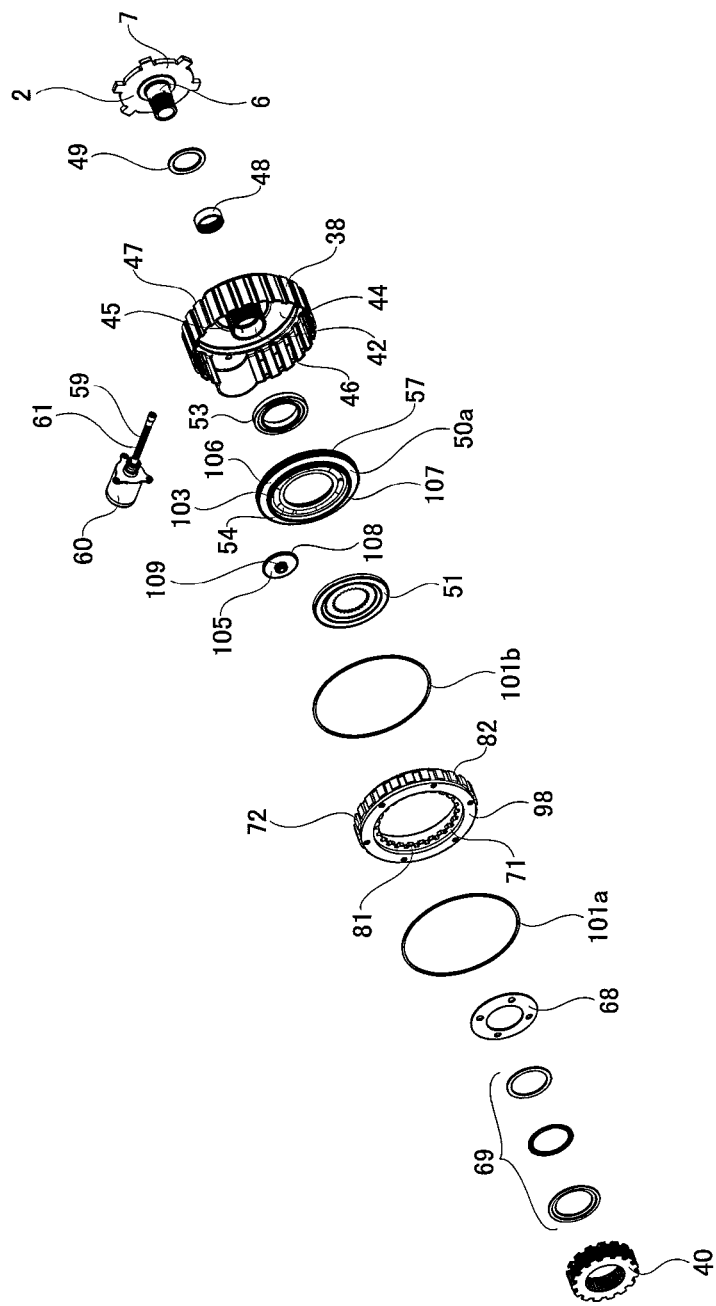
FIG. 21 is an exploded perspective view of the power transmission path switching device of the second example.
Figure 22:
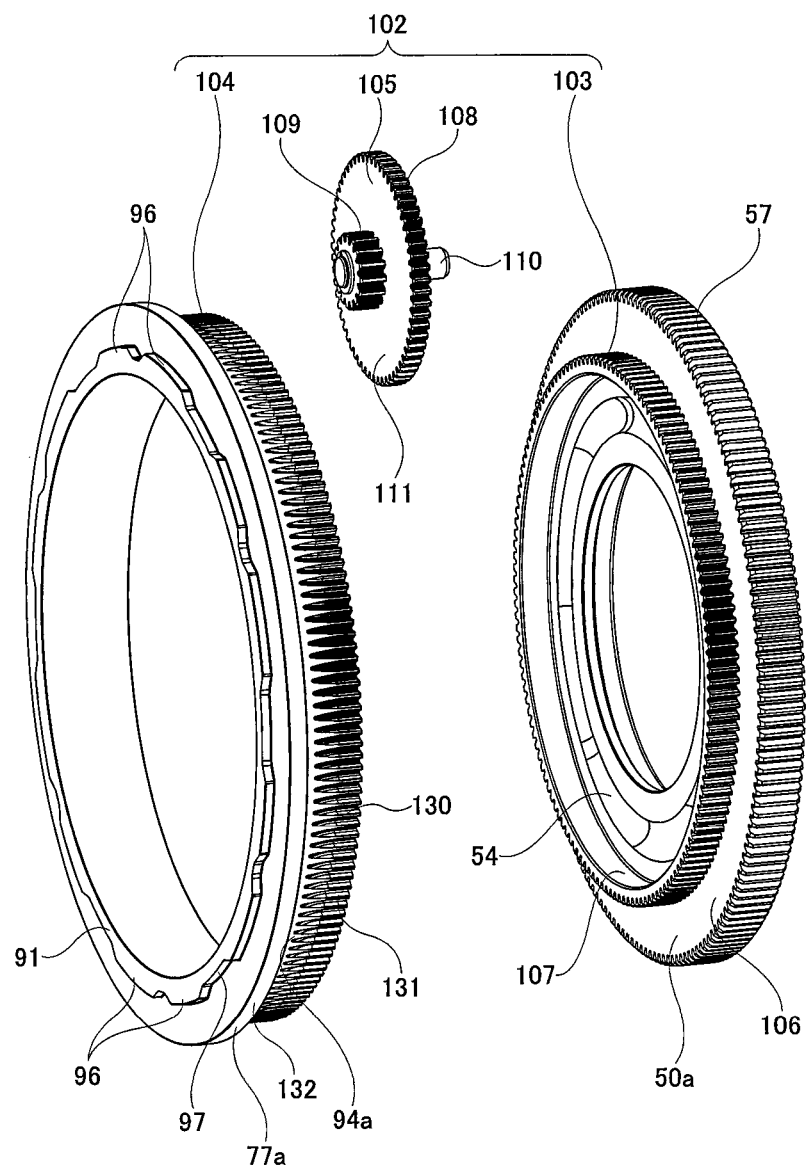
FIG. 22 is an exploded perspective view of a drive cam, a two-speed gear, and a select plate of the second example.
Figure 23A:
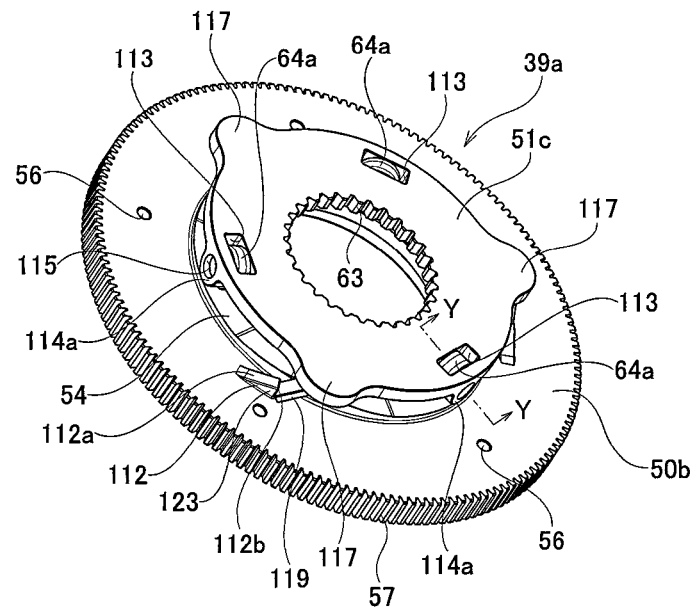
FIG. 23(A) is a perspective view of a cam device of a third example of an embodiment of the present disclosure, illustrating a state where a stopper piece is in contact with a protrusion.
Figure 23B:
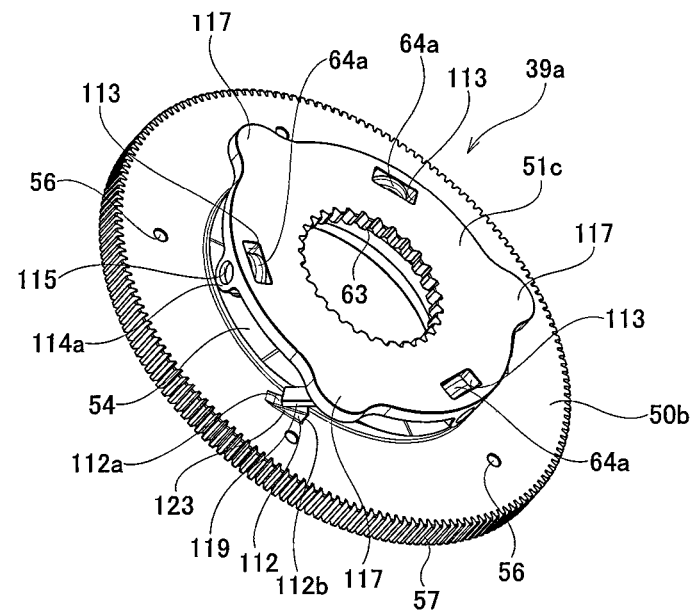
FIG. 23(B) is a perspective view of the cam device of the third example, illustrating a state where the stopper piece goes over the protrusion.
Figure 24:
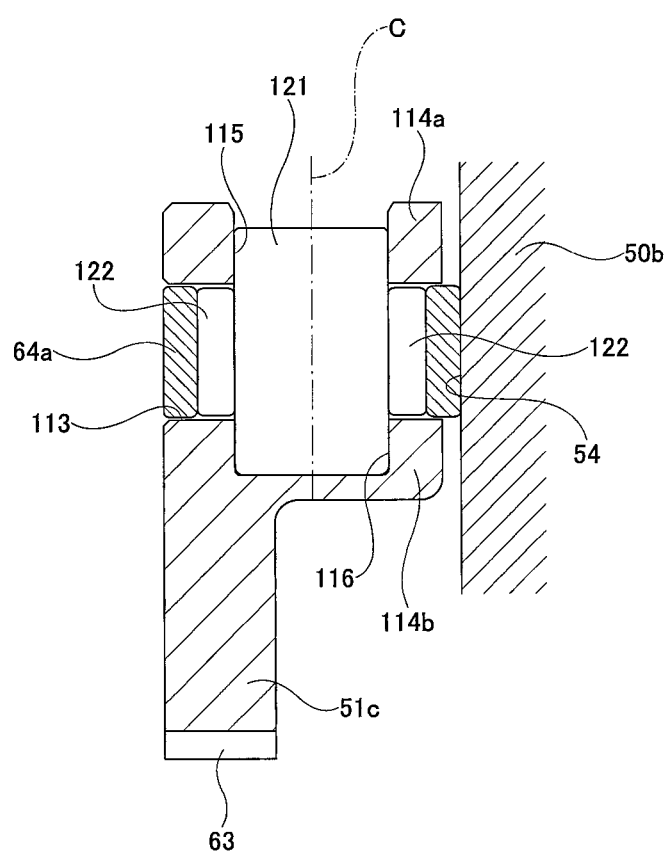
FIG. 24 is a cross-sectional view of section Y-Y in FIG. 23(A).
Figure 25:
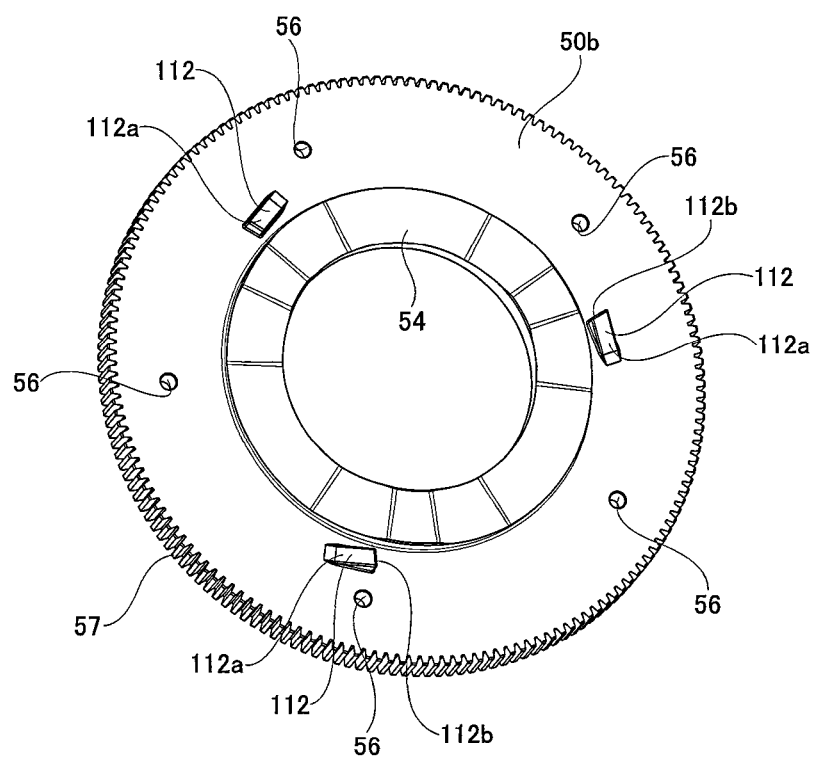
FIG. 25 is a perspective view of a drive cam of the third example.
Figure 26:
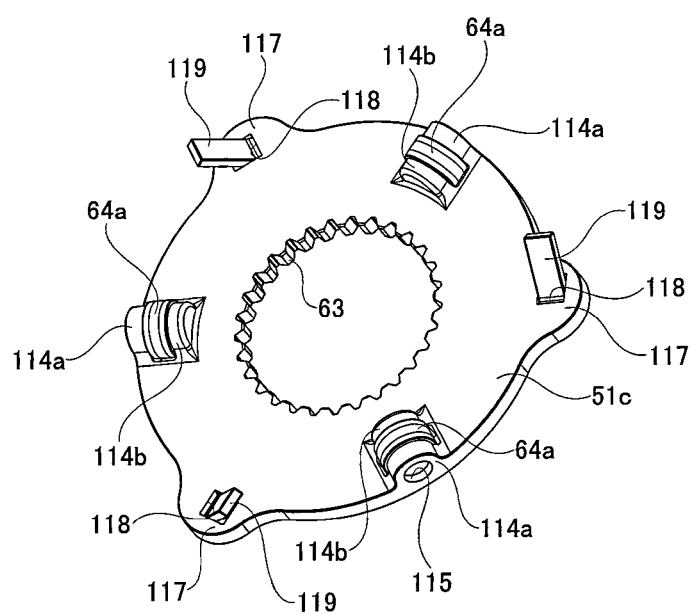
FIG. 26 is a perspective view of a driven cam of the third example.
Figure 27:
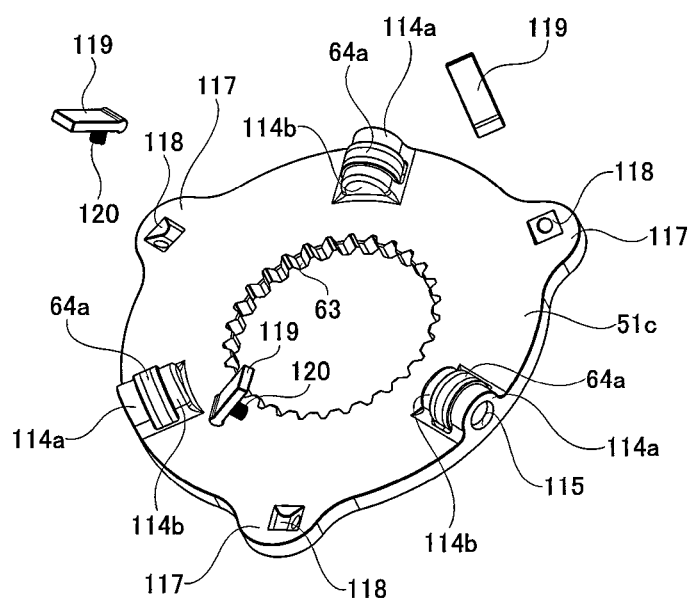
FIG. 27 is a partially exploded perspective view of the driven cam of the third example.

A second example of an embodiment of the present disclosure will be explained with reference to FIG. 20 through FIG. 22. The power transmission path switching device 5a of this example includes a reducer 102 between the drive cam 50a and the select plate 77a, which reduces the number of rotations of the drive cam 50a and transmits the rotation to the select plate 77a. In other words, the power transmission path switching device 5a of this example does not include the engagement pins 52 spanned between the drive cam 50 and the select plate 77, and the rotation of the drive cam 50a is transmitted to the select plate 77a through the reducer 102.

The reducer 102 includes a cam-side gear portion 103 provided on the drive cam 50a, a plate-side gear portion 104 provided on the select plate 77a, and a two-speed gear 105. The drive cam 50a has a substantially circular plate shape, and includes a base portion 106 having the drive cam surface 54 on the inside portion in the radial direction of the surface on the other side in the axial direction, and a cylindrical portion 107 that protrudes from the intermediate portion in the radial direction of the surface on the other side in the axial direction of the base portion 106 toward the other side in the axial direction over the entire circumference. Further, the drive cam 50a has a cam-side gear portion 103 on the outer circumferential surface of the cylindrical portion 107 over the entire circumference.

The select plate 77a includes a stepped cylindrical base portion 94a, and an annular convex portion 91 that protrudes over the entire circumference from the intermediate portion in the radial direction of the surface on the other side in the axial direction of the base portion 94a toward the other side in the axial direction. The base portion 94a has a small diameter portion 130 on the one side in the axial direction and a large diameter portion 131 on the other side in the axial direction. In this example, the select plate 77a has a plate-side gear portion 104 over the entire circumference on the outer circumferential surface of the small diameter portion 130. In this example, the plate-side gear portion 104 has a pitch diameter larger than that of the cam-side gear portion 103, and has a greater number of teeth than the cam-side gear portion 103.

The two-speed gear 105 has a first gear portion 108 that meshes with the cam-side gear portion 103 and a second gear portion 109 that meshes with the plate-side gear portion 104. The first gear portion 108 has a pitch diameter larger that of the second gear portion 109 and has a greater number of teeth than the second gear portion 109. The two-speed gear 105 of this example has a center axis 110 supported with respect to the housing 38a and a body portion 111 which has the first gear portion 108 over the entire circumference of the outer circumferential surface of the portion on the one side in the axial direction and has the second gear portion 109 over the entire circumference of the outer circumferential surface of the portion on the other side in the axial direction and is supported around the center axis 110 so as to rotate freely.

According to the power transmission path switching device 5a of this example, the allowable load torque of the rotation transmission state switching device 41a can be sufficiently ensured without using a particularly high output motor as the variable speed motor 60. The reason for this will be explained in comparison with the power transmission path switching device 5 of the first example.

In the power transmission path switching device 5 of the first example, in order to sufficiently secure the allowable load torque of the rotation transmission state switching device 41, it is effective to increase the number of the first pawl members 73 and the second pawl members 74. However, when the number of the first pawl members 73 and the second pawl members 74 is increased, the rotation angle of the drive cam 50 when switching between the first mode and the second mode becomes smaller. In order to sufficiently secure the fastening force of the friction engagement device 40 by ensuring a sufficient amount of displacement (stroke) in the axial direction of the driven cam 51 even when the rotation angle of the drive cam 50 becomes small when switching modes, it is necessary to increase the inclination angle (lead angle) of the gently inclined surface portion 54b of the drive cam surface 54 and/or the gently inclined surface portion 62b of the driven cam surface 62 with respect to a virtual plane perpendicular to the center axis of the cam device 39. However, when the inclination angle of the gently inclined surface portion 54b and/or the gently inclined surface portion 62b is increased, it is necessary to use a variable speed motor 60 with a high output in order to smoothly roll the rolling elements 64 between the drive cam surface 54 and the driven cam surface 62.

On the other hand, the power transmission path switching device 5a of this example includes the reducer 102 between the drive cam 50a and the select plate 77a. Therefore, the rotation angle of the select plate 77a per rotation of the drive cam 50a can be made smaller than the rotation angle of the driven cam 51 per rotation of the drive cam 50a. Therefore, it is not necessary to increase the inclination angle of the gently inclined surface portion 54b and/or the gently inclined surface portion 62b in order to ensure a sufficient amount of displacement in the axial direction of the driven cam 51 even when the number of the first pawl members 73 and the second pawl members 74 is increased in order to sufficiently secure the allowable load torque of the rotation transmission state switching device 41a. In short, there is no need to use a particularly high output motor as the variable speed motor 60. The configuration and operational effects of the other parts of the second example are the same as those of the first example.

Third Example

The third example of an embodiment of the present disclosure will be explained with reference to FIG. 23(A) through FIG. 28. In this example, the structure of the cam device 39a constituting the control device is changed from the structure of the cam device 39 of the first example. The cam device 39a includes a drive cam 50b, a driven cam 51c, a plurality of engagement pins 52 (see, for example, FIG. 5 through FIG. 7), a plurality of (three in the illustrated example) rolling elements 64a. In particular, in this example, rollers are used as the rolling elements 64a. Further, the cam device 39a has a lock release prevention mechanism 123 which prevents the rotation transmission state switching device 41 from being switched to the one-way clutch mode while the friction engagement device is connected from a state where the friction engagement device 40 (see, for example, FIG. 2 and FIG. 5) is connected and the rotation transmission state switching device 41 is in the lock mode, that is, from a state where the two-speed transmission 1 is in the parking lock mode.

The drive cam 50b is configured in the shape of a hollow circular plate shape, and has a drive cam surface 54 on the inside portion in the radial direction of the surface on the other side in the axial direction, in which the same number of concave portions and convex portions are arranged alternately in the circumferential direction. Further, the drive cam 50b has cam-side engaging holes 56 that open to the surface on the other side in the axial direction at a plurality of equally spaced locations in the circumferential direction of the portion on the outside in the radial direction, and has a wheel gear portion 57 on the outer circumferential surface. Further, the drive cam 50b has protrusions 112 that protrude toward the other side in the axial direction at a plurality of locations in the circumferential direction (three locations in the illustrated example) of the intermediate portion in the radial direction of the surface on the other side in the axial direction.

Each of the protrusion 112 has a substantially right triangular side surface shape when viewed from the radial direction. In other words, the protrusion 112 has a gently inclined surface portion 112a on one side in the circumferential direction that is inclined toward the other side in the axial direction as going from the one side to the other side in the circumferential direction, and a stopper surface portion 112b on the surface on the other side in the circumferential direction that is substantially perpendicular to the portion of the surface on the other side in the axial direction of the drive cam 50b that is separated from the drive cam surface 54, the cam-side engaging holes 56, and the protrusions 112.

The drive cam 50b is supported on the outer circumferential surface of the end portion on the one side in the axial direction of the inner diameter side tubular portion 42 of the housing 38 (see, for example, FIG. 2 and FIG. 5) through the angular ball bearing 53 so as to rotate freely and so as not to displace in the axial direction.

The driven cam 51c are configured in the shape of a substantially hollow circular plate shape and has rectangular holes 113 that are arranged at a plurality of locations in the circumferential direction (three locations in the illustrated example that are equally spaced in the circumferential direction) of the portion on the outside in the radial direction and penetrating in the axial direction, and substantially semicircular plate-shaped support plate portions 114a, 114b that protrude from portions on both sides of each rectangular hole 113 toward the one side in the axial direction. Each of the support plate portions 114a on the outside in the radial direction includes a support hole 115 which is a circular hole penetrating in the radial direction, and each of the support plate portions 114b on the inside in the radial direction includes a support concave portion 116 having a circular opening on the surface on the outside in the radial direction.

The driven cam 51c has ear portions 117 at a plurality of locations in the circumferential direction (three locations in the illustrated example) that protrude more toward the outside in the radial direction than portions adjacent on both sides in the circumferential direction, and has concave portions 118 that are concaved toward the other side in the axial direction on the surface on the one side in in the axial direction of the ear portions 117. Rectangular flat plate-shaped stopper pieces 119 are respectively supported in the concave portions 118 so as to pivot around the base end portion. More specifically, the base end portion of each of the stopper pieces 119 is supported by the inner surface of each of the concave portions 118 so as to pivot around the pivot axis that extends in the radial direction centered on the center axis of the driven cam 51c. Further, a biasing member 120 is held between the bottom surface of the concave portion 118 and the stopper piece 119. As a result, the tip end portion of the stopper piece 119 is elastically biased in a direction in which the angle between the stopper piece 119 and a surface on the one side in the axial direction of the driven cam 51c becomes larger. The biasing member 120 can be configured by a coil spring, a leaf spring, rubber, or other elastomer or the like.

The driven cam 51c is supported by spline-engaging the driven-side female spline portion 63 provided on the inner circumferential surface with the fixed side male spline portion 45 of the housing 38 so as to displace only in the axial direction with respect to the housing 38.

Each of the rolling elements 64a has a cylindrical shape, and is supported so as to rotate freely with respect to the support plate portions 114a, 114b of the driven cam 51c through a column shaped support shaft 121 and a plurality of rollers 122. In other words, the end portion on one side in the axial direction of the support shaft 121 (the end portion on the outside in the radial direction around the center axis of the driven cam 51c) is fitted and fixed into the support hole 115 of the support plate portion 114a on the outside in the radial direction, and the end portion on the other side in the axial direction of the support shaft 121 (the end portion on the inside in the radial direction around the center axis of the driven cam 51c) is fitted and fixed into the support concave portion 116 of the support plate portion 114b on the inside in the radial direction. The plurality of rollers 122 are held between the inner circumferential surface of the rolling element 64a and the outer circumferential surface of the intermediate portion in the axial direction of the support shaft 121 so as to roll freely. As a result, the rolling elements 64a are supported by the driven cam 51c so as to rotate (spin) freely around the rotation axis C facing in the radial direction centered on the center axis of the driven cam 51c.

In a state where the rolling elements 64a are supported by the driven cam 51c, portions on the other side in the axial direction of the rolling elements 64a are arranged inside the rectangular holes 113. Further, the outer circumferential surface of each rolling element 64a is in rolling contact with the drive cam surface 54 provided on the surface on the other side in in the axial direction of the drive cam 50b.

In this example, rollers are used as the rolling elements 64a, and the rolling elements 64a are supported so as to rotate (spin) freely around the rotation axis C facing in the radial direction centered on the center axis of the driven cam 51c. Therefore, the driven cam 51c can be reliably displaced in the axial direction based on rotating the drive cam 50b. In other words, since balls are used as the rolling elements 64 in the cam device 39 of the first example, when the drive cam 50 is rotated, there is a possibility that slippage may occur at the rolling contact portion between the surface of the rolling elements 64 and the drive cam surface 54 and/or the driven cam surface 62. When slippage occurs at the rolling contact portion between the surface of the rolling elements 64 and the drive cam surface 54 and/or the driven cam surface 62, there is a possibility that the driven cam 51 cannot be displaced in the axial direction, or that the amount of displacement in the axial direction of the driven cam 51 with respect to the amount of rotation of the drive cam 50 cannot be sufficiently ensured.

In this example, rollers having a cylindrical shape are used as the rolling elements 64a, and the rolling elements 64a are supported so as to roll freely by the driven cam 51c that does not rotate during use. Therefore, when the drive cam 50b is rotated, slippage is reliably prevented from occurring at the rolling contact portion between the outer circumferential surface of the rolling elements 64a and the drive cam surface 54, and the driven cam 51c can be reliably displaced in the axial direction based on rotating the drive cam 50b. As a result, mode switching of the power transmission path switching device 5 (see, for example, FIG. 2 and FIG. 5) can be reliably performed.

In this example, protrusions 112 are provided on the drive cam 50b, stopper pieces 119 are pivotally supported on the driven cam 51c, and the tip end portion of each stopper piece 119 is biased by a biasing member 120. Therefore, the rotation transmission state switching device 41 is prevented from being switched from the lock mode to the one-way clutch mode while the friction engagement device 40 is connected from a state where the friction engagement device 40 is connected and the rotation transmission state switching device 41 is set to the lock mode.

Figure 28:
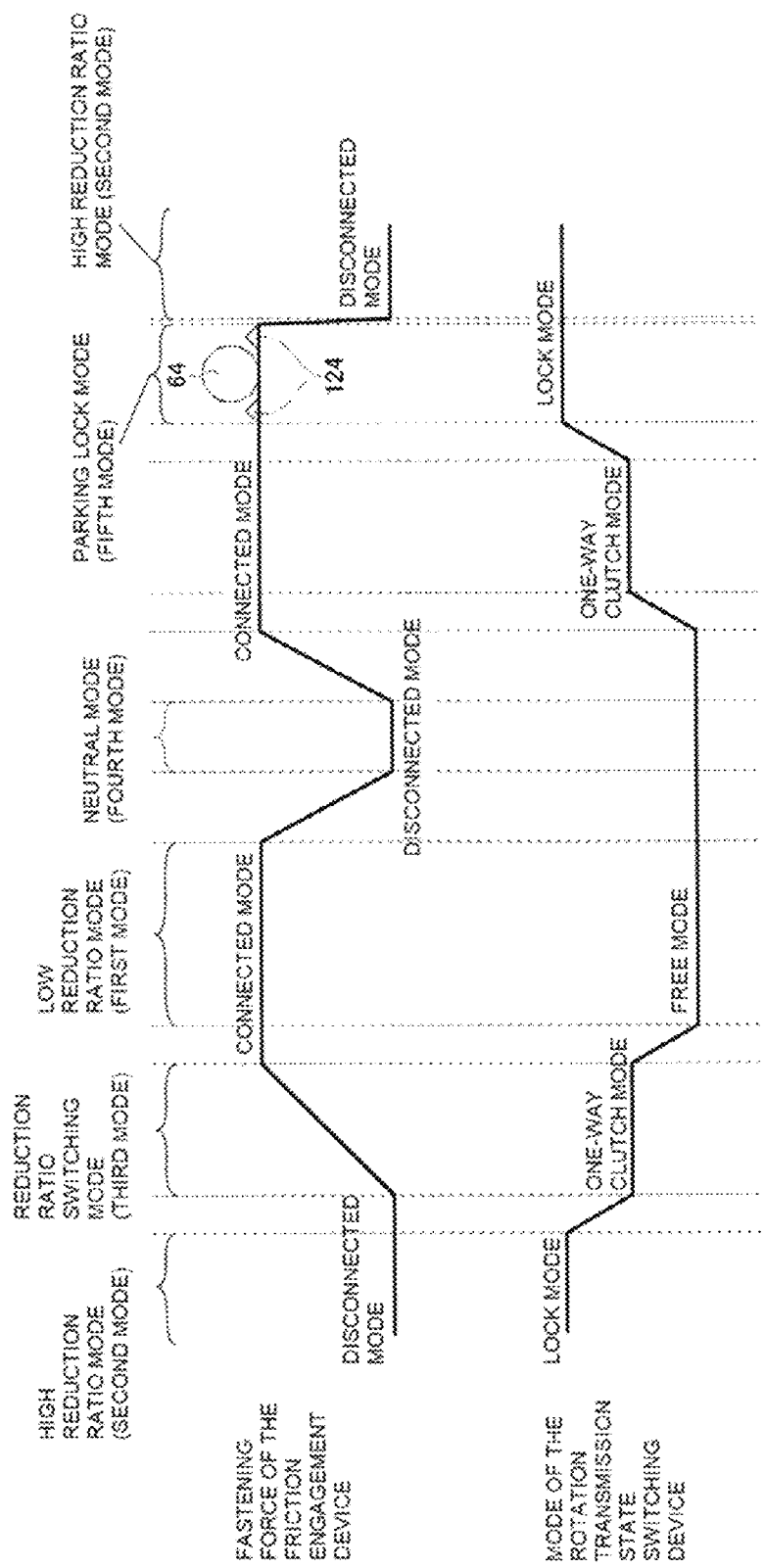
FIG. 28 is a graph schematically illustrating a connection/disconnection state of the friction engagement device, an engagement state of a lock release prevention mechanism, and a mode of the rotation transmission state switching device, in the third example.

In other words, when a force is applied to the drive cam 50b in the direction of switching the rotation transmission state switching device 41 from the lock mode to the one-way clutch mode in a state where the two-speed transmission 1 (see, for example, FIG. 1 and FIG. 2) is switched to the parking lock mode by, for example, selecting the shift lever to the P range, as indicated by the two-dot chain line in FIG. 28, the stopper surface portions 112b of the protrusions 112 provided on the drive cam 50b abut against the tip end portions of the stopper pieces 119 supported by the driven cam 51c. As a result, the drive cam 50b is prevented from rotating further with respect to the driven cam 51c, and the rotation transmission state switching device 41 is prevented from being switched to the one-way clutch mode.

In short, in this example, the lock release prevention mechanism 123 is configured by the protrusions 112, the stopper pieces 119, and the biasing members 120, for preventing from switching from a state where the friction engagement device 40 is connected and the rotation transmission state switching device 41 is set to the lock mode to a state where the rotation transmission state switching device 41 is set from the lock mode to the one-way clutch mode while the friction engagement device 40 is connected.

On the other hand, when switching the rotation transmission state switching device 41 from the one-way clutch mode to the lock mode in order to switch the two-speed transmission 1 to the parking lock mode with the friction engagement device 40 connected, as indicated by the arrow in FIG. 28, the protrusions 112 provided on the drive cam 50b ride over the stopper pieces 119 while pressing the base end side portions of the stopper pieces 119 against the elasticity of the biasing members 120 by the gently inclined surface portions 112a. In this way, the drive cam 50b is allowed to rotate with respect to the driven cam 51c in the direction of switching the rotation transmission state switching device 41 from the one-way clutch mode to the lock mode.

The zero point of the drive cam 50b can also be corrected in a state where the stopper surface portions 112b of the protrusions 112 provided on the drive cam 50b are abutted against the tip end portions of the stopper pieces 119 supported by the driven cam 51c.

In the two-speed transmission 1, the connection/disconnection state of the friction engagement device 40 and the mode of the rotation transmission state switching device 41, and thus the mode of the two-speed transmission 1 can be switched by changing the rotational phase of the drive cam 50b. The rotational phase of the drive cam 50b is controlled based on information from an encoder and/or the number of steps of the variable speed motor 60.

However, when slippage occurs at the rolling contact portions between the drive cam surface 54 and the rolling elements 64a, there is a possibility that a discrepancy will occur between the mode of the rotation transmission state switching device 41 estimated based on the rotational phase of the drive cam 50b and the actual mode of the rotation transmission state switching device 41. This discrepancy increases over time.

The increase in the discrepancy can be suppressed by abutting the stopper surface portions 112b of the protrusions 112 provided on the drive cam 50b against the tip end portions of the stopper pieces 119 supported by the driven cam 51c in a state where the two-speed transmission 1 is switched to the parking lock mode so as to correct the zero point of the drive cam 50b. The configuration and operational effects of the other parts of the third example are the same as those of the first example.

Fourth Example

Figure 29:
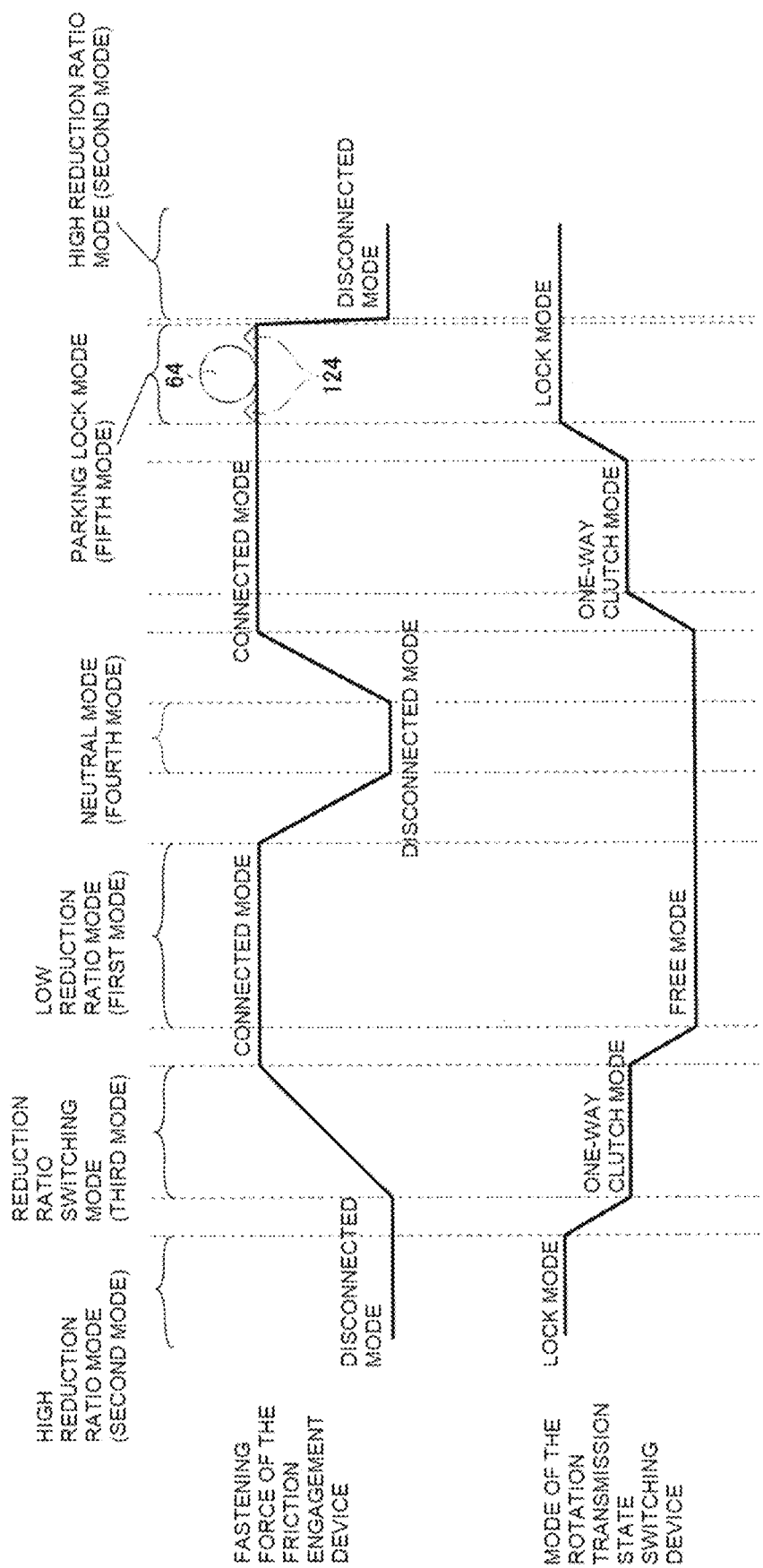
FIG. 29 is a graph schematically illustrating a connection/disconnection state of the friction engagement device, a cam stroke, and a mode of the rotation transmission state switching device, in a fourth example of an embodiment of the present disclosure.

A fourth example of an embodiment of the present disclosure will be explained with reference to FIG. 29. In this example, by devising the shape of the drive cam surface 54 provided on the drive cam 50 (see, for example, FIG. 2, FIG. 5 through FIG. 7, and FIG. 9), the friction engagement device 40 is prevented from being inadvertently disconnected or the rotation transmission state switching device 41 is prevented from being inadvertently switched to the one-way clutch mode from a state where the two-speed transmission 1 (see, for example, FIG. 1 and FIG. 2) is in the parking lock mode.

Specifically, convex portions 124 protruding toward the other side in the axial direction are provided on both sides in the circumferential direction of the portion of the first flat surface portion 54a of the drive cam surface 54 where the rolling elements 64 are located when the two-speed transmission 1 is in the parking lock mode. The convex portions 124 have a height in the axial direction that allows the rolling element 64 to ride over the convex portions 124 based on rotationally driving the drive cam 50 by the electric actuator 58.

According to this example, when a force is applied to rotate the drive cam 50 in a state where the two-speed transmission 1 is switched to the parking lock mode, the rolling elements 64 interfere (caught) with the convex portions 124. As a result, the rolling elements 64 are prevented from rolling inadvertently, and the friction engagement device 40 is prevented from being inadvertently disconnected or the rotation transmission state switching device 41 is prevented from being inadvertently switched to the one-way clutch mode.

The convex portions 124 for preventing the rolling elements 64 from rolling inadvertently may be provided on the driven cam surface 62 of the driven cam 51 in place of or in addition to the drive cam surface 54 of the drive cam 50. Further, the structure of this example can also be implemented in combination with the lock release prevention mechanism 123 of the third example. The configuration and operational effects of the other parts of the fourth example are the same as those of the first example.

Fifth Example

Figure 30:
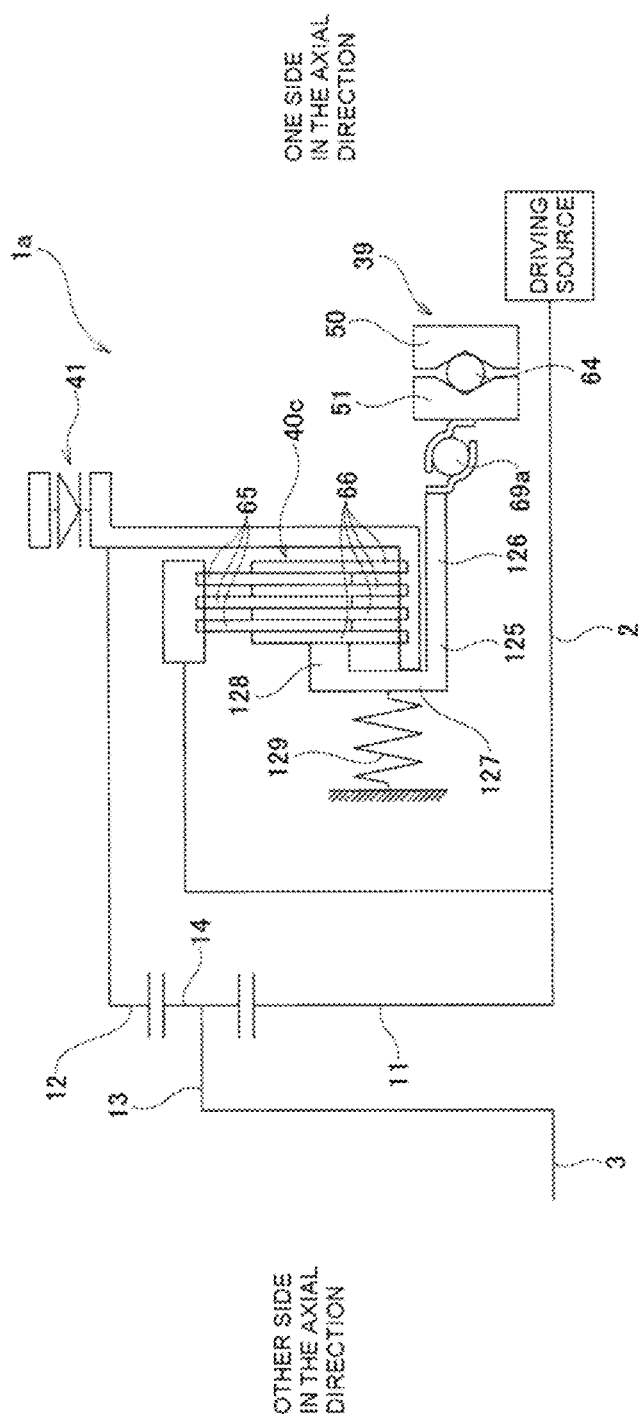
FIG. 30 is a schematic view illustrating a two-speed transmission of a fifth example of an embodiment of the present disclosure.

A fifth example of an embodiment of the present disclosure will be explained with reference to FIG. 30 through FIG. 31(B). In the two-speed transmission 1a of this example, a so-called normally closed type clutch is used as the friction engagement device 40c of the power transmission path switching device 5b, which is connected in a state where the power supply to the electric actuator 58 (see FIG. 1 and FIG. 2) is stopped in a stand-alone state and disconnected by increasing the distance in the axial direction between the drive cam 50 and the driven cam 51 based on energizing the electric actuator 58, and the friction engagement device 40c is arranged between the sun gear 11 and the ring gear 12.

The friction engagement device 40c has a plurality of friction plates 65 and a plurality of separate plates 66. Each friction plate 65 is supported so as to displace only in the axial direction with respect to the sun gear 11. Each separate plate 66 is supported so as to displace only in the axial direction with respect to the ring gear 12.

The friction engagement device 40c switches the connection/disconnection state by pressing the separate plate 66 that is located at the most other side in the axial direction toward the one side in the axial direction or by releasing the pressing force by the cam device 39 through the pressing member 125. The pressing member 125 has a cylindrical portion 126 that is supported around the input member 2 so as to be able to rotate freely with respect to the input member 2, a flange portion 127 that is bent toward the outside in the radial direction from the end portion on the other side in the axial direction of the cylindrical portion 126, and a plate pressing portion 128 that is bent toward the one side in in the axial direction from the end portion on the outside in the radial direction of the flange portion 127.

A thrust rolling bearing 69a is held between the end portion on the one side in the axial direction of the cylindrical portion 126 and the driven cam 51. In other words, the cam device 39 is capable of pressing the pressing member 125 toward the other side in the axial direction through the thrust rolling bearing 69a. An elastic member 129 is held between the surface on the other side in the axial direction of the flange portion 127 and a portion fixed to the housing 38 (see FIG. 1 and FIG. 2). The elastic member 129 elastically biases the pressing member 125 toward the one side in the axial direction. The elastic member 129 can be configured by a disc spring, a coil spring, or the like. Further, the tip end portion (the end portion on the one side in the axial direction) of the plate pressing portion 128 faces the surface on the other side in the axial direction of the separate plate 66 that is located at the most other side in the axial direction.

The friction engagement device 40c switches the connection/disconnection state by displacing the driven cam 51 in the axial direction based on rotationally driving the drive cam 50 by the electric actuator 58.

Figure 31A:
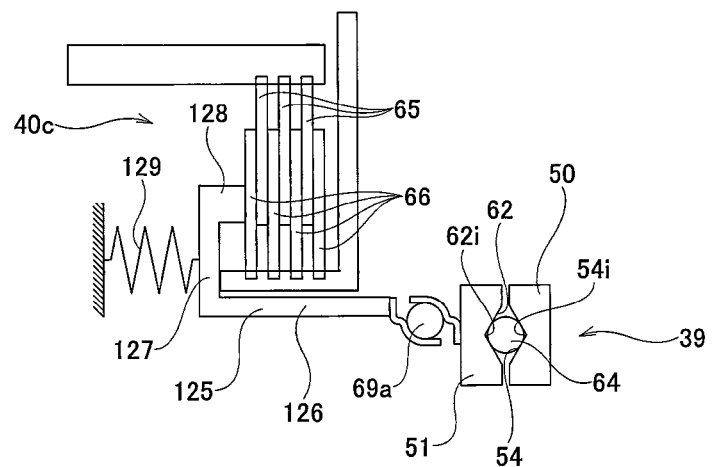
FIG. 31(A) is a schematic view illustrating a friction engagement device and a cam device of the fifth example in a state where the friction engagement device is connected.

In order to connect the friction engagement device 40c, as illustrated in FIG. 31(A), the driven cam 51 is displaced in a direction (the one side in the axial direction) in which the distance in the axial direction from the drive cam 50 is shortened by moving the rolling elements 64 to the bottom portion 54i of the drive cam surface 54 and the bottom portion 62i of the the driven cam surface 62. As a result, the pressing member 125 is elastically pressed toward the one side in the axial direction due to the action of the elastic member 129, and the separate plate 66 that is located at the most other side in the axial direction is pressed toward the one side in the axial direction by the tip end portion of the plate pressing portion 128. As a result, the friction plate 65 and the separate plate 66 are pressed against each other, and the friction engagement device 40c is connected (the fastening force of the friction engagement device 40c becomes large).

Figure 31B:
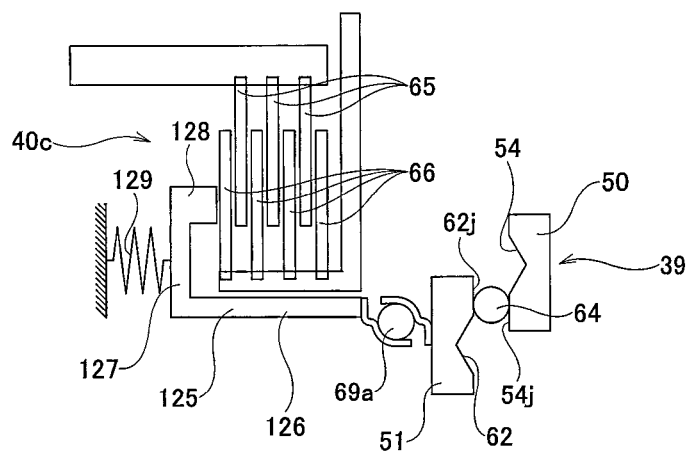
FIG. 31(B) is a schematic view illustrating the friction engagement device and the cam device of the fifth example in a state where the friction engagement device is disconnected.

In order to disconnect the friction engagement device 40c, as illustrated in FIG. 31(B), the driven cam 51 is displaced in a direction in which the distance from the drive cam 50 in the axial direction increases (the other side in the axial direction) by moving the rolling elements 64 to the flat surface portion 54j of the drive cam surface 54 and the flat surface portion 62j of the driven cam surface 62. As a result, the pressing member 125 is pressed toward the other side in the axial direction against the elasticity of the elastic member 129. As a result, the force pressing the friction plate 65 and the separate plate 66 against each other is released, and the friction engagement device 40c is disconnected (the fastening force of the friction engagement device 40c is lost) as the distance between the separate plate 66 that is located at the most one side in the axial direction and the separate plate 66 that is located at the most other side in the axial direction increases due to the action of the return spring 70 (see FIG. 8).

Also in this example, at the same time of switching the connection/disconnection state of the friction engagement device 40c by displacing the driven cam 51 in the axial direction based on rotationally driving the drive cam 50 by the electric actuator 58, the mode of the rotation transmission state switching device 41 is switched. By switching the connection/disconnection state of the friction engagement device 40c and the mode of the rotation transmission state switching device 41, the operation mode of the power transmission path switching device 5a is switched, and the two-speed transmission 1a can be switched among the low reduction ratio mode, the high reduction ratio mode, the reduction ratio switching mode, and the parking lock mode.

In this example, since a normally closed type clutch is used as the friction engagement device 40c, it is easy to achieve high efficiency and miniaturization of the two-speed transmission 1a. It is also possible to apply the lock release prevention mechanism 123 of the third example and/or convex portions 124 of the fourth example to the two-speed transmission 1a of this example. Further, the number and arrangement of the bottom portion 54i and the flat surface portion 54j of the drive cam surface 54, the inclination angle of the inclined surface portion that connects the bottom portion 54i and the flat surface portion 54j, the number and arrangement of the bottom portion 62i and the flat surface portion 62j of the driven cam surface 62, the inclination angle of the inclined surface portion that connects the bottom portion 62i and the flat surface portion 62j, and so on, are appropriately determined depending on the timing of switching the connection/disconnection state of the friction engagement device 40c. The configuration and operational effects of the other parts of the fifth example are the same as those of the first example.

The first through fifth examples of an embodiment of the present disclosure may be combined and implemented as long as there is no contradiction.

REFERENCE SIGNS LIST 1, 1a Two-speed transmission
2 Input member
3 Output member
4 Planetary gear mechanism
5, 5a, 5z Power transmission path switching device
6 Input cylindrical portion
7 Input flange portion
8 Female spline portion
9 Output cylindrical portion
10 Output flange portion
11 Sun gear
12 Ring gear
13 Carrier
14 Pinion gear
15 Small-diameter tubular portion
16 Large-diameter tubular portion
17 Flange portion
18 Sun-side male spline portion
19 Gear portion
20 Small-diameter tubular portion
21 Large-diameter tubular portion
22 Circular ring portion
23 Ring-side male spline portion
24 Gear portion
25a, 25b Rim portion
26 Column portion
27 Cylindrical portion
28a, 28b Circular hole
29 Carrier-side female spline portion
30 Support shaft
31 Body portion
32 Radial needle bearing
33 Gear portion
34a, 34b Retaining ring
35 Spacer
36a, 36b Thrust bearing
37 Retaining plate
38 Housing
39, 39a, 39z Cam device
40, 40c Friction engagement device
40a First friction engagement device
40b Second friction engagement device
41, 41a Rotation transmission state switching device
42 Inner diameter side tubular portion
43 Outer diameter side tubular portion
44 Side plate portion
45 Fixed side male spline portion
46 Fixed side female spline portion
47 Through hole
48 Radial needle bearing
49 Thrust needle bearing
50, 50a, 50b, 50z Drive cam
51, 51c Driven cam
51a First driven cam
51b Second driven cam
52 Engagement pin
53 Angular ball bearing
54 Drive cam surface
54a First flat surface portion
54b Gently inclined surface portion
54 First bottom portion
54d Steeply inclined surface portion
54e Second flat surface portion
54f First intermediate inclined surface portion
54g Second bottom portion
54h Second intermediate inclined surface portion
54i Bottom portion
54j Flat surface portion
56 Cam-side engaging hole 57 Wheel gear portion
58 Electric actuator
59 Worm
60 Variable speed motor
61 Worm gear portion
62 Driven cam surface
62a First flat surface portion
62b Fently inclined surface portion
62c First bottom portion
62d Steeply inclined surface portion
62e Second flat surface portion
62f First intermediate inclined surface portion
62g Second bottom portion
62h Second intermediate inclined surface portion
62i Bottom portion
62j Flat surface portion
63 Driven-side female spline portion
64, 64a Rolling element
65, 65a Friction plate
66, 66a Separate plate
67 Retaining ring
68 Elastic member
69 Thrust rolling bearing
70 Return spring
71 First member
72 Second member
73 First pawl member
74 Second pawl member
75 First pawl biasing member
76 Second pawl biasing member
77, 77a Select plate
78 Engaging concave portion
79 Convex portion
80 Uneven portion
81 Female spline portion
82 Male spline portion
83 Base portion
84 Cylindrical portion
85 First holding concave portion
86 Second holding concave portion
87a, 87b Spring holding portion
88a, 88b Pedestal portion
89 First base portion
90 First engaging pawl
91 Annular convex portion
92 Second base portion
93 Second engaging pawl
94, 94a Base portion
95 Plate-side engaging hole
96 Protruding portion
97 Uneven portion
98 Cover
99 Retaining ring
101a, 101b Retaining ring
102 Reducer
103 Cam-side gear portion
104 Plate-side gear portion
105 Two-speed gear
106 Base portion
107 Cylindrical portion
108 First gear portion
109 Second gear portion
110 Center axis
111 Body portion
112 Protrusion
112a Gently inclined surface portion
112b Stopper surface portion
113 Rectangular hole
114a, 114b Support plate portion
115 Support hole
116 Support concave portion
117 Ear portion
118 Concave portion
119 Stopper piece
120 Biasing member
121 Support shaft
122 Roller
123 Lock release prevention mechanism
124 Convex portion
125 Pressing member
126 Cylindrical portion
127 Flange portion
128 Plate pressing portion
129 Elastic member
130 Small diameter portion
131 Large diameter portion

The invention claimed is:

1. A power transmission path switching device, including
a housing that does not rotate even during use,
a friction engagement device having at least one friction plate and at least one separate plate that are supported so as to displace relative to each other in an axial direction, the friction engagement device connected by pressing the friction plate and the separate plate against each other, and disconnected by releasing the force pressing the friction plate and the separate plate against each other,
a rotation transmission state switching device having a first member and a second member that are coaxially arranged with each other, the second member supported so as not to rotate relative to the housing, and having at least a free mode in which rotation of the first member with respect to the second member is allowed regardless of a direction of relative rotation between the first member and the second member and a lock mode in which rotation of the first member with respect to the second member is prevented regardless of the direction of relative rotation between the first member and the second member, and
a control device having a function to switch the rotation transmission state switching device to the lock mode while maintaining the friction engagement device in a connected state after connecting the friction engagement device when connecting the friction engagement device and switching the rotation transmission state switching device to the lock mode, and a function to disconnect the friction engagement device and switch the rotation transmission state switching device to the free mode.

2. The power transmission path switching device according to claim 1, wherein
the control device has a function to disconnect the friction engagement device while maintaining the rotation transmission state switching device in the lock mode in the state where the friction engagement device is connected and the rotation transmission state switching device is in the lock mode.

3. The power transmission path switching device according to claim 2, wherein
the control device has a function to prevent the friction engagement device from being switched from the disconnected state to the connected state while maintaining the rotation transmission state switching device in the lock mode in a state where the friction engagement device is disconnected and the rotation transmission state switching device is in the lock mode.

4. The power transmission path switching device according to claim 1, wherein the rotation transmission state switching device has a one-way clutch mode in which only rotation of the first member in a predetermined direction with respect to the second member is allowed and rotation of the first member in a direction opposite to the predetermined direction with respect to the second member is prevented.

5. The power transmission path switching device according to claim 4, wherein the control device has a function to switch the rotation transmission state switching device to the one-way clutch mode during switching the friction engagement device from the disconnected state to the connected state and/or during switching the friction engagement device from the connected state to the disconnected state.

6. The power transmission path switching device according to claim 1, wherein the control device has a function to prevent the rotation transmission state switching device from being inadvertently switched from the lock mode to the free mode or to a one-way clutch mode while the friction engagement device is connected in the state where the friction engagement device is connected and the rotation transmission state switching device is in the lock mode.

7. The power transmission path switching device according to claim 1, wherein the control device includes a drive cam supported so as to rotate and so as not to displace in the axial direction, and switches the connection/disconnection state of the friction engagement device and the mode of the rotation transmission state switching device based on rotation of the drive cam.

8. The power transmission path switching device according to claim 7, configured, by rotating the drive cam in one direction, to switch among a state where the friction engagement device is connected and the rotation transmission state switching device is in the free mode, the state where the friction engagement device is disconnected and the rotation transmission state switching device is in the free mode, and the state where the friction engagement device is connected and the rotation transmission state switching device is in the lock mode, in this order.

9. The power transmission path switching device according to claim 7, wherein the control device has a cam device having the drive cam and a driven cam that is supported so as to relatively rotate and displace in the axial direction with respect to the drive cam and displaces in the axial direction as the drive cam rotates.

10. The power transmission path switching device according to claim 9, wherein the control device connects the friction engagement device by displacing the driven cam in a direction in which a distance from the drive cam in the axial direction increases based on rotating the drive cam, and the friction engagement device is disconnected by displacing the driven cam in a direction in which the distance in the axial direction from the drive cam decreases.

11. The power transmission path switching device according to claim 10, including an elastic member arranged between the driven cam and the friction engagement device and elastically biassing the driven cam and the friction engagement device in a direction away from each other.

12. The power transmission path switching device according to claim 9, wherein the cam device further has a plurality of rolling elements held between the drive cam and the driven cam.

13. The power transmission path switching device according to claim 12, wherein the rolling elements are configured by rollers each having a rotation axis facing in a radial direction and supported by the driven cam so as to rotate freely about the rotation axis.

14. The power transmission path switching device according to claim 1, wherein one of the first member and the second member has engaging concave portions at a plurality of locations in a circumferential direction, and the rotation transmission state switching device includes
a mode select portion having a protruding portion that protrudes in a radial direction or axial direction at a plurality of locations in the circumferential direction,
a first pawl member having a first base portion pivotally supported by the other member of the first member and the second member and a first engaging pawl extending from the first base portion toward one side in the circumferential direction,
a second pawl member having a second base portion pivotally supported by the other member of the first member and the second member and a second engaging pawl extending from the second base portion toward the other side in the circumferential direction,
a first pawl biasing member elastically biassing the first engaging pawl in a direction so as to engage with the engaging concave portions, and
a second pawl biasing member elastically biassing the second engaging pawl in a direction so as to engage with the engaging concave portions.

15. The power transmission path switching device according to claim 14, wherein the control device includes a drive cam supported so as to rotate and so as not to displace in the axial direction, and switches the connection/disconnection state of the friction engagement device and the mode of the rotation transmission state switching device based on rotation of the drive cam, and the mode select portion is rotated or displaced in the axial direction as the drive cam rotates.

16. The power transmission path switching device according to claim 15, wherein the rotation transmission state switching device includes a select plate serving as the mode select portion.

17. The power transmission path switching device according to claim 1, wherein the friction engagement device further has a return spring elastically biassing the friction plate and the separate plate in a direction away from each other.

18. A two-speed transmission, including an input member,
an output member arranged coaxially with the input member,
a planetary gear mechanism arranged between the input member and the output member with respect to a power transmission direction, and the power transmission path switching device according to claim 1, that switches a power transmission path between the input member and the output member, wherein the planetary gear mechanisms includes a sun gear connected to the input member so as to rotate integrally with the input member, a ring gear arranged coaxially with the sun gear around the sun gear, a carrier arranged coaxially with the sun gear and connected to the output member so as to rotate integrally with the output member, and a plurality of pinion gears meshing with the sun gear and the ring gear and supported by the carrier to freely rotate about respective center axes, wherein one of the friction plate and the separate plate is supported so as to be displaced in the axial direction and so as not to rotate relative to the sun gear or the input member, the other of the friction plate and the separate plate is supported so as to be displaced in the axial direction and so as not to rotate relative to the carrier or the output member, one of the first member and the second member is supported with respect to the housing that does not rotate even when in use so as not to relatively rotate, and the other of the first member is supported with respect to the ring gear so as not to rotate.

19. The two-speed transmission according to claim 18, wherein the control device includes a drive cam supported so as to rotate and so as not to displace in the axial direction, and switches the connection/disconnection state of the friction engagement device and the mode of the rotation transmission state switching device based on rotation of the drive cam, and a mode select portion is rotated or displaced in the axial direction as the drive cam rotates, wherein the two-speed transmission including an electric actuator that rotationally drives the drive cam.

\* \* \* \* \*